(12) United States Patent
Karvounis

(10) Patent No.: US 11,140,379 B2
(45) Date of Patent: Oct. 5, 2021

(54) MAPPING AND TRACKING SYSTEM WITH FEATURES IN THREE-DIMENSIONAL SPACE

(71) Applicant: TRX SYSTEMS, INC., Greenbelt, MD (US)

(72) Inventor: John George Karvounis, Bowie, MD (US)

(73) Assignee: TRX SYSTEMS, INC., Greenbelt, MD (US)

( * ) Notice: Subject to any disclaimer, the term of this patent is extended or adjusted under 35 U.S.C. 154(b) by 0 days.

(21) Appl. No.: 17/010,727

(22) Filed: Sep. 2, 2020

(65) Prior Publication Data

US 2020/0404245 A1     Dec. 24, 2020

Related U.S. Application Data

(62) Division of application No. 16/009,131, filed on Jun. 14, 2018, now Pat. No. 10,805,595, which is a
(Continued)

(51) Int. Cl.
*H04N 7/18* (2006.01)
*H04N 13/239* (2018.01)
(Continued)

(52) U.S. Cl.
CPC ....... *H04N 13/239* (2018.05); *G06K 9/00201* (2013.01); *G06K 9/3233* (2013.01);
(Continued)

(58) Field of Classification Search
CPC .. H04N 13/239; H04N 5/2224; H04N 13/122; H04N 13/246; H04N 13/282;
(Continued)

(56) References Cited

U.S. PATENT DOCUMENTS 5,774,591 A    6/1998 Black et al.
6,069,631 A    5/2000 Tao et al.
(Continued)

OTHER PUBLICATIONS

U.S. Appl. No. 61/515,296, filed Aug. 4, 2011, Karvounis.
(Continued)

*Primary Examiner* — Richard T Torrente
(74) *Attorney, Agent, or Firm* — BakerHostetler

(57) ABSTRACT

LK-SURF, Robust Kalman Filter, HAR-SLAM, and Landmark Promotion SLAM methods are disclosed. LK-SURF is an image processing technique that combines Lucas-Kanade feature tracking with Speeded-Up Robust Features to perform spatial and temporal tracking using stereo images to produce 3D features can be tracked and identified. The Robust Kalman Filter is an extension of the Kalman Filter algorithm that improves the ability to remove erroneous observations using Principal Component Analysis and the X84 outlier rejection rule. Hierarchical Active Ripple SLAM is a new SLAM architecture that breaks the traditional state space of SLAM into a chain of smaller state spaces, allowing multiple tracked objects, multiple sensors, and multiple updates to occur in linear time with linear storage with respect to the number of tracked objects, landmarks, and estimated object locations. In Landmark Promotion SLAM, only reliable mapped landmarks are promoted through various layers of SLAM to generate larger maps.

16 Claims, 50 Drawing Sheets

The essential SLAM problem

Related U.S. Application Data division of application No. 13/566,956, filed on Aug. 3, 2012, now Pat. No. 10,027,952.

(60) Provisional application No. 61/515,296, filed on Aug. 4, 2011.

(51) Int. Cl.

| | |
|---|---|
| *G06K 9/00* | (2006.01) |
| *G06K 9/62* | (2006.01) |
| *H04N 5/222* | (2006.01) |
| *G06T 7/80* | (2017.01) |
| *G06T 7/246* | (2017.01) |
| *G06T 7/277* | (2017.01) |
| *G06K 9/32* | (2006.01) |
| *H04N 13/282* | (2018.01) |
| *H04N 13/00* | (2018.01) |
| *G06K 9/46* | (2006.01) |
| *H04N 13/246* | (2018.01) |
| *H04N 13/122* | (2018.01) |

(52) U.S. Cl.
CPC ............ *G06K 9/6248* (2013.01); *G06T 7/246* (2017.01); *G06T 7/277* (2017.01); *G06T 7/85* (2017.01); *H04N 5/2224* (2013.01); *G06K 9/00664* (2013.01); *G06K 9/4671* (2013.01); *G06K 2209/29* (2013.01); *G06T 2200/28* (2013.01); *G06T 2207/10021* (2013.01); *G06T 2207/20021* (2013.01); *G06T 2207/20088* (2013.01); *H04N 13/122* (2018.05); *H04N 13/246* (2018.05); *H04N 13/282* (2018.05); *H04N 2013/0092* (2013.01)

(58) Field of Classification Search
CPC . H04N 2013/0092; G06T 7/277; G06T 7/246; G06T 7/85; G06T 2207/10021; G06T 2207/20021; G06T 2200/28; G06T 2207/20088; G06K 9/6248; G06K 9/00201; G06K 9/4671; G06K 9/00664; G06K 2209/29
USPC .......................................................... 348/46
See application file for complete search history.

(56) References Cited

U.S. PATENT DOCUMENTS

| | | | |
|---|---|---|---|
| 6,072,496 | A | 6/2000 | Guenter et al. |
| 8,504,292 | B1 | 8/2013 | Cote et al. |
| 8,706,414 | B2 | 4/2014 | Funk et al. |
| 8,712,686 | B2 | 4/2014 | Bandyopadhyay et al. |
| 9,148,764 | B2 | 9/2015 | Das et al. |
| 2002/0070365 | A1 | 6/2002 | Karellas |
| 2005/0033142 | A1 | 2/2005 | Madden et al. |
| 2005/0182518 | A1 | 8/2005 | Karlsson |
| 2005/0243103 | A1 | 11/2005 | Rudolph |
| 2006/0171594 | A1 | 8/2006 | Avidan et al. |
| 2006/0280360 | A1 | 12/2006 | Holub |
| 2007/0262884 | A1* | 11/2007 | Goncalves ............ G05D 1/0231 340/995.24 |
| 2008/0077326 | A1 | 3/2008 | Funk et al. |
| 2008/0144925 | A1 | 6/2008 | Zhu et al. |
| 2008/0187174 | A1 | 8/2008 | Metaxas et al. |
| 2008/0240612 | A1 | 10/2008 | Liang et al. |
| 2008/0283771 | A1 | 11/2008 | Li |
| 2009/0043504 | A1 | 2/2009 | Bandyopadhyay et al. |
| 2009/0179869 | A1 | 7/2009 | Slotznick |
| 2009/0248304 | A1 | 10/2009 | Roumeliotis et al. |
| 2010/0007665 | A1 | 1/2010 | Smith et al. |
| 2010/0098328 | A1 | 4/2010 | Se et al. |
| 2010/0134634 | A1 | 6/2010 | Witt |
| 2010/0187406 | A1 | 7/2010 | Dalen et al. |
| 2010/0321478 | A1 | 12/2010 | Sliwa et al. |
| 2012/0121161 | A1* | 5/2012 | Eade .................... G05D 1/0253 382/153 |
| 2012/0203453 | A1 | 8/2012 | Lundquist et al. |
| 2012/0293667 | A1 | 11/2012 | Baba et al. |
| 2013/0046505 | A1 | 2/2013 | Brunner et al. |
| 2013/0267260 | A1 | 10/2013 | Chao et al. |
| 2013/0332064 | A1 | 12/2013 | Funk et al. |
| 2013/0345967 | A1 | 12/2013 | Pakzad |
| 2014/0002307 | A1 | 1/2014 | Mole et al. |
| 2014/0162686 | A1 | 6/2014 | Lee et al. |
| 2015/0005000 | A1 | 1/2015 | Gyorfi et al. |
| 2015/0097731 | A1 | 4/2015 | Russell |
| 2015/0153182 | A1 | 6/2015 | Tu et al. |
| 2015/0346317 | A1 | 12/2015 | Patel et al. |
| 2019/0007673 | A1 | 1/2019 | Karvounis |

OTHER PUBLICATIONS

Jolliffe; "Principal Component" 2.sup.nd edition; New York; 2002; p. 1-519.

Turk et al.; "Face Recognition Using Eigenfaces"; Vision and Modeling Group; IEEE; 1991; p. 586-591.

Tommasini et al.; "Making Good Features Track Better"; IEEE Computer Vision and Pattern Recognition; 1998; 6 pages.

Thrun et al.; "The Graph SLAM Alogrithm with Applications to Large-Scale Mapping of Urban Structures"; International Journal on Robotics Research; vol. 25 No. 6; 2006; p. 403-429.

Thrun et al.; "A Probabilistic Approach to Concurrent Mapping and Localization for Mobile Robots"; Machine Learning and Autonomous Robots; 31/5; 1998; 25 pages.

U.S. Appl. No. 13/616,350, filed Sep. 14, 2012, Bandyopadhyay et al.

U.S. Appl. No. 13/616,370, filed Sep. 14, 2012, Bandyopadhyay et al.

U.S. Appl. No. 13/616,408, filed Sep. 14, 2012, Bandyopadyay et al.

Stanley; Implementation of Kalman Filter to Tracking Custom Four-Wheel Drive Four-Wheel-Steering Robotic Platform; Univ or Maryland; Masters Thesis; 2010; 96 pages.

Noguchi et al.; "A SURF-based Spatio-Temporal Feature for Feature-fusion-based Action Recognition" Trends and Topics in Computer Vision; 2012; 14 pages.

Napora; "Implementation, Evaluation, and Applications of Mobile Mesh Networks for Platforms in Motion"; Univ of Maryland; Masters Thesis; 2009; 105 pages.

Mahalanobis; "On the Generalized Distance in Statistics"; Proceedings of the National Institute of Sciences of India; vol. 2 No. 1; Apr. 1936; p. 49-55.

Lemaire et al.; "SLAM with Panoramic Vision"; Journal of Field Robotics; vol. 24 No. 1-2; Feb. 2007; 30 pages.

Jensfelt et al.; "A Framework for Vision Based Bearing only 3D SLAM" IEEE Int. Conf. on Robotics and Automation; May 2006; p. 1944-1950.

Harris et al.; "A Combined Corner and Edge Detector"; Proceedings of the 4.sup.th Alvey Vision Conference; 1988; p. 147-151.

Gregory et al.; "Fast and Accurate Collision Detection for Haptic Interaction Using a Three Degree-of-Freedom Force-Feedback Device"; Computational Geometry, 2000; 24 pages.

Whyte; "Uncertain Geometry in Robotics"; IEEE Journal of Robotics and Automation; vol. 4 No. 1; Feb. 1988; p. 23-31.

Davison et al.; MonoSLAM: Real-Time Single Camera SLAM; IEEE Transactions on Pattern Analysis and Machine Intelligence; vol. 29 No. 6; Jun. 2007; 16 pages.

Bouguet; "Pyramidal Implementation of the Lucas Kanade Feature Tracker Description of the Algorithm"; Intel Coporation; 2001; 9 pages.

Bailey et al.; "Simultaneous Localization and Mapping (SLAM); Part II"; IEEE Robotics and Automation Magazine; vol. 13 No. 3; Sep. 2006; p. 108-117.

Chong et al.; "Feature-based Mapping in Real, Large Scale Environments using an Ultrasonic Array"; The International Journal of Robotics Research; vol. 18 No. 1; Jan. 1999; 44 pages.

(56) References Cited

OTHER PUBLICATIONS

DeSouza et al.; "Vision for Mobile Robot Navigation: A Survey"; IEEE Transactions on Pattern Analysis and Machine Intelligence; vol. 24 No. 2; Feb. 2002; p. 237-267.

Mourikis et al.; "SC-KF Mobile Robot Localization: A Stochastic Cloning Kalman Filter for Processing Relative-State Measurements"; IEEE Transactions on Robotics; vol. 23 No. 4; Aug. 2007; p. 717-730.

"Parallel Programming and Computing Platform"; www.nvidia.com/object/cuda_home.html; NVIDIA; 2009; accessed Oct. 23, 2012; 4 pages; no authors.

"Developing apps for Windows Phone orXbox"; http://create.msdn.com; Microsoft; 2012; accessed Oct. 23, 2012; 2 pages; no authors.

"OpenCV (Open Source Computer Vision)"; http://opencv.willowgarage.com; Intel; 2009; accessed Oct. 23, 2012; 2 pages; no authors.

Teschner et al.; "Optimized Spatial Hashing for Collision Detection of Defromable Objects"; Vision Modeling and Visualization; Korea University; 2003; 39 pages.

Bay et al.; "Speeded-Up Robust Features (SURF)"; Computer Vision and Image Understanding; vol. 110 No. 3; 2008; p. 346-359.

Whyte et al.; "Simultaneous Localization and Mapping: Part I"; IEEE Robotics & Automation Magazine; Jun. 2006; p. 99-108.

Bradley et al.; "Face Tracking and Pose Approximation" Computer Research Association; 2009; 7 pages.

Gregroy et al.; "A Framework for Fast and Accurate Collision Detection for Haptic Interaction"; IEEE Proceedings of Virtual Reality; 1999; 8 pages.

"TRX 3-D Tracking System"; http://www.trxsystems.com; TRX Systems, Inc.; 2009; 2 pages; No Author.

Kabasch; A discussion of the solution for the best rotation to relate two sets of vectors; Acta Crystallographica; vol. 34; Sep. 1978; p. 827-828.

Estrada et al.; "Hierarchical SLAM: Real-Time Accurate Mapping of Large Environments"; IEEE Transactions on Robotics; vol. 21 No. 4; Aug. 2005; p. 588-596.

\* cited by examiner

FIG. 1 The essential SLAM problem

FIG. 2  Example of dense stereo with original left and right image above

Screenshot of using SURF for optic flow

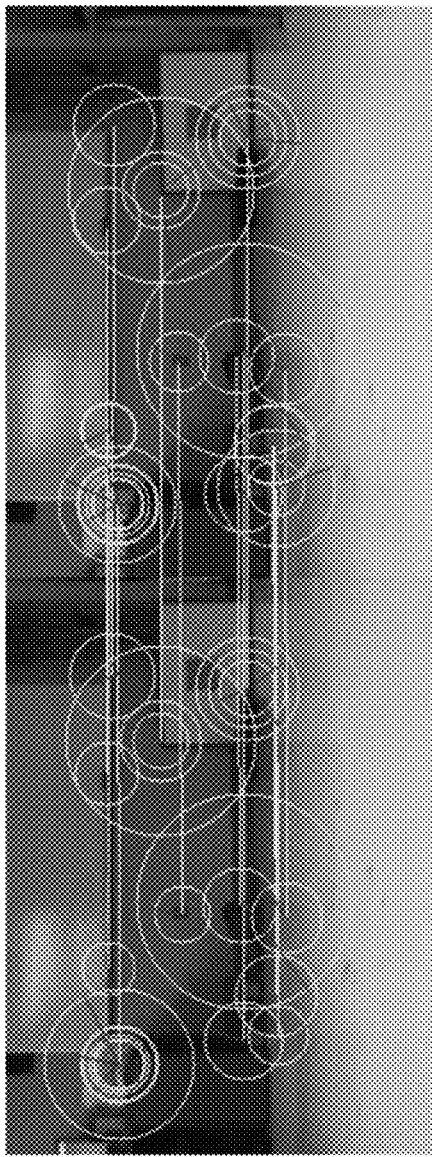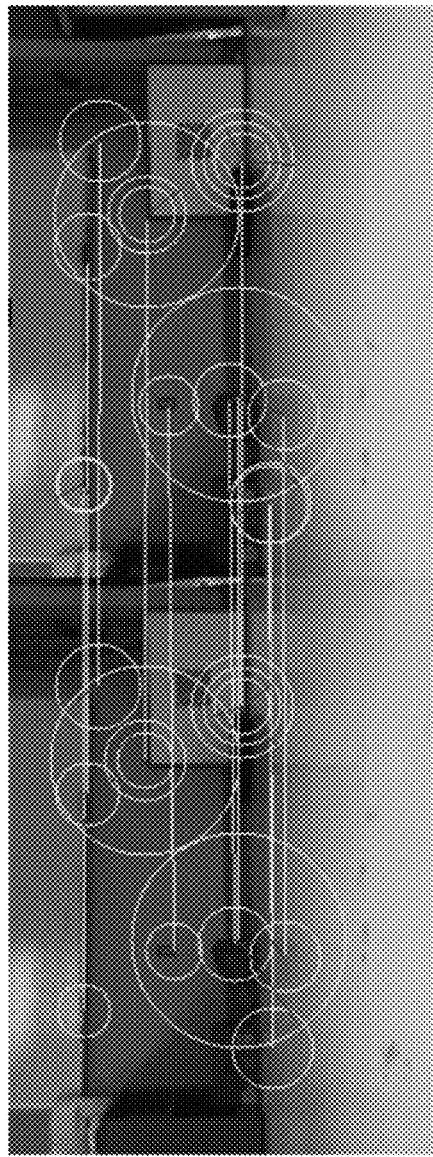
FIG. 4 Sample screenshot of LK-SURF tracking features

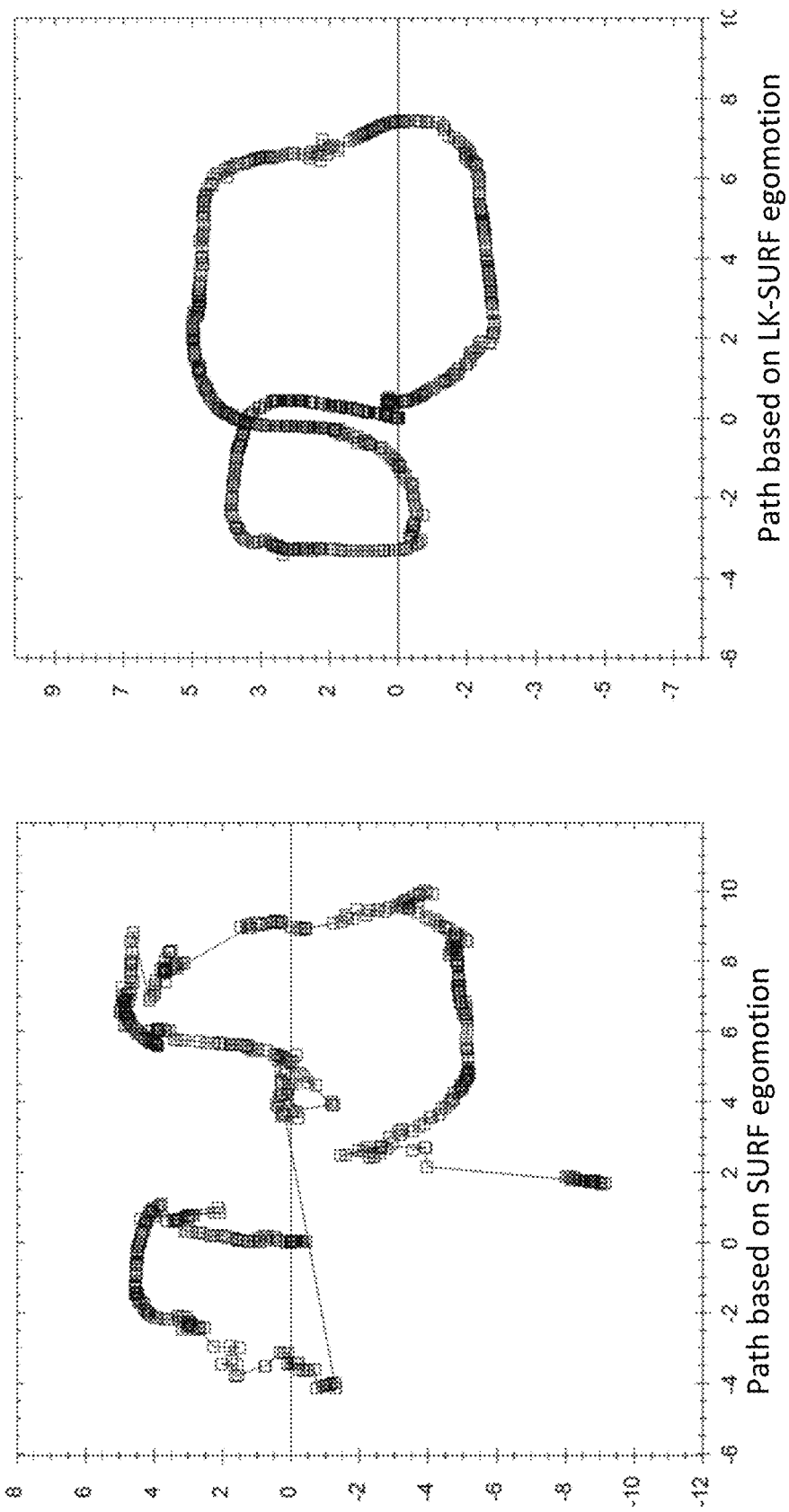

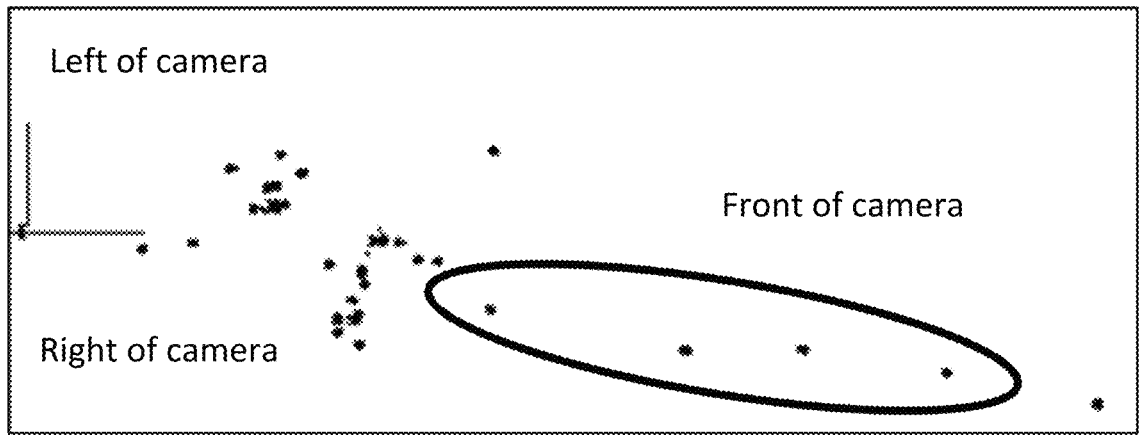
features plotted as a distance away from the camera, stray point circled
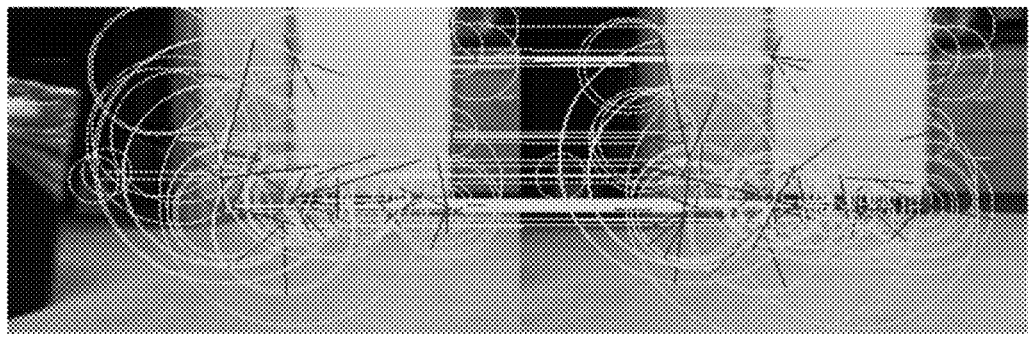
Original image with matched features, excess features tracked in the middle
Example of bland feature tracking
FIG. 6

Overview of HAR-SLAM. Forgetful SLAM operating on current information. Links are established between past poses and landmarks.

HAR-SLAM map with corrected path and landmark locations

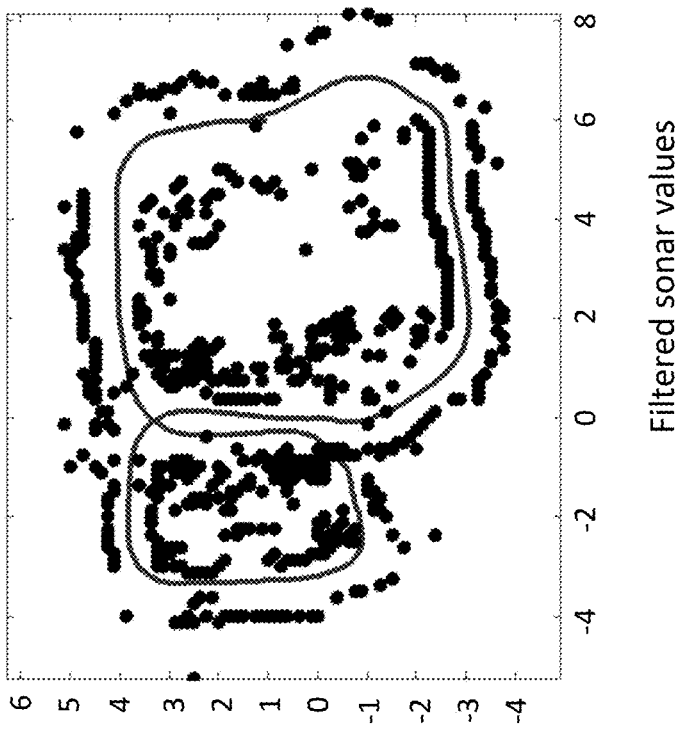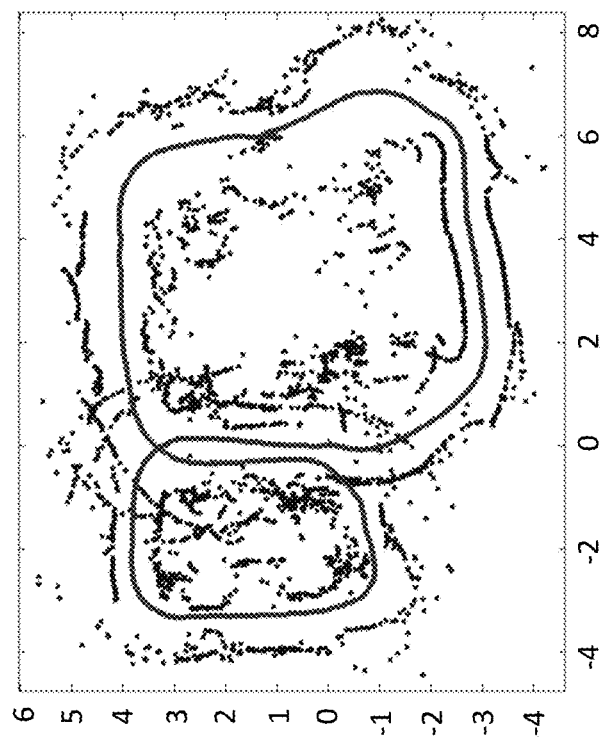
FIG. 14
Sonar produced from HAR-SLAM path

Hybrid sonar and visual landmark map on figure-eight path

Hybrid sonar and visual landmark map

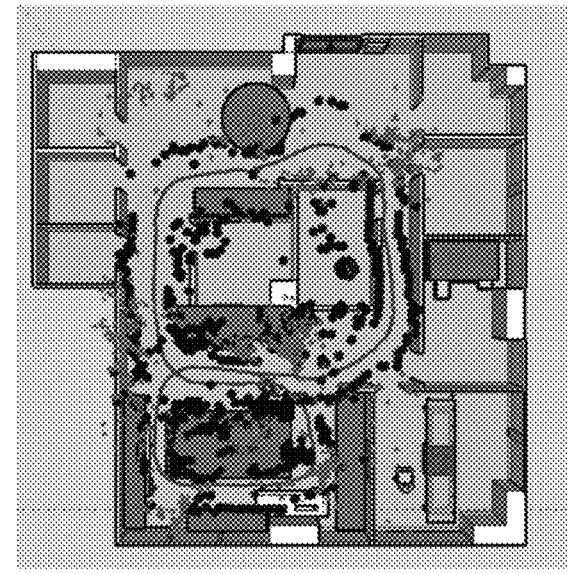
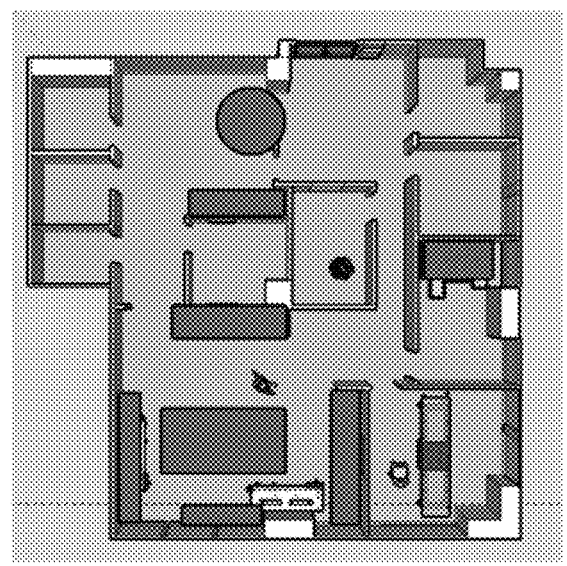
Layout With Approximate Location Of Furniture  HAR-SLAM Map And Path Drawn On Top Of The CAD Drawing
CAD drawing of the test location
FIG. 17

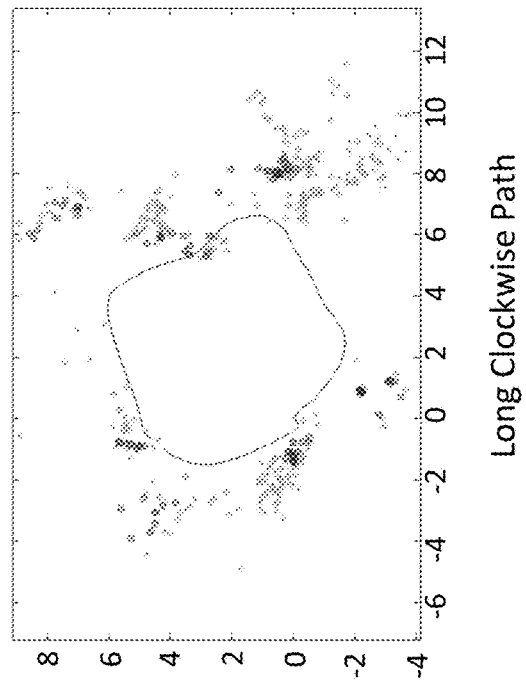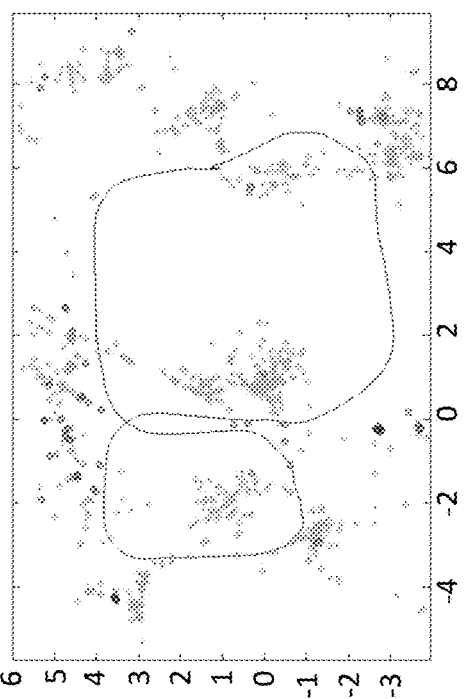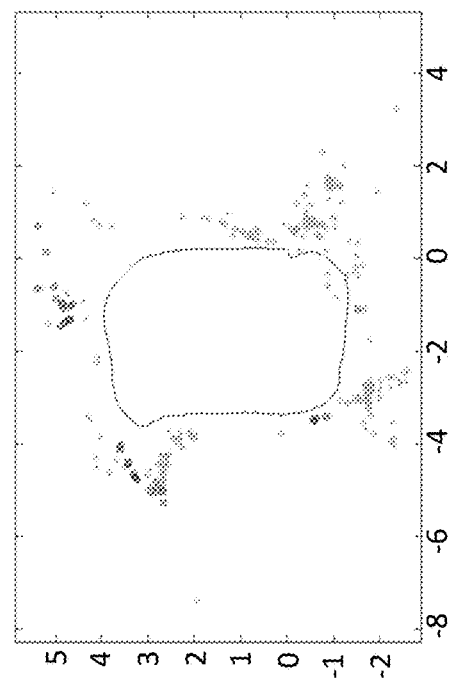
FIG. 18
Paths With Marked Features For Promotion

Histogram of landmark strength, calculated by the landmark promotion metric for the figure-eight path Visual landmark maps generated by Cooperative LP-SLAM using Figure-eight path, long clockwise path, and short counterclockwise path Sonar maps generated by Cooperative LP-SLAM using Figure-eight path, long clockwise path, and short counterclockwise path View of the test platform CAD design of custom chassis modifications Schematic of the sensor acquisition board

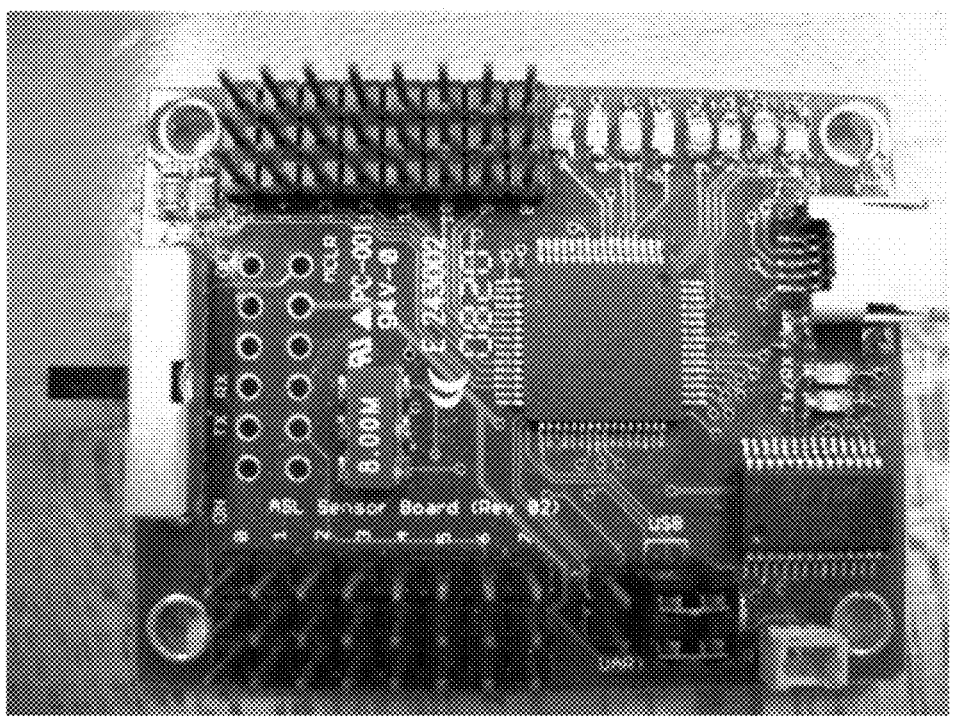
FIG. 24B View of the sensor acquisition board
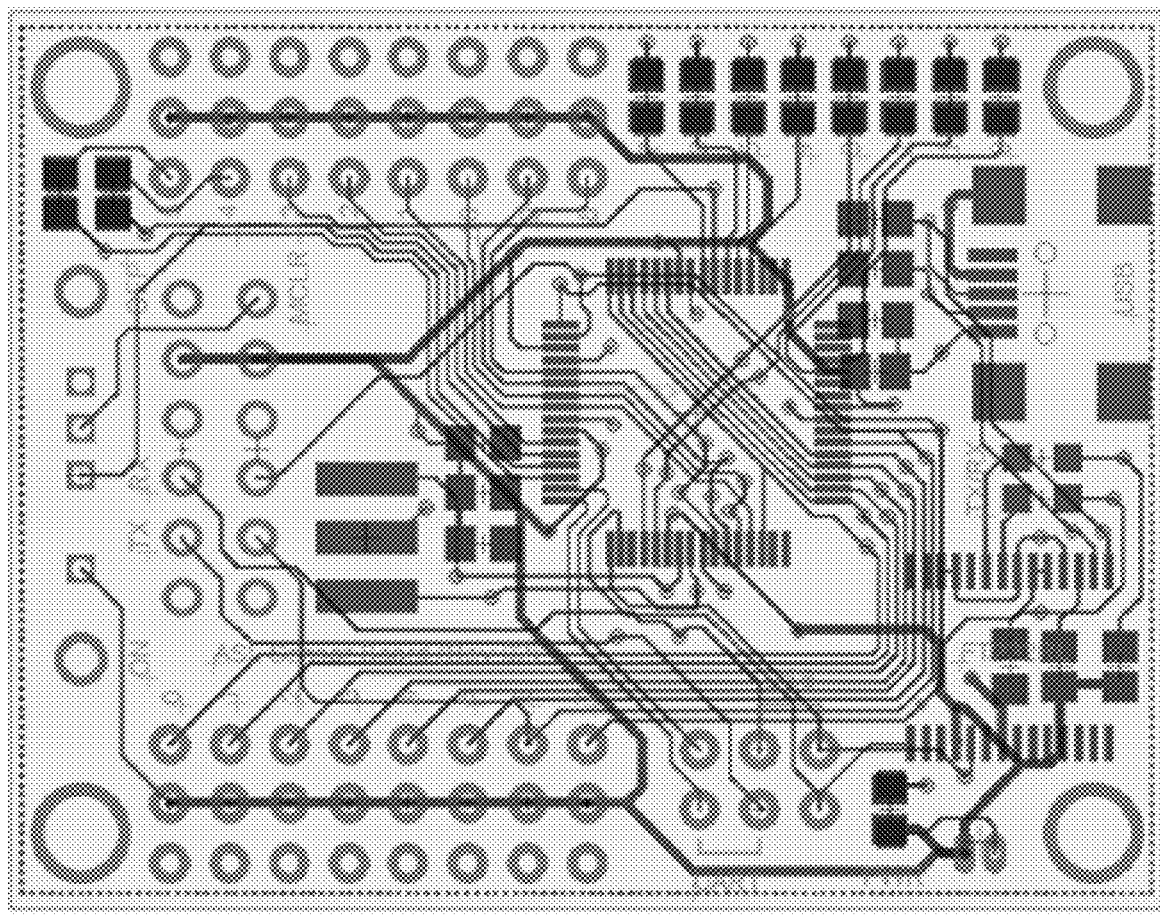
FIG. 24C Diagram of the sensor acquisition board Encoder parts and assembled encoder Close view of the TRX INU with Point Grey cameras, the Optical INU ASL Framework hierarchy ASL Framework data flow

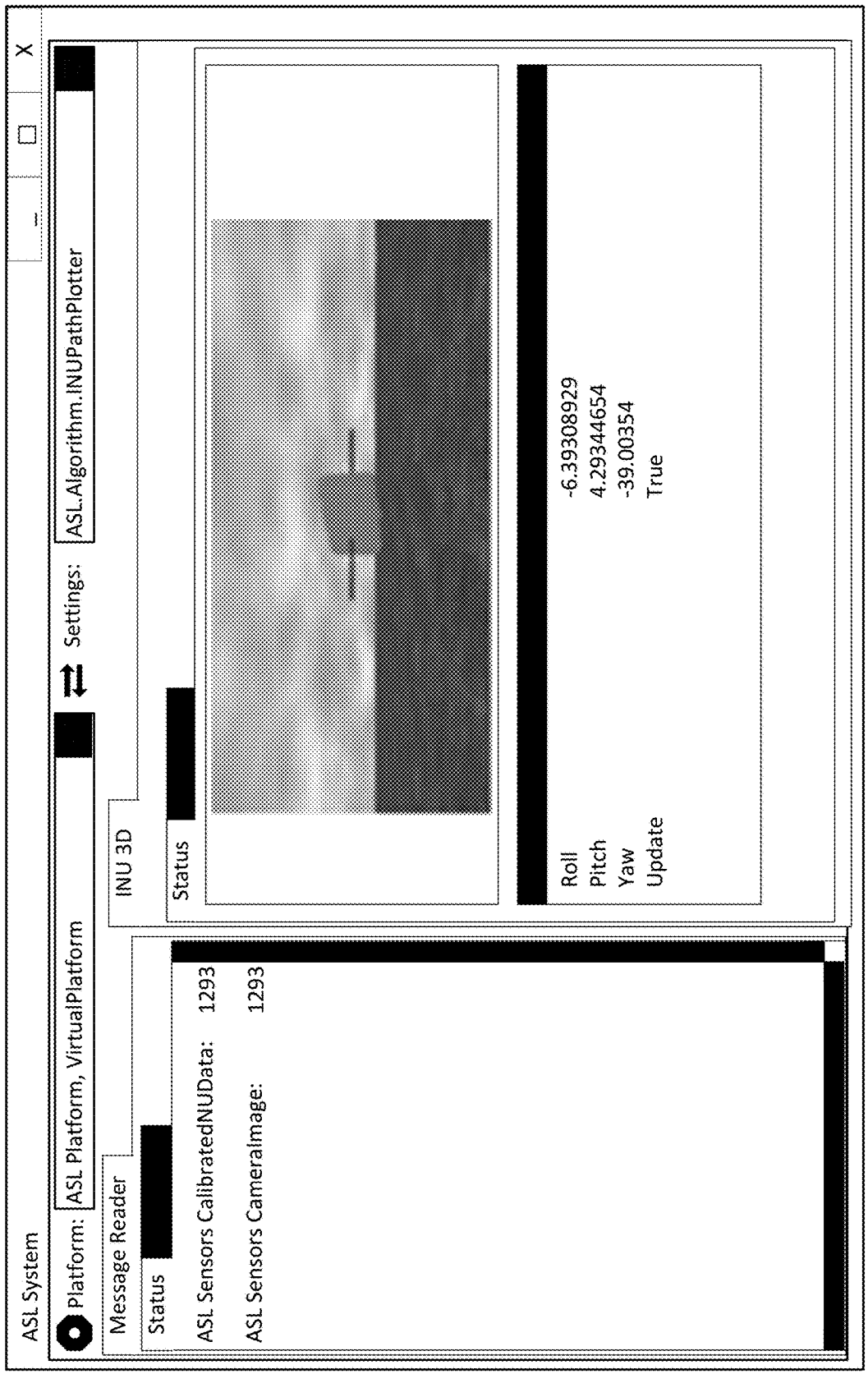
FIG. 29A Sample screenshot of the ASL Application

Sample screenshot of the ASL Application

Sample screenshot of the ASL Application

Diagram of connecting devices (dotted) and functional units (solid) for Cooperative LP-SLAM Point Grey camera status Point Grey camera settings panel Point Grey camera settings panel Parallax servo controller device status and parameter panel Xbox controller device status panel Mesh networking device status and parameter panels Snapshot of stereo synchronizer functional unit Snapshot of stereo rectifier functional unit Snapshot of LK-SURF functional unit Encoder calibration environment Histogram and Gaussian fit for sample encoder calibration Matlab toolbox calibration - world-centered view
given multiple checkerboard samples Screenshot of stereo camera calibration in ASL

FIG. 42

Diagram of an epipolar line

Histogram of epipolar-based errors with a Gaussian Mixture Model fit

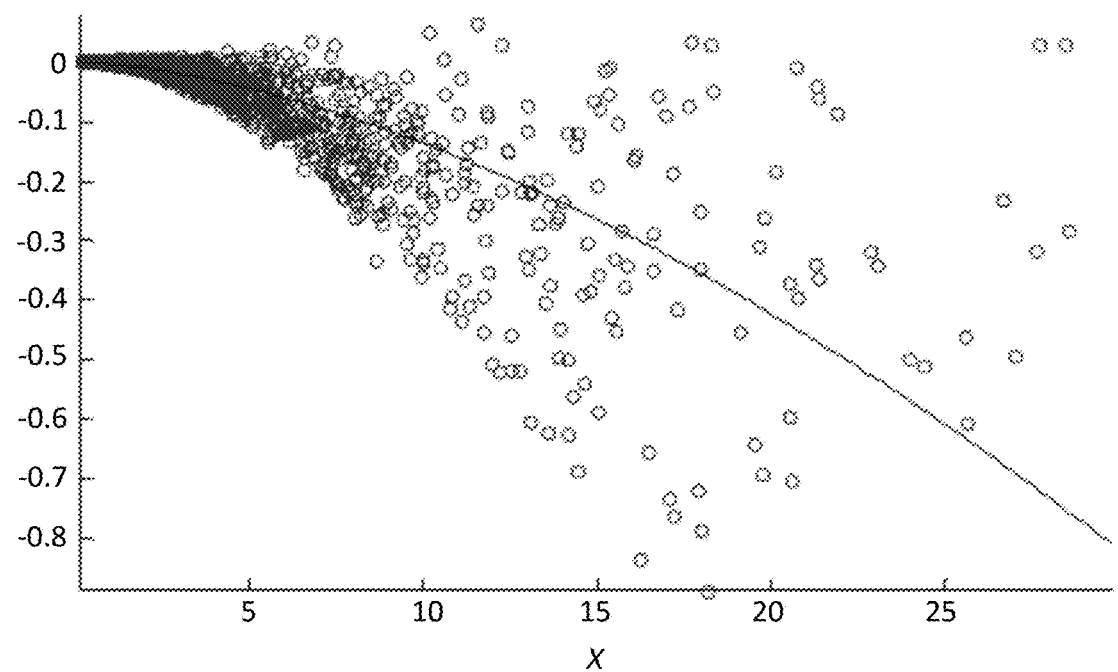
Scatter of mean error vs. distance
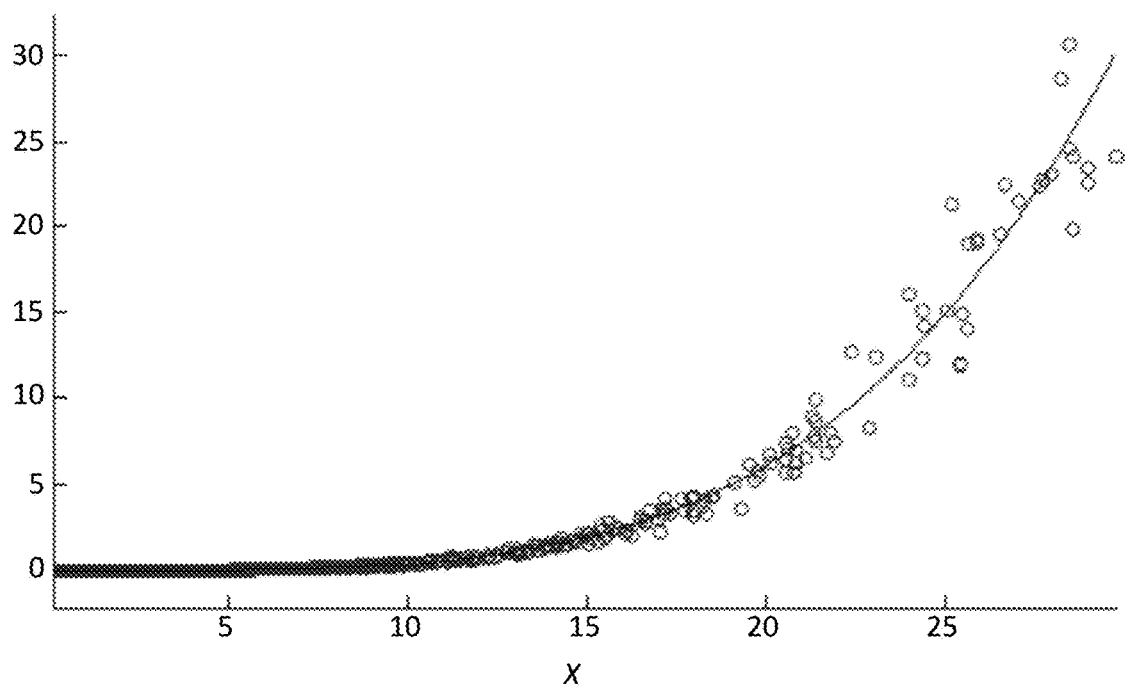
Scatter of variance vs. distance
FIG. 45

PI implementation of orientation estimator

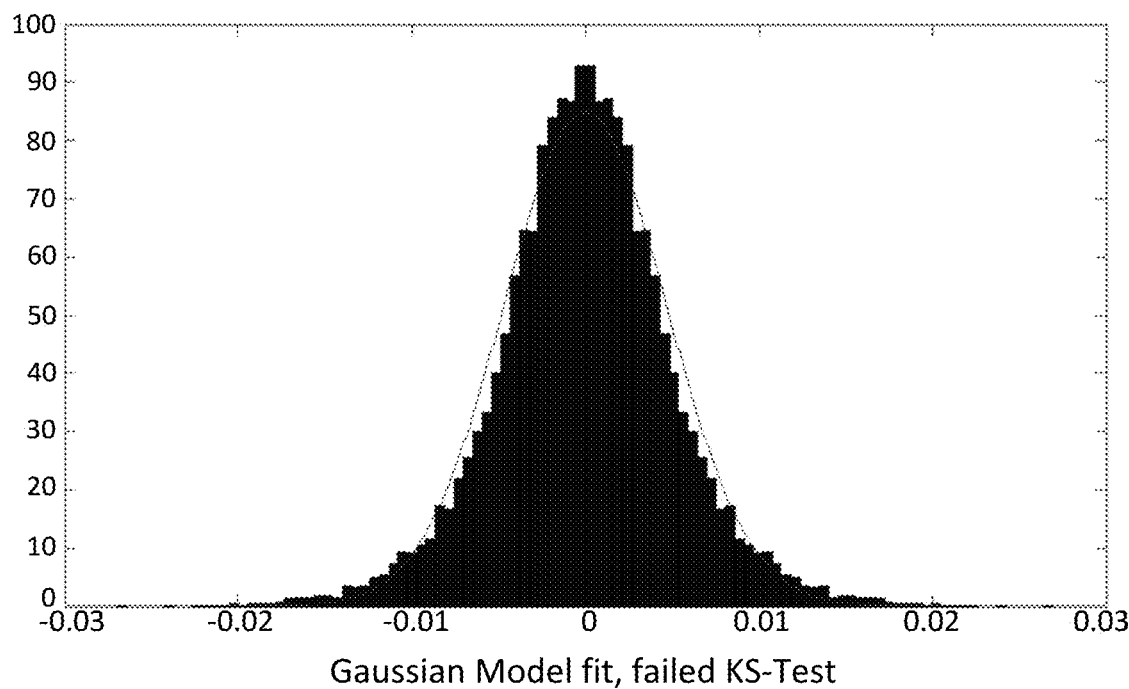
Gaussian Model fit, failed KS-Test
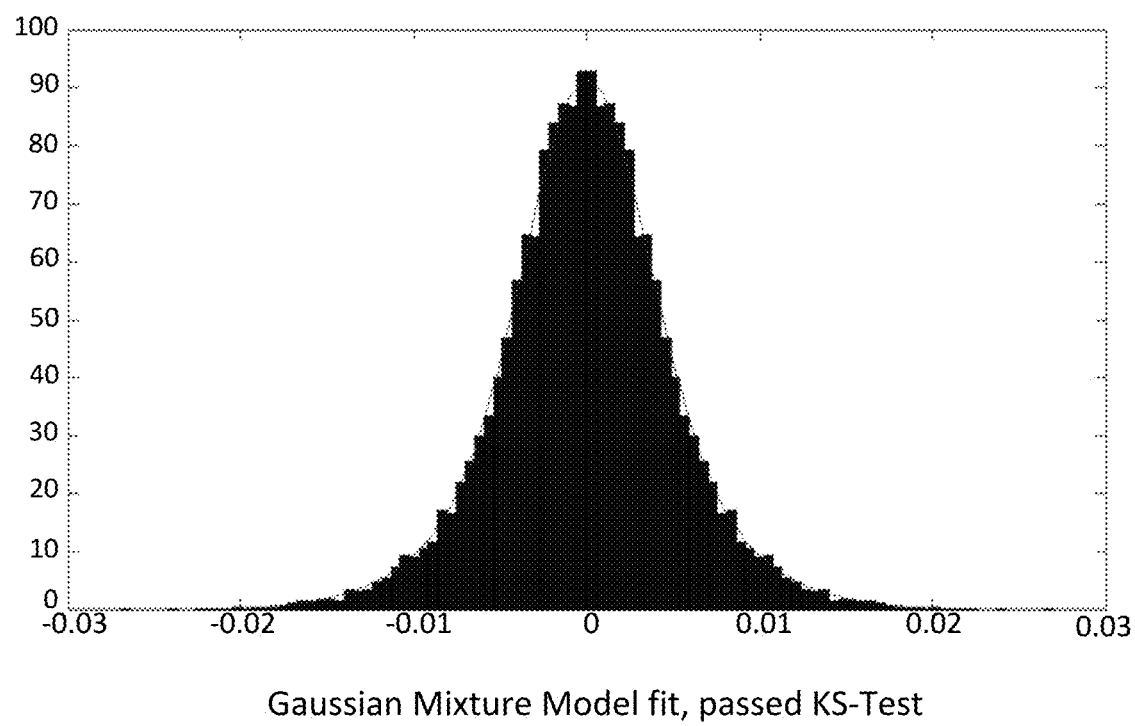
Gaussian Mixture Model fit, passed KS-Test
Histogram of stationary orientation data in one dimension
FIG. 47

Stereo view of gravity aligned checkerboard

Inertial (solid) vs. optical (dotted) directions of gravity on unit sphere

Multiple views of calibrated inertial (solid) and optical (dotted) directions of gravity on unit sphere

| Path | Wheel Encoder and Gyroscope Path | Forgetful SLAM using an EKF | Forgetful SLAM using Robust Kalman Filter |
|---|---|---|---|
| Short Clockwise Path | | | |
| Short Counterclockwise Path | | | |
| Long Clockwise Path | | | |
| Long Counterclockwise Path | | | |
| Figure-Eight Path | | | |
| Four Loop Path | | | |
| Unusual Search Path | | | |
| High Speed Dynamics Test Path | | | |

FIG. 51

MAPPING AND TRACKING SYSTEM WITH FEATURES IN THREE-DIMENSIONAL SPACE

CROSS REFERENCE TO RELATED APPLICATIONS

This application is a Division of U.S. patent application Ser. No. 16/009,131, filed Jun. 14, 2018, which is a Division of U.S. patent application Ser. No. 13/566,956, filed Aug. 3, 2012, which claims benefit under 35 U.S.C. § 119(e) of Provisional U.S. Patent Application No. 61/515,296, filed Aug. 4, 2011, the contents of which is incorporated herein by reference in its entirety.

GOVERNMENT RIGHTS

This invention is made with Government support under Contract Number W31P4Q-10-C-0298 awarded by the US Army Contracting Command and administered by DCMA Baltimore. The government has certain rights in the invention.

TECHNICAL FIELD

The present application relates to four mapping and tracking methods. The methods include LK-SURF, the Robust Kalman Filter, HAR-SLAM, and Landmark Promotion SLAM. LK-SURF is an image processing technique that combines Lucas-Kanade feature tracking with Speeded-Up Robust Features to perform spatial and temporal tracking using stereo images to produce 3D features that can be tracked and identified. The Robust Kalman Filter is an extension of the Kalman Filter algorithm that improves the ability to remove erroneous observations using Principal Component Analysis (PCA) and the X84 outlier rejection rule. Hierarchical Active Ripple SLAM (HAR-SLAM) is a new SLAM architecture that breaks the traditional state space of SLAM into a chain of smaller state spaces, allowing multiple tracked objects, multiple sensors, and multiple updates to occur in linear time with linear storage with respect to the number of tracked objects, landmarks, and estimated object locations. This technique allows tracking and mapping to occur in linear time, making it feasible to track many objects and generate maps in real time. Landmark Promotion SLAM is a hierarchy of new SLAM methods. Embodiments include a framework where mapped landmarks are promoted through various layers of SLAM. At each level only a small set of reliable landmarks are promoted to a higher algorithm so that large maps can be generated from various sources while keeping computational requirements low.

BACKGROUND

Simultaneous Localization and Mapping (SLAM) is a topic of high interest in the robotics community. The ability for a robotic system to map an unknown environment while locating itself and others within the environment is of great use in robotics and navigation in general. It is especially helpful in areas where GPS technology cannot function, such as indoor environments, urban canyons, and caves. The idea of SLAM was introduced at the 1986 IEEE Robotics and Automation Conference in San Francisco, Calif., where researchers Peter Cheeseman, Jim Crowley, and Hugh Durrant-Whyte began looking at robotics and applying estimation-theoretic methods to mapping and localization [1]. Several others aided in the creation of SLAM, such as Raja Chatila, Oliver Faugeras, and Randal Smith, among others [1].

At a theoretical and conceptual level, SLAM is considered a solved problem. Many successful implementations, using sonar, laser ranger-finders, or visual sensors, exist [2] [3]. SLAM has been formulated and solved theoretically in various forms. However, substantial practical issues remain in realizing more general SLAM solutions, notably those that relate to constructing and using perceptually rich maps as part of a SLAM algorithm [1]. For large-scale and complex environments, especially those requiring full 3D mapping, the SLAM problem is still an open research issue [4]. Most SLAM solutions work in small areas, on a 2D surface with 2D landmarks. The introduction of a third dimension in either landmark state or robot state complicates traditional SLAM solutions [4].

Generally, SLAM techniques are driven by exteroceptive sensors such as cameras, laser range finders, sonars, and proprioceptive sensors (for example, wheel encoders, gyroscopes, and accelerometers) [5]. FIG. 1 shows the basics of the SLAM problem: a robot travels in an unknown environment, estimating its own position and its position relative to several landmarks in the area. It maps its position and the landmarks around it in successive iterations based on new observations. The problem of SLAM can be defined using the theory of uncertain geometry [6]. There are two important elements in uncertain geometry: the actual geometry of structures, and the overall topology of relations between geometric structures. With uncertain geometry, the representation by a parameterized function and a probability density of all geometric locations and features provides a simple means of describing geometric uncertainty. Using this representation, the analysis of uncertain geometry can be reduced to a problem in the transformation and manipulation of random variables [6]. The key elements of uncertain geometry theory are providing a homogeneous description of uncertain geometric features, developing procedures to transform and manipulate these descriptions, and supplying a mechanism for the consistent interpretation of relations between uncertain features [6].

According to [7], navigation problems can be categorized into several sub-problems. First, there is the distinction between indoor and outdoor navigation. Indoor navigation is composed of three sub-types: map-based navigation, map-building navigation, and map-less navigation. Map-based navigation systems depend on user-created geometric models or topological maps of the environment. Map-building-based navigation systems use sensors to construct their own geometric or topological models of the environment and then use their models for navigation. Map-less navigation systems use no explicit representation of the space in which navigation is to take place. Rather, they rely on recognizing objects found in their environment. Outdoor navigation can be divided into two classes according to the structural level of the environment. There are structured environments, such as road systems and urban landscapes, and there are unstructured environments, such as terrain and planet surfaces. Only map-building-based navigation, which is the core of SLAM, and map-less navigation, are considered herein, in the context of indoor environments.

According to [8], large-scale SLAM, which consists of maps with more than a few thousand landmarks or maps that traverse over distances greater than a hundred meters poses three main challenges. The first is algorithmic complexity, which is inherent in any application that handles thousands of pieces of information. The second is a consistency issue, whereby we have estimation techniques inhibited and weakened by large distances, the consideration of 3D motions, and sensor noise in general. The third difficulty is the loop-closing detection and feature matching issue. Loop-closing involved recognizing that the robot has returned to a mapped area, and propagating corrections to the entire map correcting any inconsistency. Loop-closing and feature matching in general are difficult to solve using landmark and robot position estimates alone, since they tend to be inconsistent over long distances.

There are four general background areas relevant to the embodiments described herein. The first area involves fusing inertial and visual sensors. The second area involves SLAM in general, covering many sub-topics, including Kalman Filters, Particle Filters, and various types of SLAM that use different sensing techniques. The third area involves cooperative control and map coverage, specifically how others in robotics and SLAM fields have handled cooperative control. The fourth area involves landmark acquisition, visual descriptors, and feature tracking. These four areas are relatively well known to those of ordinary skill in the art and are addressed in varying degrees by references [1] through [8]:

[1] Hugh Durrant-Whyte and Time Bailey, "Simultaneous Localization and Mapping: Part I," *Robotics & Automation Magazine*, vol. 13, no. 2, pp. 99-110, June 2006.
[2] S. Thrun, D. Fox, and W. Burgard, "A probabilistic approach to concurrent mapping and localization formobile robotics," *Machine Learning*, p. 31, 1998.
[3] K. S. Chong and L. Kleeman, "Feature-based mapping in real, large scale environments using an ultrasonic array," *International Journal of Robotics Research*, pp. 3-19, January 1999.
[4] P. Jensfelt, D. Kragic, J. Folkesson, and M. Bjorkman, "A Framework for Vision Based Bearing Only 3D SLAM," in *Internation Conference on Robotics and Automation*, 2006, p. 1564-1570.
[5] Anastasios I. Mourikis, Stergios I. Roumeliotis, and Joel W. Burdick, "SC-KF Mobile Robot Localization: A Stochastic Cloning Kalman Filter for Processing Relative-State Measurements," in *Transactions on Robotics*, 2007, pp. 717-730.
[6] Hugh F. Durrant-Whyte, "Uncertain Geometry in Robotics," *IEEE Journal of Robotics and Automation*, pp. 23-31, 1988.
[7] Guilherme N. DeSouza and Avinash C. Kak, "Vision for Mobile Robot Navigation: A Survey," in *Transactions on Pattern Analysis and Machine Intelligence*, 2002, pp. 237-267.
[8] Thomas Lemaire and Simon Lacroix, "SLAM with Panoramic Vision," *Journal of Field Robotics*, vol. 24, no. 1-2, pp. 91-111, February 2007.

BRIEF DESCRIPTION OF THE DRAWINGS

FIG. 45—Stereo camera projection distance mean errors and variances. Left: Scatter of mean error vs. distance. Right: Scatter of variance vs. distance.

FIG. 47—Histogram of stationary orientation data in one dimension. Left: Gaussian Model fit, failed KS-Test, Right: Gaussian Mixture Model fit, passed KS-Test FIG. 48—Stereo view of gravity aligned checkerboard FIG. 49—Inertial (solid) vs. optical (dotted) directions of gravity on unit sphere FIG. 50—Multiple views of calibrated inertial (solid) and optical (dotted) directions of gravity on unit sphere.

FIG. 51—Table 6 plot snapshots of inertial paths, Robust Kalman Filter paths, and EKF paths.

DETAILED DESCRIPTION OF ILLUSTRATIVE EMBODIMENTS

Figure 1:
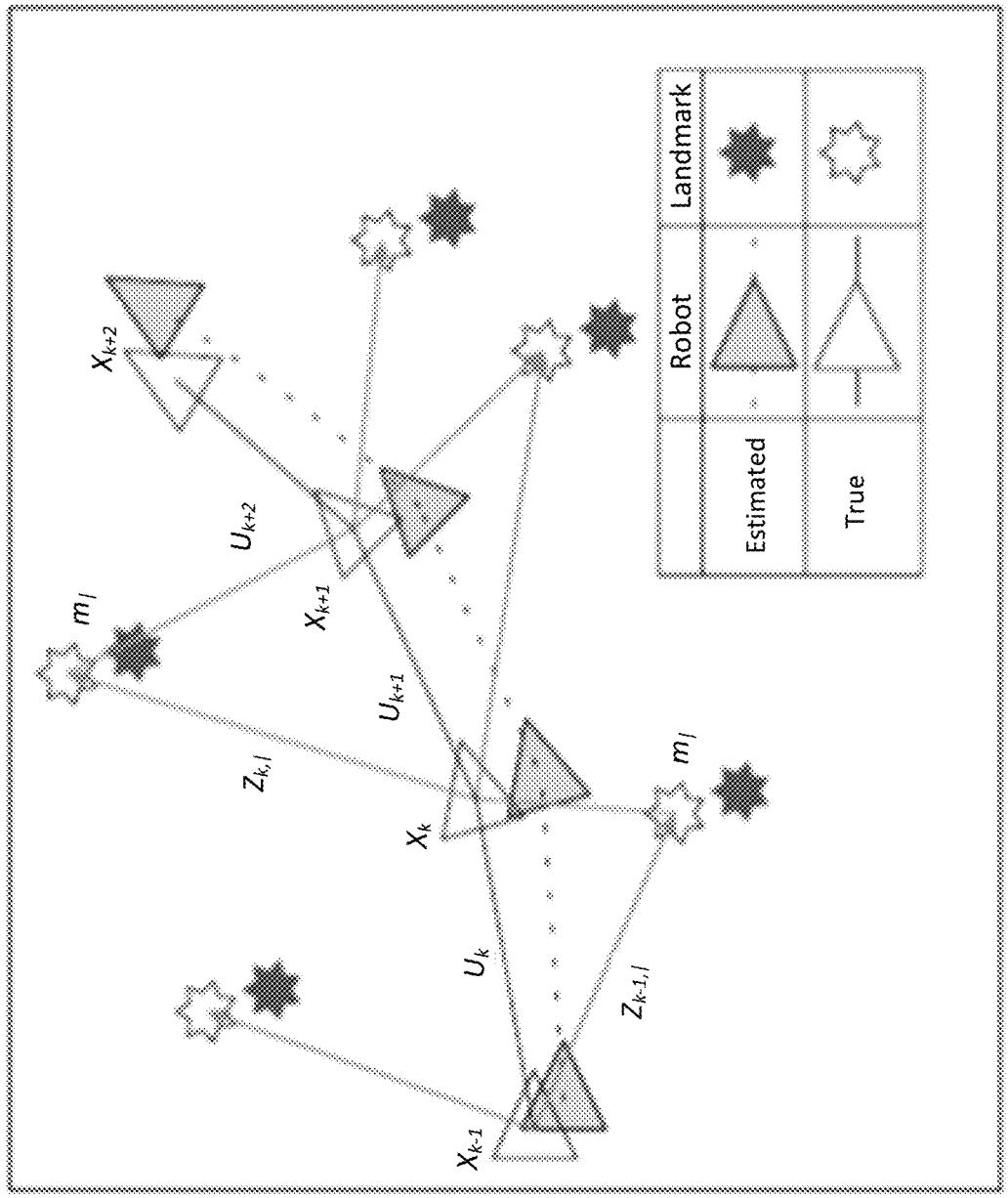
FIG. 1—The essential SLAM problem [1]
FIG. 2—Example of dense stereo with original left and right image above [9]
FIG. 3—Screenshot of using SURF for optic flow
FIG. 4—Sample screenshot of LK-SURF tracking features; older frame on top, recent frame with tracked features on bottom
FIG. 5—Comparison of SURF vs. LK-SURF egomotion. Left: Path based on SURF egomotion. Right: Path based on LK-SURF egomotion
FIG. 6—Example of bland feature tracking. Top: features plotted as a distance away from the camera, stray point circled in red. Bottom: Original image with matched features, excess features tracked in the middle
FIG. 7—Comparison of Robust Kalman Filter vs. Extended Kalman Filter. Left: Robust Kalman Filter path; Right: Extended Kalman Filter path; Bottom: Estimate of true path
FIG. 8—Comparison of EKF SLAM computation cost vs. Forgetful SLAM computation cost
FIG. 9—Comparison of Forgetful SLAM path to EKF-SLAM path. Left: estimate of true path; Center: Forgetful SLAM path; Right: EKF-SLAM path
FIG. 10—Overview of HAR-SLAM. Forgetful SLAM operating on current information. Links are established between past poses and landmarks.

Simultaneous Localization and Mapping (SLAM) is a challenging problem in practice, the use of multiple robots and inexpensive sensors poses even more demands on the designer. Cooperative SLAM poses specific challenges in the areas of computational efficiency, software/network performance, and robustness to errors. New methods in image processing, recursive filtering, and SLAM are utilized herein to implement practical algorithms for cooperative SLAM on a set of inexpensive robots. In particular, four embodiments are discussed, including LK-SURF, the Robust Kalman Filter, HAR-SLAM, and Landmark Promotion SLAM. All four methods are used to improve and produce maps and tracked locations.

LK-SURF is an image processing technique that combines Lucas-Kanade feature tracking with Speeded-Up Robust Features to perform spatial and temporal tracking. Typical stereo correspondence techniques fail at providing descriptors for features, or fail at temporal tracking. Feature trackers typically only work on a single image for features in 2D space, but LK-SURF tracks features over 3D space. This new tracker allows stereo images to produce 3D features can be tracked and identified. Several calibration and modeling techniques are also described, including calibrating stereo cameras, aligning stereo cameras to an inertial system, and making neural net system models. These methods help to improve the quality of the data and images acquired for the SLAM process.

The Robust Kalman Filter is an extension of the Kalman Filter algorithm that improves the ability to remove erroneous observations using Principal Component Analysis (PCA) and the X84 outlier rejection rule. Using PCA and X84 in the middle of a Kalman Filter is new, and assists with the use of mathematical filters in the real world. The technique allows systems to remove erroneous data from unreliable sources. This technique makes it feasible to accurately track humans, vehicles, or other objects given several sources of data.

Hierarchical Active Ripple SLAM (HAR-SLAM) is a new SLAM architecture that breaks the traditional state space of SLAM into a chain of smaller state spaces, allowing multiple tracked objects, multiple sensors, and multiple updates to occur in linear time with linear storage with respect to the number of tracked objects, landmarks, and estimated object locations. This technique allows tracking and mapping to occur in linear time, making it feasible to track many objects and generate maps in real time.

Landmark Promotion SLAM is a hierarchy of new SLAM methods. The main concept is a framework where mapped landmarks are promoted through various layers of SLAM. At each level only a small set of reliable landmarks are promoted to a higher algorithm. As an example, a fine resolution map is generated for a small area. Each reliable landmark from this map is promoted to a larger SLAM algorithm that combines landmarks from an entire region. Each reliable landmark from the region is promoted to a higher level that combines various sources of landmarks and regions to produce an even larger map. This allows large maps to be generated from various sources while keeping computational requirements low.

To implement various embodiments of the present invention, a simple hardware platform was used in order to map regions in GPS-denied environments. Many robotic platforms used for this purpose employ expensive sensors and focus only on performance and not the implementation. A LIDAR sensor, for instance, could cost $5,000. A lower cost solution was developed herein. Less expensive, off-the-shelf components were used so that robots could be easily build and could be expendable in certain missions. Using the robots to construct maps in GPS-denied areas will provide platforms a common map and coordinate system that can be used for other missions such as search and rescue, bomb disposal tasks, and others.

Challenges involved in building inexpensive robotic solutions for a cooperative SLAM application include managing sensor inaccuracy, map consistency, and computational complexity. Inertial measurement units have inherent noise. To perform dead reckoning positioning based on the accelerometer data, requires double integration of the data. Visual odometry requires single integration of data; however, it is difficult to find enough visual features to determine the motion of a robot. In addition, it is difficult to track points in a sequence of images across varying lighting conditions. Integrating motion information, from inertial or visual data, results in accumulating errors that are added to the path and map. Integrating errors causes position estimates to drift away from the true value, which makes the SLAM problem very important. With SLAM, building a map and tracking landmarks over time is computationally and spatially expensive. Both the computational expense and storage expense grows approximately with the number of landmarks squared.

Combining stereo vision with inertial navigation also proves challenging. In order to combine the two systems, high-speed computation is required to process the real-time images such that they match inertial measurements and correct them. False points and poorly tracked features will have to be removed from the visual data, and a considerable amount of calculations will go into combining the two systems. However, the hybrid system will drastically improve the dead reckoning of the system.

Image processing will also be difficult. Finding features to track, as near to real-time as possible for ego-motion calculations will be challenging. Additionally, 3D visual landmarks need to be investigated, characterized, and encoded such that they are distinct from other landmarks yet flexible enough to be recognized from various approaches.

Creating a cooperative SLAM system across many peer-to-peer nodes also poses a large challenge. With cooperative SLAM, there must be a networking system in place to accommodate a vast amount of real-time data sharing to facilitate mapping. The robots will have to share data with one another in order for them to build a consistent map. Algorithms will have to function without a lead or master robot, because every unit will be a peer. Therefore, no one robot can instruct other robots to perform a given action.

To create cost effective robots, inexpensive and data-rich sensors were utilized. A micro electromechanical system (MEMS) inertial navigation unit (INU) from TRX Systems was utilized for gyroscopic readings. In current MEMS INUs, the accelerometers are only good enough to indicate the direction of gravity. Inexpensive machine vision cameras were utilized for stereo vision, giving a rich set of ranges and landmark identification. Small pinging ultrasonic ranging sensors were used for obstacle avoidance and wall detection. An off-the-shelf remote control (RC) truck was used for the chassis. Most components were purchased off-the-shelf and assembled to construct the robots. The computing platform is an AOpen Mini PC, and a standard wireless router is used for networking. A DC voltage adapter and servo controller were utilized to help connect all these pieces. Additionally, an acquisition board was designed using a Microchip dsPIC microcontroller. Each robot costs approximately $2000-$3000, with the RC truck, INU, and computer being the three most expensive items.

A cooperative SLAM embodiment required integration of a series of theoretical advances and implementation advances. New theoretical advances include a nonlinear and non-Gaussian recursive (Kalman-like) Filter, a Robust Kalman Filter, and a tiered architecture for SLAM. This embodiment includes an image-based feature tracker, accurate camera calibration, an optical system with an inertial sensor calibration, encoder calibration, and neural net system modeling.

A feature tracker was created to perform stereo correspondence, identify features, and reliably track them over time. This method was called LK-SURF, since it leverages the Lucas-Kanade Tracker, and Speeded-Up Robust Features (SURF). This allowed each robot to use the inexpensive cameras to range to features accurately and establish a known correspondence, which simplifies the SLAM problem.

Several developments were made in filtering algorithms to make a new temporary SLAM called Forgetful SLAM. This method combines a kind of "Robust Kalman Filter," and nonlinear and non-Gaussian recursive filters to filter both robot positions, and the locations of visual features. This method can be extended to other sets of sensor observations that can be tracked. As its name implies, Forgetful SLAM does not retain features, but refines observations, refines the robot state, and correlates observed data.

Hierarchical Active Ripple SLAM (HAR-SLAM) was created to handle maps with a very large number of features, turn maps into chains of Kalman Updates, and handle multiple robot mapping. Landmark Promotion SLAM (LP-SLAM) uses HAR-SLAM as a theoretical backend, but limits what information is passed up the various levels of HAR-SLAM, making the system more robust and efficient. LP-SLAM is an implementation algorithm while HAR-SLAM is a theoretical contribution. LP-SLAM covers landmark spatial storage and landmark matching.

Techniques are described herein below processing objects in a multiple or high-dimensional space over time. The high-dimensional space can comprise, for example, a three dimensional space. Further, the high or three-dimensional space can include a plurality of corners. For example, the multi-dimensional space can correspond to an area, such as an indoor space of a building. The techniques can be applied such that a collection of images of the area captured over time are processed to create a map of the area or of a location thereat. The images can be captured and processed in real time to create the map.

In one embodiment, a method is described for tracking features over time. The method comprises acquiring a collection of images and one or more subsequent collections of images to create a high-dimensional space, wherein the collection of images and the one or more subsequent collections of images are substantially simultaneously captured from multiple sources, identifying a candidate feature in the high-dimensional space for tracking, and tracking the candidate feature in the high-dimensional space over time.

In another embodiment, a method is described for filtering outlier features from captured high-dimensional observations. The method includes mapping a high-dimensional feature into a one-dimensional space and applying an outlier rejection rule in the one-dimensional space to remove the mapped feature.

In yet another embodiment, a method is described for managing objects in a multi-dimensional space when the objects are no longer visible in a collection of images captured from the multi-dimensional space over time. The method comprises the operations of identifying one or more objects visible in a first image among the collection of images, adding the identified objects to a first list of tracked identified objects, tracking the identified objects from the first list of objects in one or more subsequent images among the collection of images, the one or more subsequent images being captured after capturing the first image, determining whether the tracked identified objects are absent in the one or more subsequent images, and removing, based on the determination, the tracked identified objects from the first list.

In a further embodiment, a method is described for creating a connected graph, by associating a first pose of a first sensor with landmarks detected in a first image from a multi-dimensional space acquired by the first sensor, adding the first pose and the landmarks to a state space, determining that the landmarks are absent from a second image from the multi-dimensional space acquired by the first sensor in a second pose, removing the landmarks from the state space based on the determination, correlating the first and second poses, and correlating the landmarks with the second pose.

In an embodiment, a method is described for promoting high-dimensional objects through various layers of a simultaneous location and mapping system. In this embodiment, the method comprises determining at a first level of the system a first set of reliable high-dimensional objects associated with a first mapped region, and promoting the first set of reliable high-dimensional objects to a second level of the system, wherein the second level combines the first set of reliable high-dimensional objects with a second set of reliable high-dimensional objects associated with a second mapped region to produce a map corresponding to a region larger than each of the first and second mapped regions.

In an additional embodiment, a method is described for creating a map of a high-dimensional area and locating the system on the map. The method comprises creating a state associated with stereo images of the area to be mapped, processing a first stereo image to identify a visual feature within the area, wherein the first stereo image is associated with a first pose of the system, processing a second stereo image to determine whether the visual feature is absent from the area in the second stereo image, wherein the second stereo image is associated with a second pose of the system, removing, based on the determination, the first pose and the visual feature from the state and send the first pose and the visual feature to a mapping module configured to maintain a structure that correlates poses and visual features, and creating a map of the area and at least one location of the system on the map.

In yet another embodiment, a method is described for updating features based on cooperation between multiple devices. The method includes the steps of receiving a visual feature, wherein the visual feature is identified in a three-dimensional image and is associated with a pose, wherein the pose is associated with a first device that captured the three-dimensional image, comparing the visual feature to visual features comprised in a database to find a match, transmitting the visual feature and the match to a module configured to maintain a map that correlates poses and visual features, determining whether the visual feature is over a quality threshold, and updating the visual feature with information received from a second device capturing three-dimensional images.

In an embodiment, the above described methods can be implemented on a system that comprises a processor and a memory communicatively coupled to the processor when the system is operational, the memory bearing processor instructions that, when executed on the processor, cause the system to execute the steps or operations of the above described methods.

In an alternate embodiment, the above described methods can be stored as instructions on a computer readable storage medium. The instructions, when executed by a processor, cause the processor to execute the steps or operations of the abode described methods.

There are two major problems when tracking stereo images over time: correspondence between stereo images, and correspondence over time. Stereo correspondence is where an algorithm must select a pixel or feature in one image and find the same pixel or feature in the other stereo image. This is a very basic, but difficult problem. The next problem is corresponding pixels or features over time. Simply determining where a pixel or feature moved over time.

Lucas-Kanade with Speeded-Up Robust Features (LK-SURF) is the proposed solution to the stereo correspondence over time problem. It uses newer feature extraction techniques to find features in each image. Unlike Harris Corners, these features have descriptors, making matching a much easier problem. The new descriptors are difficult to correspond exactly as they are not points, but small regions of the image. LK-SURF uses a sub-pixel routine to find the most prominent corner inside the small region of the feature. Using the most prominent corner allows temporal tracking of a feature using the LK tracker. At the same time, the most prominent corner provides sub-pixel accuracy on triangulation for better ranging. Using the descriptor of each feature, stereo correspondence becomes more robust than Harris Corner based methods or dense stereo methods, which pick the closest point.

Figure 2:
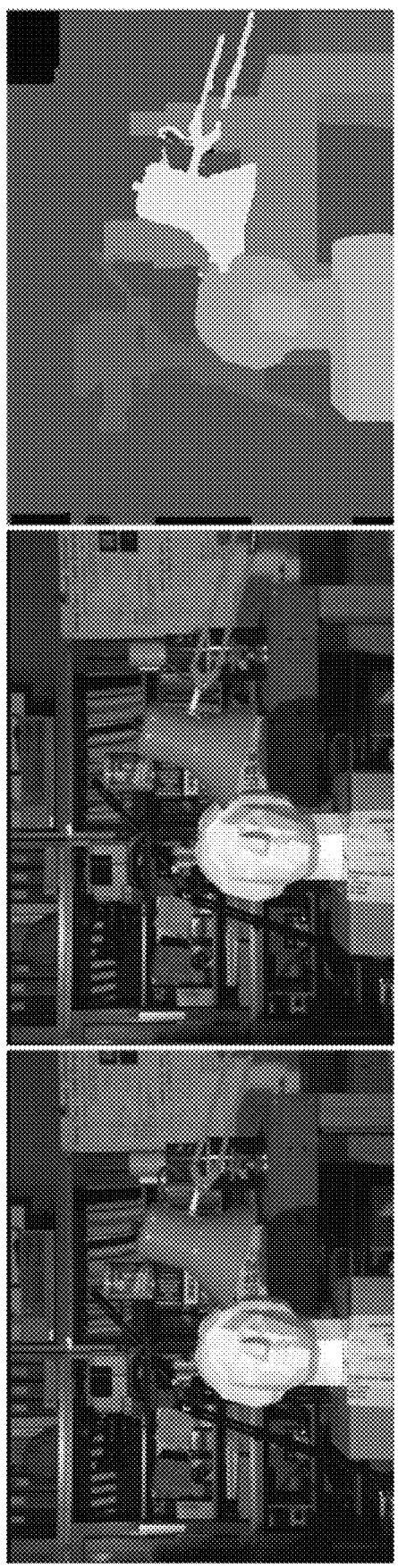

Temporal tracking and stereo correspondence have been solved individually. Stereo correspondence can be done with brute force methods that compare patches of pixels until a maximum correlation is found. These methods compute disparities, and the disparity is used to determine range from the camera. These methods are very time consuming and are near impossible to run in real time. These methods do not lend themselves well to tracking features over time since they provide no descriptors or points to track. Stereo correspondence has been done with SIFT, SURF, and other feature extractors, where features are selected from each image, and then correlated using feature descriptors. This approach is generally much faster than the per-pixel or dense disparity approaches, but only contains a sparse set of data. Dense disparity can be accelerated with hardware, however, the resolution and accuracy is not as easily obtained as with sparse features. Looking at FIG. 2, the depth is estimated per pixel (represented as a grayscale value). With this sample, it is worth noting the lack of resolution, the missing sections of the lamp, and the entire bookshelf is valued at the same distance. This type of stereo correspondence does not work well for large disparities, or large distances; the sub-pixel accuracy is not feasible because correspondence is done per pixel to match another pixel.

Figure 3:

Correspondence over time can be done in several ways. The most common way is to use a Lucas-Kanade tracker, as mentioned in the previous section. Other ways include matching features over time using SIFT and SURF. The major drawback to using SIFT or SURF over time is that the exact same feature is not guaranteed to be found, and if it is found, there is no guarantee on accuracy. These feature extractors were designed for object recognition, not for optic flow, or precise tracking. FIG. 3 shows an example of optic flow using SURF. The solid lines connect the position of matched features between the last and current image. Ideally, the lines should all be small and in the same general direction. In reality, there are many incorrect matches, and even matches that seem correct do not all have the same direction.

The natural solution to this problem is to combine the most efficient and reliable methods into a single solution for tracking stereo features over time. Initially features are created by extracting SURF features from the left and right camera image. These features are validated using epipolar geometry determined during camera calibration. Each feature is then placed into a Lucas-Kanade feature tracker with inverted pyramids and tracked frame-to-frame over time. The Lucas-Kanade tracker is used on both the left and right camera frames. There is no guarantee that selected features from SURF will be unique enough to track. To correct this problem, the most prominent corner bounded by the feature is discovered using a sub-pixel corner finding routing. This sub-pixel routine is the same standard techniques as found with the Lucas-Kanade optic flow algorithm. The sub-pixel refinement attempts to find a corner or saddle point in the image, thus increasing the reliability of the feature making it easier to track. If the point is not found, the feature is discarded. Overall, features are tracked in both left and right camera frames, refined, and validated with epipolar geometry to determine if they are still candidate features for tracking. Table 1 shows the algorithm for LK-SURF.

TABLE 1

Outline of LK-SURF algorithm

SURF Feature Initialization

Extract left features using SURF
Extract right features using SURF
Refine left feature locations to sub-pixel accuracy
Refine right feature locations to sub-pixel accuracy
Match stereo features using SURF, TABLE 1-continued Outline of LK-SURF algorithm filter features with a matching strength criteria
Validate stereo match using epipolar geometry
Return all validated stereo matches
Stereo LK Feature Tracking Initialize left Lucas-Kanade tracker with all known left features
Initialize right Lucas-Kanade tracker with all known right features
Track left features on the new left image
Track right features on the new right image
Validate newly tracked stereo features using epipolar geometry
Return all validated and updated stereo matches
LK-SURF Get input of latest stereo images
Update current features using Stereo LK Feature Tracking
If there are too few current features, or the current features
are not covering all four quadrants of the image then
    Get new features using SURF Feature Initialization
    Append new features to the list of current features
Return current features Thus, LK-SURF combines two well-known algorithms into a single useful solution. Only a few other paper mentions combining SURF with a Lucas Kanade tracker [10][11], however, these researchers only use this combination for a single camera and track a face or a person. The method was not used for stereo correspondence or for robotics. FIG. 4 shows a sample screenshot of two stereo image pairs in sequence with matched features. The newer image on the bottom retains many of the same features from the top image, demonstrating the temporal tracking of spatial features by LK-SURF.

LK-SURF allows complete 3D tracking of features over time. A feature has a known range and bearing from the stereo camera rig, and it can be tracked over time, giving us a full 6 degree-of-freedom estimate using egomotion. FIG. 5 shows a comparison of a sample path made using SURF and LK-SURF. Both algorithms produce stereo features over time. These features over time are used to calculate the full egomotion the cameras underwent to produce the travelled path. The exact same procedure, match rejection, and data was applied with SURF and LK-SURF, yet the results are quite different. Neither path is perfect, but the SURF path has many discontinuities, incorrect motion, and does not return to the starting position.

Using SURF produces much faster results than SIFT. When testing the OpenCV implementation of the two algorithms, SURF consistently performed 10 times faster than SIFT [9][12]. Several other methods were tested, but not worth mentioning. SURF was the most practical choice for stereo correspondence. SURF produces feature locations at sub-pixel coordinates, giving a high level of accuracy. Lucas-Kanade feature tracking works at the sub-pixel level as well, and can track features well within a given pixel window.

There are two main disadvantages of LK-SURF. First, SURF stereo matching is not guaranteed to correlate stereo features correctly—this is true of SURF and other descriptor methods as well. Even though epipolar geometry is used to validate stereo matches, it is possible, especially with repeating patterns, to have an incorrect match. Other depth sensors such as LIDAR or SONAR do not suffer from this correspondence issue and can give better depth estimates to features.

The other disadvantage is that the Lucas-Kanade feature tracker was not designed for SURF features, it was designed for corners, and specifically corners detected using a Harris Corner Detector (as mentioned above). Sub-pixel refinement is used to find the most prominent corner within the SURF feature, but is not guaranteed to find a corner that is suitable for the LK tracker. This disadvantage can result in the LK tracker incorrectly tracking SURF features; in particular, if the SURF feature is large and its center does not have any properties resembling a corner, making it a bland or uninteresting feature. This type of feature cannot be tracked well and will usually move incorrectly or not move at all. Epipolar geometry is used to validate against this if the left and right features do not move in the same way, however this might not always filter out features. FIG. 6 has a top-down view of features projected into 3D away from the camera shown on top and the source images on the bottom. The picture shows a collection of features, circled in the top rectangular box of FIG. 6, that were not correctly tracked. These incorrectly tracked features usually move in a completely erratic direction compared to the other features in the image.

LK-SURF was created to allow 3D ranging to environmental features and to solve the correspondence problem in an efficient manner. Knowing that a stereo video stream is being taken, stereo features can be correlated over time, which acquires an accurate estimate of the same 3D feature over time. This algorithm allows for accurate egomotion calculations to occur in 3D, and eliminate the entire correspondence issue in SLAM. This algorithm was developed in response to the poor performance of feature matching over time with SURF and the errors the invalid matches caused.

The Kalman Filter is the optimal solution to finding the best estimate of the state of a linear dynamics system with independent Gaussian noise. A practical problem with using the Kalman Filter is that it is designed for Gaussian noise. When unmodeled outliers are observed, the Kalman Filter does not yield expected results. This attribute makes the Particle Filer more desirable in robotics; however, what if the Kalman Filter could be more robust to outliers? The Robust Kalman Filter works with systems that have many independent observations at once, as with LIDAR range finders, a collection of points found in 3D through cameras. Typically, robust filters simply remove outliers before entering the Kalman Filter stage, but this is not always feasible, nor is it reliable given that predictions and deviations from expectations need to be considered.

A commonly used outlier rejection mechanism in statistics is the X84 outlier rejection rule [13]. The X84 outlier rejection rule uses the median and median absolute deviation (MAD) to remove outliers instead of the traditional mean and standard deviation of a series of data. The X84 rule works with single dimension statistics, outliers are removed if they are more than a certain number of MADs away from the median. The X84 rule is used in image processing for 2D feature tracking to remove outliers that do not agree with the general affine transformation of the image [14]. The same idea is extended to the Kalman Filter, but instead of 1D or 2D, the filter works with any number of dimensions.

Embodiments require robust filtering of 3D image features and the effect each observation has on a robot pose of seven dimensions, which is not covered by the X84 rule. A common mechanism in statistics and computer vision is Principal Component Analysis (PCA), which can be used to transform high dimensional states into low order spaces [15]. PCA works well in reducing high dimensional states into low spaces as shown in the Eigenface algorithm for face recognition, which uses PCA to reduce images into low orders spaces [16]. Data projected along the first principal component has the highest variance in a single dimension, thus change in robot pose caused by an observation is projected to a single dimension using PCA [15].

The Robust Kalman Filter removes observations between the prediction and update stage of the Kalman Filter. After the system is predicted, observations are predicted. The Kalman gain associated with each observation is estimated separately and used to determine how much each observation changes the state. Each observation generates a vector in the same dimension as the robot pose, which indicates how much the single observation affects the state. PCA is used to map the vectors into a single dimension. The X84 rule is applied on the mapped vectors, removing all observations that are beyond a certain number of MADs away from the median. The remaining observations are applied to the state using the normal Kalman Filter update stage.

The first step in removing outliers is finding a way to map the high-dimensional observations into a one-dimensional space. One area of inspiration comes from FastSLAM, where particles in FastSLAM are weighted based on observations matching expectations [17]. With FastSLAM, each observation is given a weight based on the expected observation, the actual observation, and the covariance of the observation. The weights in FastSLAM assume perfect state knowledge to produce a weight. The Robust Kalman Filter uses a different weighting metric; the weight is derived from the observation covariance and expectation covariance since a perfect state is not assumed. The Robust Kalman Filter uses the actual effect the observation has on the state if the optimal Kalman gain is applied from the difference between the observation and predicted observation. By using the change in the state as a common metric, many observations of different dimensions can be compared. Instead of comparing just the magnitude of error from the prediction, a more accurate mapping uses PCA to produce the largest variation amongst the mapped data [15]. In the simplest form, the largest eigenvector of the observed changes to the system is the largest principal component. Table 2 shows the equations used to map the observations into a single dimensional weighting, where the weight of each observation is based on a multivariate normal distribution from the predicted observation, multivariate normal distribution from the state prediction, the Kalman gain, and the PCA mapping.

TABLE 2

Observation weighting for removal

Observation Weighting:
$Z_i$ = Observation
$Z_i^{Predicted}$ = Predicted Observation
$Q_i$ = Observation Covariance
$P$ = State Covariance
$H_i$ = Observation Jacobian
$w_i$ = Observation Weight
$K = PH_i^T (H_i P H_i^T + Q_i)^{-1}$
$x_i = K(Z_i - Z_i^{Predicted})$ $$\bar{x} = \frac{1}{n} \sum_{i=1}^{n} x_i$$

$$\tilde{X} = \sum_{i=1}^{n} (x_i - \bar{x})(x_i - \bar{x})^T$$

$v$ = largest eigenvector by eigenvalue of ($\tilde{X}$)
$w_i = v^T x_i$

The X84 outlier rejection rule [13] uses the median as the center of the data instead of using the mean of a set of data. Furthermore, instead of using the standard deviation, use the median absolute deviation (MAD) as shown in Table 3. The use of this rejection rule can be viewed as determining the corrupted Gaussian that has been altered by the addition of outliers [13][14]. The median and MAD are not affected by outliers, unlike the mean and standard deviation. With a Gaussian distribution, 1.4826 MADs is equivalent to a standard deviation. The original X84 rule allows any value of k (the number of MADs away from the median); however, the best value when applied to removing outliers generated by LK-SURF is three. Three MADs are nearly equivalent to two standard deviations under a Gaussian distribution [13]. Under a pure Gaussian distribution, three MADs cover 95% of the data, which means if the observed features had pure Gaussian distributions, only 5% would incorrectly be removed.

TABLE 3

Outlier removal for single dimensional arrays

Outlier Removal:

$$\text{mad}(X) = \underset{x \in X}{\text{median}}(|x - \text{median}(X)|)$$

lowerBound(X, k) = median(X) − k*mad(X)
upperBound(X, k) = median(X) + k*mad(X)
$X_{filtered}$ = {upperBound(X, 2) ≥ x ≥ lowerBound(X, 2) | x ∈ X}

Using PCA to map the change in system state to a single dimensional weighting works well due to the sensitivity of PCA [15]. PCA will give the principal vector that causes the data to have the highest variance in one dimension. This technique is sensitive to outliers, causing outliers to appear at extremes. Combining PCA with the X84 rule provides a robust way to remove outliers. This technique is agnostic to the number of dimensions, number of measurements, and even if the observations are of different dimensions, the weighting is based on the how much the state is affected.

In order to incorporate these weighting and outlier removal functions, the Kalman Filter needs some modifications. After the prediction stage, the next step in the measurement stage is to calculate the residuals. Here the new section is injected, before the residuals are calculated. The weighting function is passed the predicted state, the predicted state covariance, the predicted measurement values, the actual measurement values, the observation H matrix, and the observation covariance R. Assuming that each observed feature is independent from other features, we can extract each feature's covariance from R and each feature's expected value and measured value. Each feature is given a weight according to Table 2, and then the entire set of features is filtered based on the calculated weight as described in Table 3. Table 4 shows the entire Robust Kalman Filter. A version of the Robust Kalman Filter for nonlinear system dynamics would have the exact same modifications as the Extended Kalman Filter. If there are observations that cannot be placed into the robust observations section, or the implementer simply does not want the observation to be removed, then simple additions are made. An additional observation and update stage are applied after the prediction stage but before the robust removal. This is equivalent to two Kalman Filters operating in series, first the state is updated using sensors that are not to be removed, and then a second robust filter is applied where the system dynamics are the identity function since no time has passed.

The filters are applied in this order to ensure that the outlier removal stage has the best estimate for the state prediction and observation prediction.

TABLE 4

Robust Kalman Filter algorithm

System Equations: $x_k = F_k x_{k-1} + B_k u_k + w_k$   $z_k = H_k x_k + v_k$
$w_k \sim N(0, Q_k)$   $v_k \sim N(0, R_k)$ Prediction Phase:
Predicted state: $\hat{x}_{k|k-1} = F_k \hat{x}_{k-1|k-1} + B_{k-1} u_{k-1}$
Predicted estimate covariance: $P_{k|k-1} = F_k P_{k-1|k-1} F_k^T + Q_{k-1}$ Removal Phase:
Measurement prediction: $\tilde{z}_k = H_k \hat{x}_{k|k-1}$ Calculate observation weights:
$$\begin{cases} \forall i \in \text{observed features} \begin{cases} K = PH_i^T(H_i PH_i^T + R_k)^{-1} \\ x_i = K(Z_i - Z_i^{Predicted}) \end{cases} \\ \bar{x} = \frac{1}{n}\sum_{i=1}^{n} x_i \quad \tilde{X} = \sum_{i=1}^{n}(x_i - \bar{x})(x_i - \bar{x})^T \\ v = \text{largest eigenvector by eigenvalue of } (\tilde{X}) \\ \forall i \in \text{observed features}\{w_i = v^T x_i\} \end{cases}$$

Calculate feature to remove:
$$\begin{cases} \text{mad}(X) = \underset{x \in X}{\text{median}}(|x - \text{median}(X)|) \\ lb(X, k) = \text{median}(X) - k * \text{mad}(X) \\ ub(X, k) = \text{median}(X) + k * \text{mad}(X) \\ I_{keep} = \{i \mid ub(W_k, 2) > x > lb(W_k, 2), w_k^i \in W_k\} \\ M_k = \text{row reduced identity matrix of} \\ \text{size}(\text{length}(I_{keep}) * sizeof(\text{feature}), sizeof(z_k)) \end{cases}$$

Reduce prediction: $\hat{\tilde{z}}_k = M_k \tilde{z}_k$

Reduce observation: $\hat{z}_k = M_k z_k$
Reduce observation matrix: $\hat{H}_k = M_k H_k$
Reduce observation covariance: $\hat{R}_k = M_k R_k M_k^T$ Update Phase:
Measurement residual: $\hat{y}_k = \hat{z}_k - \hat{\tilde{z}}_k$ Residual covariance: $S_k = \hat{H}_k P_{k|k-1} \hat{H}_k^T + \hat{R}_k$
Kalman gain: $K_k = P_{k|k-1} \hat{H}_k^T S_k^{-1}$
Updated state estimate: $\hat{x}_{k|k} = \hat{x}_{k|k-1} + K_k \hat{y}_k$
Updated estimate covariance: $P_{k|k} = (I - K_k \hat{H}_k) P_{k|k-1}$ The Robust Kalman Filter can easily be extended to nonlinear systems through the exact same process as the Extended Kalman Filter. Simply obtaining the state matrices through Jacobians will suffice. The Unscented Kalman Filter is a possible alternative, but requires the recalculation of sigma points once observations are removed.

Modifying this filter for observations that are not collections of ranging data or feature positions is possible. Simply expanding the system state to include a time history and expand the measurements to be a time history will allow the filter to perform Robust Kalman Filtering against a time series of data, where particular samples can be removed. This can be forward looking, backward looking, or both to any degree, resembling a median filter.

Observations that the implementer does not wish to include in the Removal Phase should be applied to the system before the Removal Phase. The standard Kalman Filter observation stage and update stage should be applied to the system using the selected observations. This is equivalent to performing a Kalman Filter on system using the selected observations, then performing the Robust Kalman Filter on the system using the identity function as the system dynamics since no time has passed. This gives the system the best estimate of its current state before comparing the removable observations to the system.

The Robust Kalman Filter was designed for eliminating outliers. The stereo cameras on the test platform sense the location of 3D features using LK-SURF. LK-SURF removes many outliers using SURF feature matching techniques, and using epipolar geometry; however, it does not remove all outliers. The Robust Kalman Filter does not suffer as much from poorly matched or tracked features, which drastically alter the estimated position of the robot in the Kalman Filter. Poorly matched or tracked features cannot be modeled as Gaussian noise as they are incorrectly matched in a separate process and are not based on noise, but on shortcomings of real life algorithms. It is possible that the environment is not completely static, which introduces many more errors that are not modeled. So long as 50% of the observed features align with the expected model, the X84 outlier rejection rule should work [14].

Figure 7:
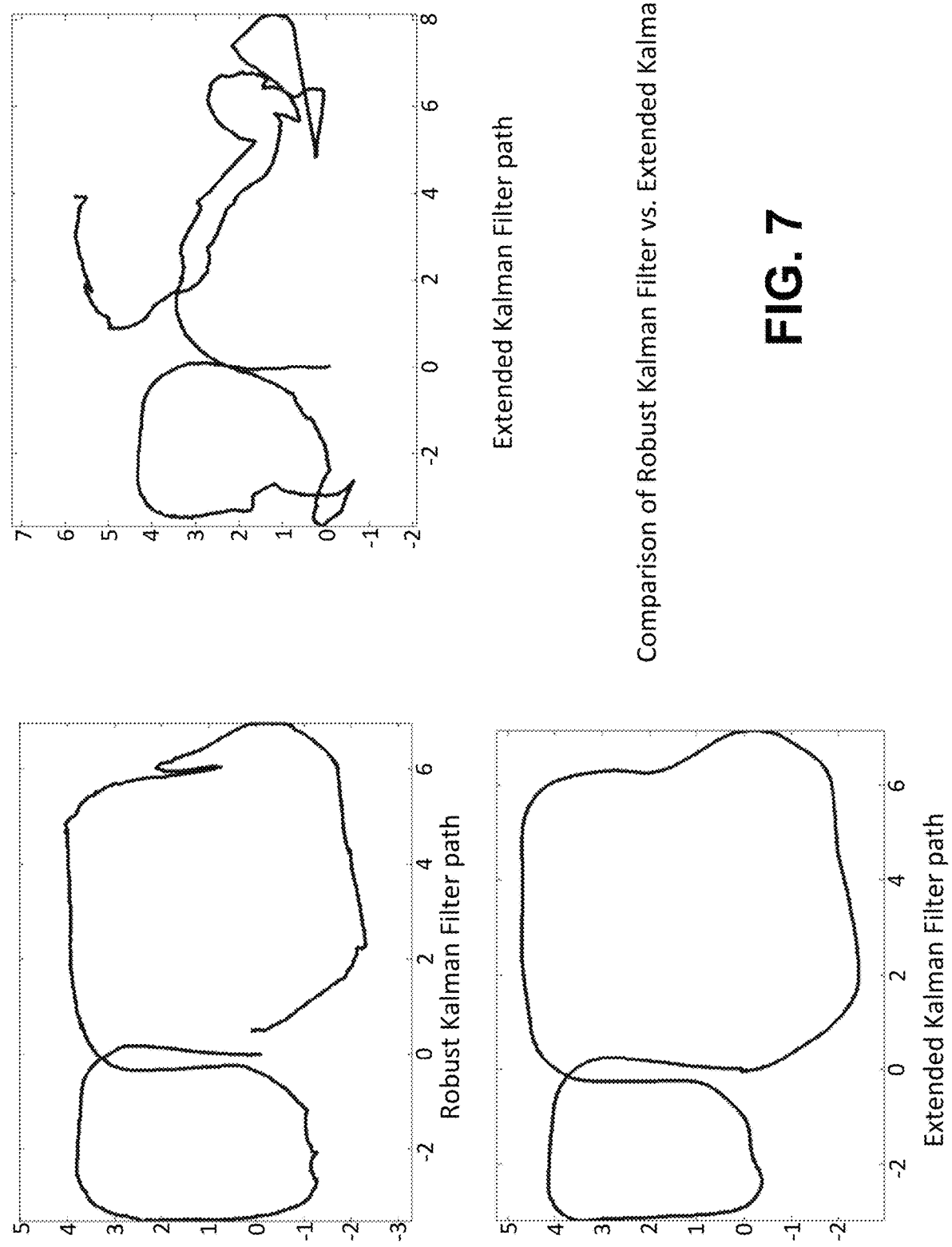

FIG. 7 shows two paths generated by Forgetful SLAM using the same data. Forgetful SLAM uses a linearized version of the Robust Kalman Filter. For comparison, the robust filer is replaced with an EKF. The normal Forgetful SLAM routine with the Robust Kalman Filter is shown on the left, while the right has the EKF. The EKF version cannot handle the unexpected observations and produces large errors in the path. The Robust Kalman Filter removes outliers and produces a reasonable path. The Robust Kalman Filter is not perfect; on the right side of the plot, some outliers affect the path. It appears to correct itself, but that is merely luck. The estimated true path is shown on the bottom of the figure as a reference. The estimate is made using scale corrected wheel encoders and drift corrected gyroscopic angles, such that the path ends in the correct location.

In order to determine if the Robust Kalman Filter actually removed outliers, a series of paths were compared. The set of paths are taken over different distances and in different shapes. Comparisons are made between an inertial path based on wheel encoders and gyroscopic angle, Forgetful SLAM using an EKF, and Forgetful SLAM using a linearized version of a Robust Kalman Filter. The inertial path does not include visual features from LK-SURF; this path is included as a baseline. Each path is given an estimate percent error over distance travelled. The wheel encoders measure the total distance travelled, and the error is determined by how far the end of the path is from the true location. In each of the test paths, the true location of the end of path is the same as the start location.

TABLE 5

Filter performance comparison using percent error over distance travelled. Eight paths used to compare inertial paths, Robust Kalman Filter paths, and Extended Kalman Filter paths.

| Path | Wheel Encoder and Gyroscope Path | Forgetful SLAM using an EKF | Forgetful SLAM using Robust Kalman Filter |
|---|---|---|---|
| Short Clockwise Path | 0.85% | 2.75% | 1.06% |
| Short Counterclockwise Path | 2.62% | 22.99% | 2.59% |

TABLE 5-continued

Filter performance comparison using percent error over distance travelled. Eight paths used to compare inertial paths, Robust Kalman Filter paths, and Extended Kalman Filter paths.

| Path | Wheel Encoder and Gyroscope Path | Forgetful SLAM using an EKF | Forgetful SLAM using Robust Kalman Filter |
|---|---|---|---|
| Long Clockwise Path | 2.44% | 2.48% | 1.76% |
| Long Counterclockwise Path | 3.65% | 24.65% | 3.23% |
| Figure-Eight Path | 2.75% | 18.41% | 1.35% |
| Four Loop Path | 3.85% | 8.50% | 2.65% |
| Unusual Search Path | 8.34% | 169.83% | 3.45% |
| High Speed Dynamics Test Path | 7.34% | 10.41% | 1.61% |

Table 5 contains the percent error over distance for various paths and filters. The Robust Kalman Filter usually performed the best. In order to improve the simple encoder and gyroscope path, the Robust Kalman Filter and EKF must correct small deviations in distance and gyroscopic drift. Given that image features have no drift, and provide another source of data for distance, the Robust Kalman Filter and EKF have the capability to perform better than the simple path if outliers are removed. The EKF always performed worse than the simple path and the Robust Kalman Filter.

When the EKF appears to perform similarly to the Robust Kalman Filter and simple path, based on percent error over distance travelled, the path shape is visually incorrect. Table 6 shows a set of small images of each path. This table is presented to show the various path shapes, and visually how each filter performed on the path. The Robust Kalman Filter consistently matches shape to the simple encoder and gyroscopic path. The EKF path suffers from outliers, causing the path to be distorted.

Given the examples in this section, the Robust Kalman Filter appears to remove most outliers. It is not immune to outliers; some paths show anomalies indicating outliers are present. The outlier rejection rule used only works when outliers make up less than 50% of the samples. There is no guarantee that there are any correctly tracked features from LK-SURF, therefore incorrect features can enter the filter. The Robust Kalman Filter consistently performs better than the EKF based on percent error over distance travelled and heuristically based on path shape.

The Robust Kalman Filter was created in response to the poor performance of the EKF using the features tracked with LK-SURF. Kalman-based filters typically cannot ignore any anomalies, and a simple mean or median filter on the data appear to be superior to the EKF. Seeing this as the major disadvantage of the EKF, the Particle Filter was investigated; however, its implementation was far too computationally expensive, and did not make corrections to the state, the filter simply propagated particles that agreed with measurements.

Robust Kalman Filter is used herein for the low-level sensor fusion, where the random anomalies of the optical system require filtering. The optical system performs stereo feature matching, and is subject to various sources of error. Hardware limitations with the camera create typical Gaussian distributions, but in addition to modeled noise, the system has the non-Gaussian errors of selecting features, and matching features. Since the optical system is a major component of the implemented version of Cooperative SLAM described herein, it is important to remove unexpected noise early. The Robust Kalman Filter is directly used in Forgetful SLAM.

Many SLAM techniques suffer from the computational complexity of maintaining a growing state. Either more particles are required to track more landmarks, or the state of the system increases with each landmark. At best, the increased state causes quadratic growth in computational complexity. To address in this problem, Forgetful SLAM prunes out landmarks that are no longer visible or have not been visible for some set time once it has reached a set cap for landmarks that can be tracked. MonoSLAM briefly talks about state reduction to improve speed, but instead limits the method to only a single room where all features are revisited often[18]. By specifying a rule to forget landmarks, the chosen SLAM method can operate in constant time for each iteration and remain computationally tractable.

The shortcoming of this method is that by forgetting landmarks, the algorithm no longer improves them over time. This piece should be thought of as a high-resolution local tracking stage. The shortcoming is addressed below where another algorithm is built on top of Forgetful SLAM that promotes some "good" landmarks. Landmarks with small covariance matrices are promoted to higher-level algorithms, which can use these "forgotten" landmarks for higher-level corrections. The combination of the two methods provides a hierarchical structure for developing large maps in a computationally tractable way.

Until a landmark is revisited, standard SLAM routines will improve the locations of previously seen landmarks in a diminishing way that yields very little benefit. Sparsification is based on a similar concept, where the map is broken into smaller maps since the off diagonals of the state information matrix approaches zero as time goes on[19]. Instead of breaking the map into smaller maps and reassembling them, we simply run an online Forgetful SLAM that discards landmarks that are no longer seen.

Similar to the Robust Kalman Filter, landmarks can be removed from the state under a certain filtering rule. Once removed, the state becomes much smaller and becomes more manageable. A simple rule we implemented is to forget a landmark once it is no longer visible. LK-SURF is able to track features in 3D space for as long as the feature is visible; this removes the computational complexity of associating prior landmarks from this local tracking stage. Forgetful SLAM does not perform feature association, it assumes another method like LK-SURF will track feature IDs. By forgetting features that are no longer visible, Forgetful SLAM reduces the state to the smallest size necessary to predict the given observations. Since LK-SURF will not give revisited features the same ID once it was lost, there is no need for Forgetful SLAM to remember the lost feature. Erroneous features removed by the Robust Kalman Filter method are tracked by Forgetful SLAM in a list so they can be prescreened from subsequent iterations of the filter. This ensures that incorrectly tracked features will not accidentally be reintroduced or promoted to higher level SLAM. This was addressed due to issues with LK-SURF that lead to the occasional incorrectly tracked feature.

The standard state space model and special notation used in Forgetful SLAM is shown in Table 7. This notation keeps track of feature IDs without placing them incorrectly into the state. Unlike positions and headings, feature IDs cannot be improved upon and therefore should not be included in the state vector or covariance matrix since there is no certainty or corrections available. Table 7 takes into account the system dynamics, sensor observation functions, and landmark observation functions.

TABLE 7

System equations and notation

System Equations:
$x_k = f(x_{k-1}, u_k) + w_k$
$z_k^i = h(x_k) + v_k$
$z_k^i = h_{feature}(x_k, m^i) + v_k^i$
$m^i = h_{feature}^{-1}(x_k, z_k^i)$
$w_k \sim N(0, Q_k)$
$v_k \sim N(0, R_k)$
$v_k^i \sim N(r(x_k, m^i), R(x_k, m^i))$ Jacobian Linearization:
$F_k = \left.\frac{\partial f}{\partial x}\right|_{\hat{x}_{k-1|k-1}, u_k}$  $H_k = \left.\frac{\partial h}{\partial x}\right|_{\hat{x}_{k|k-1}}$  $H_k^i = \left.\frac{\partial h}{\partial x}\right|_{\hat{x}_{k|k-1}, m^i}$ $H_{mx}^j = \left.\frac{\partial h^{-1}}{\partial x}\right|_{\hat{x}_{k|k-1}, z^j}$  $H_{mz}^j = \left.\frac{\partial h^{-1}}{\partial z}\right|_{\hat{x}_{k|k-1}, z^j}$ State: X Covariance: P Pose: $x_k$ Landmark: $m^i$ State Notation with Maps:
$X_k = \begin{bmatrix} x_k \\ m^1 \\ \vdots \\ m^n \end{bmatrix}$ List Notation: $\langle \rangle$ The Forgetful SLAM algorithm is composed of several stages. The first and key part of Forgetful SLAM is the removal of features. Features are removed by a predetermined rule, in this case once they are not observed. Table 8 shows the algorithm for removing features from current state and map. This algorithm is modified in a later section. The modification is made in order to preserve information from the feature removal for use in the global map. The feature removal algorithm simply finds all features not observed and creates a reduced identity matrix to trim down both the state mean vector and state covariance matrix.

TABLE 8

Algorithm for removing lost features

RemoveLostFeatures
Input: $(X, P, \langle ID_{current} \rangle, \langle ID_{observed} \rangle)$
Output: $(X_{reduced}, P_{reduced}, \langle ID_{reobserved} \rangle)$:
$\langle ID_{reobserved} \rangle = \langle ID_{current} \rangle \cap \langle ID_{observed} \rangle$ $\langle ID_{lost} \rangle = \bigcup_{i \in \langle ID_{current} \rangle} i \notin \langle ID_{observed} \rangle$ F = identity
For each ID in $\langle ID_{lost} \rangle$ find the index j in $\langle ID_{current} \rangle$ $F_j = \begin{bmatrix} 1 & 0 & \cdots & 0 & 0 & 0 & 0 & 0 & 0 & 0 \\ 0 & 1 & \ddots & 0 & 0 & 0 & 0 & 0 & 0 & 0 \\ \vdots & \ddots & \ddots & 0 & 0 & 0 & 0 & 0 & 0 & 0 \\ 0 & 0 & 0 & 1 & 0 & 0 & 0 & 0 & 0 & 0 \\ 0 & 0 & 0 & 0 & 0 & 0 & 1 & 0 & \cdots & 0 \\ 0 & 0 & 0 & 0 & 0 & 0 & 0 & 1 & \ddots & 0 \\ 0 & 0 & 0 & 0 & 0 & 0 & \vdots & \ddots & \ddots & 0 \\ 0 & 0 & 0 & 0 & 0 & 0 & 0 & 0 & 0 & 1 \end{bmatrix}$
Elements before index j | State pertaining to index j | Elements after index j $F = F_j F$
$X_{reduced} = FX$
$P_{reduced} = FPF^T$ The next part of Forgetful SLAM is common to many SLAM algorithms. This is the addition of newly seen landmarks or features into the current map as shown in Table 9. This stage occurs before any Kalman updates in order to allow the landmarks to develop a cross-covariance from the common observation. An inverse observation function is expected to exist, where given a pose and measurement, a landmark can be created. A complication occurs with non-zero mean error distributions, which is the case for our optical ranging system. Technically, a limit needs to be calculated in order to predict where a landmark is located given a nonzero mean estimate. Once the landmark has an estimated location it can be initialized with the measurement noise. To approximate this, a two-step iteration has been implemented, and in practice has provided sufficient accuracy. $\hat{z}$ is the result of the nonzero mean calculated from a one stage guess of the landmark location assuming the measured range is perfect. The state and covariance are expanded using as the parameter passed to the inverse observation function.

TABLE 9

Algorithm for adding new features

AddNewFeatures
Input: $(X, P, \langle ID_{reobserved} \rangle, \langle Z \rangle, h_{feature}^{-1}, r, R)$
Output: $(X_{expanded}, P_{expanded}, \langle ID_{expanded} \rangle)$:

$\langle ID_{new} \rangle = \bigcup_{i \in \langle ID_{observed} \rangle} i \notin \langle ID_{reobserved} \rangle$ $\langle ID_{expanded} \rangle = \langle ID_{reobserved} \rangle \cup \langle ID_{new} \rangle$
$X_{expanded} = X$
$P_{expanded} = P$
For each $ID_j$ in $\langle ID_{new} \rangle$
$\hat{z} = z^j - r(x, h_{feature}^{-1}(x, z^j))$ $X_{expanded} = \begin{bmatrix} X_{expanded} \\ h_{featured}^{-1}(x, \hat{z}) \end{bmatrix}$ TABLE 9-continued Algorithm for adding new features $$P_{expanded} = \begin{bmatrix} P_{expanded} & 0 \\ 0 & H_{mz}^j R(x, h_{feature}^{-1}(x, \hat{z})) H_{mz}^{j\,T} + H_{mx}^j P_{pose} H_{mx}^{j\,T} \end{bmatrix}$$

The entire Forgetful SLAM algorithm is shown in Table 10. It contains two feature management stages. In the first stage, all observed features are prescreened against a known list of landmarks that are not reliable. Next unseen features are removed using the algorithm from Table 8. The next stage is the standard prediction stage using the same steps as the Extended Kalman Filter. This stage takes into account the dynamics of the system. The normal Kalman update stage comes next for all non-landmark observations. Next, the robust observation stage comes from the Robust Kalman Filter discussed above. In this step, all landmarks are weighted based on their difference of expected value and outliers are removed.

TABLE 10

Algorithm of Forgetful SLAM

ForgetfulSLAM
    Input: $(X_{k-1}, P_{k-1}, \langle ID_{state}\rangle_{k-1}, z_k, \langle Z\rangle_k, \langle ID_{observed}\rangle_k, u_k)$
    Output: $(X_k, P_k, \langle ID_{state}\rangle_k)$:
Feature Management Stage 1:
    Remove observations previously marked in $\langle ID_{remove}\rangle$
    $(X_{reduced}, P_{reduced}, \langle ID_{reobserved}\rangle) =$
    RemoveLostFeatures $(X_{k-1}, P_{k-1}, \langle ID_{state}\rangle_{k-1}, \langle ID_{observed}\rangle_k)$
Prediction Stage:

$$X_{predict} = \begin{bmatrix} f(x_{k-1}, u_k) \\ m^1 \\ \vdots \\ m^n \end{bmatrix}$$

$$P_{predict} = \begin{bmatrix} F_k & 0 & \cdots \\ 0 & 1 & \ddots \\ \vdots & \ddots & \ddots \end{bmatrix} P_{reduced} \begin{bmatrix} F_k^T & 0 & \cdots \\ 0 & 1 & \ddots \\ \vdots & \ddots & \ddots \end{bmatrix} + \begin{bmatrix} Q_k & 0 & \cdots \\ 0 & 0 & \ddots \\ \vdots & \ddots & \ddots \end{bmatrix}$$

Update Stage 1:
    Update $X_{predict}$ and $P_{predict}$ using a standard Extended Kalman Update with non-landmark based sensor observations and dynamics
Robust Observation Stage:

$$\forall i \in \text{observed features} \begin{cases} \tilde{z}_k^i = h_{feature}(\hat{x}_k, m^i) + r(\hat{x}_k, m^i) \\ K = PH_i^T(H_iPH_i^T + R_k)^{-1} \\ x_i = K(z_k^i - \tilde{z}_k^i) \end{cases}$$

$$\bar{x} = \frac{1}{n}\sum_{i=1}^{n} x_i \quad \tilde{X} = \sum_{i=1}^{n}(x_i - \bar{x})(x_i - \bar{x})^T$$

v = largest eigenvector by eigenvalue of $(\tilde{X})$
$\forall i \in$ observed features $\{w_i = v^T x_i$
Get $\langle ID_{reduced}\rangle$, and $\langle ID_{remove}\rangle$ from the Robust Kalman Filter Removal Phase
$(X_{predict}, P_{predict}, \langle ID_{state}\rangle_k) =$
RemoveLostFeatures $(X_{predict}, P_{predict}, \langle ID_{reobserved}\rangle, \langle ID_{reduced}\rangle)$
Update Stage 2:
    For each feature in $\langle ID_{reduced}\rangle$:
    $\tilde{z}_k^i = h_{feature}(\hat{x}_k, m^i) + r(\hat{x}_k, m^i)$ $$F_j = \begin{bmatrix} 1 & 0 & \cdots & 0 & 0 & \cdots & 0 & 0 & 0 & 0 & 0 & 0 & \cdots & 0 \\ 0 & 1 & \ddots & 0 & 0 & \cdots & 0 & 0 & 0 & 0 & 0 & 0 & \cdots & 0 \\ \vdots & \ddots & \ddots & 0 & 0 & \cdots & 0 & 0 & 0 & 0 & 0 & 0 & \cdots & 0 \\ 0 & 0 & 0 & 1 & 0 & \cdots & 0 & 0 & 0 & 0 & 0 & 0 & \cdots & 0 \\ 0 & 0 & 0 & 0 & 0 & \cdots & 0 & 1 & 0 & \cdots & 0 & 0 & \cdots & 0 \\ 0 & 0 & 0 & 0 & 0 & \cdots & 0 & 0 & 1 & \ddots & 0 & 0 & \cdots & 0 \\ 0 & 0 & 0 & 0 & 0 & \cdots & 0 & \vdots & \ddots & \ddots & 0 & 0 & \cdots & 0 \\ 0 & 0 & 0 & 0 & 0 & \cdots & 0 & 0 & 0 & 0 & 1 & 0 & \cdots & 0 \end{bmatrix}$$

| Non-feature elements | Features before j | State pertaining to index j | Features after j |

TABLE 10-continued

Algorithm of Forgetful SLAM $K = P_{predict} F_j^T H_k^{jT} (H_k^j F_j P_{predict} F_j^T H_k^{jT} + R(\hat{x}_k, m^j))^{-1}$
$X_{predict} = X_{predict} + K(z_k^i - \tilde{z}_k^i)$
$P_{predict} = P_{predict} - K H_k^j F_j P_{predict}$
Feature Management Stage 2:
$(X_k, P_k, \langle ID_{state} \rangle_k) =$
AddNewFeatures $(X_{predict}, P_{predict}, \langle ID_{state} \rangle_{predict}, \langle Z \rangle_k, \langle ID_{observed} \rangle_k, h_{feature}^{-1}, r, R)$ The second to last stage in Forgetful SLAM is the update stage. This stage is the same as the EKF SLAM where robust observations are applied to correct the landmark locations. Finally, the second feature management stage updates the results with newly observed landmarks as the resulting state vector and state covariance is returned and an entire iteration if Forgetful SLAM is complete.

The primary advantage of Forgetful SLAM over traditional SLAM techniques is the computational complexity of the algorithm remains constant. It is entirely dependent on the observed features and its complexity does not grow over time with newly observed features. Since this algorithm can run in constant time, it allows other, more advanced algorithms to use the results of this method.

Figure 8:
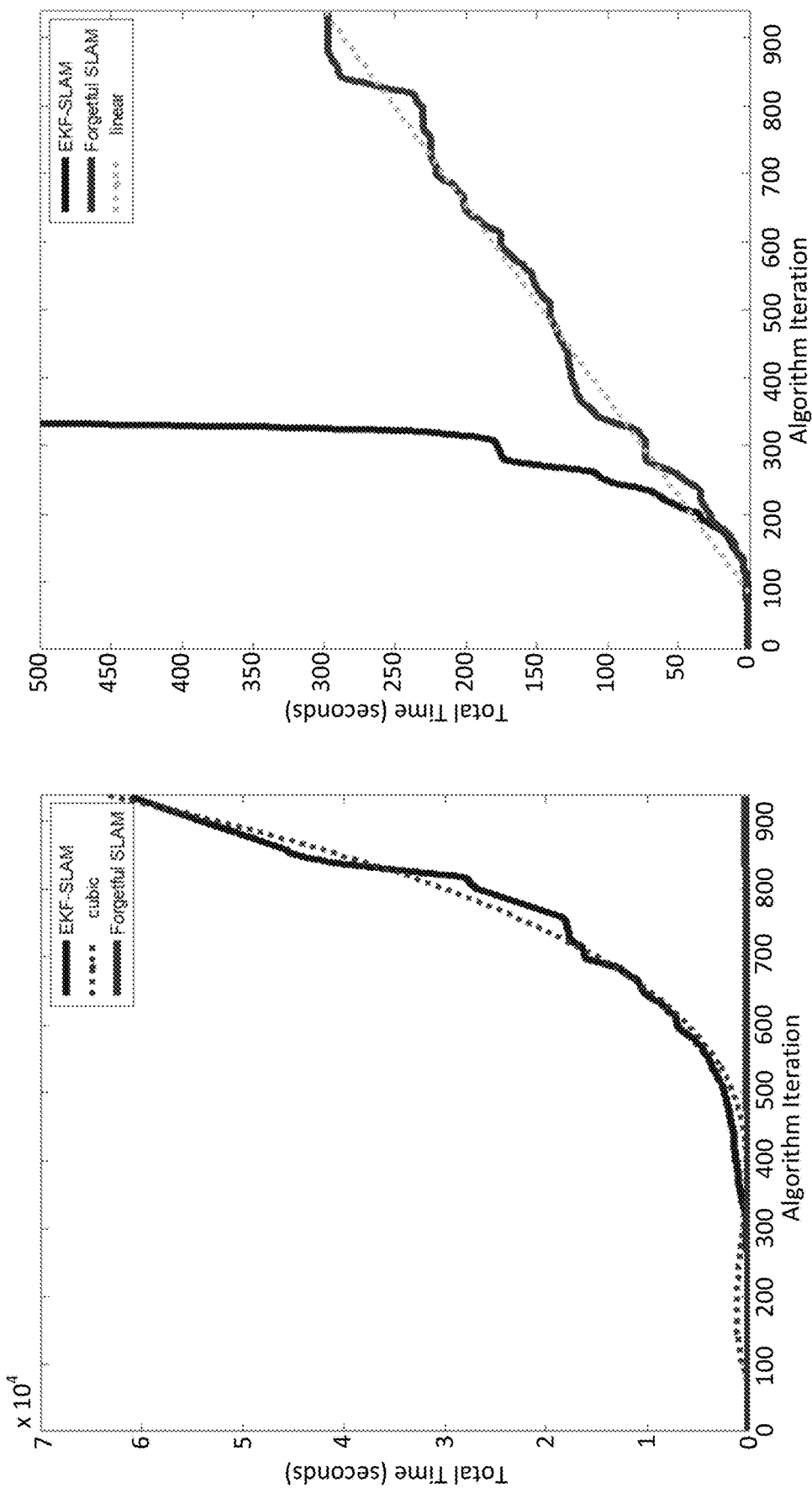

This algorithm can be thought of as a sensor fusion technique, where system states, landmarks, and sensors are all brought together to make the best possible estimate of the state and the map. In an online manner, it correlates all measurements and landmarks with each other, giving a much better result than the sensor just by itself Given that the Robust Kalman Filter performs better than the EKF when used in Forgetful SLAM, and without loop-closing, the standard EKF SLAM will have no advantage over Forgetful SLAM. The main advantage of Forgetful SLAM is the reduced computational complexity. FIG. 8 shows the computation time it takes to perform Forgetful SLAM versus EKF SLAM. Forgetful SLAM remains near constant per iteration depending on the number of visible landmarks. This becomes a linear rise for total time per iteration. EKF SLAM grows quadratically over time [17], which results in a cubic rise for total time per iteration. The example in FIG. 8 shows the computation time for the path drawn in FIG. 7. The Forgetful SLAM routine shows linear rise in total time per iteration, and EKF SLAM shows cubic growth. Due to time constraints, only a single comparison was made.

Figure 9:
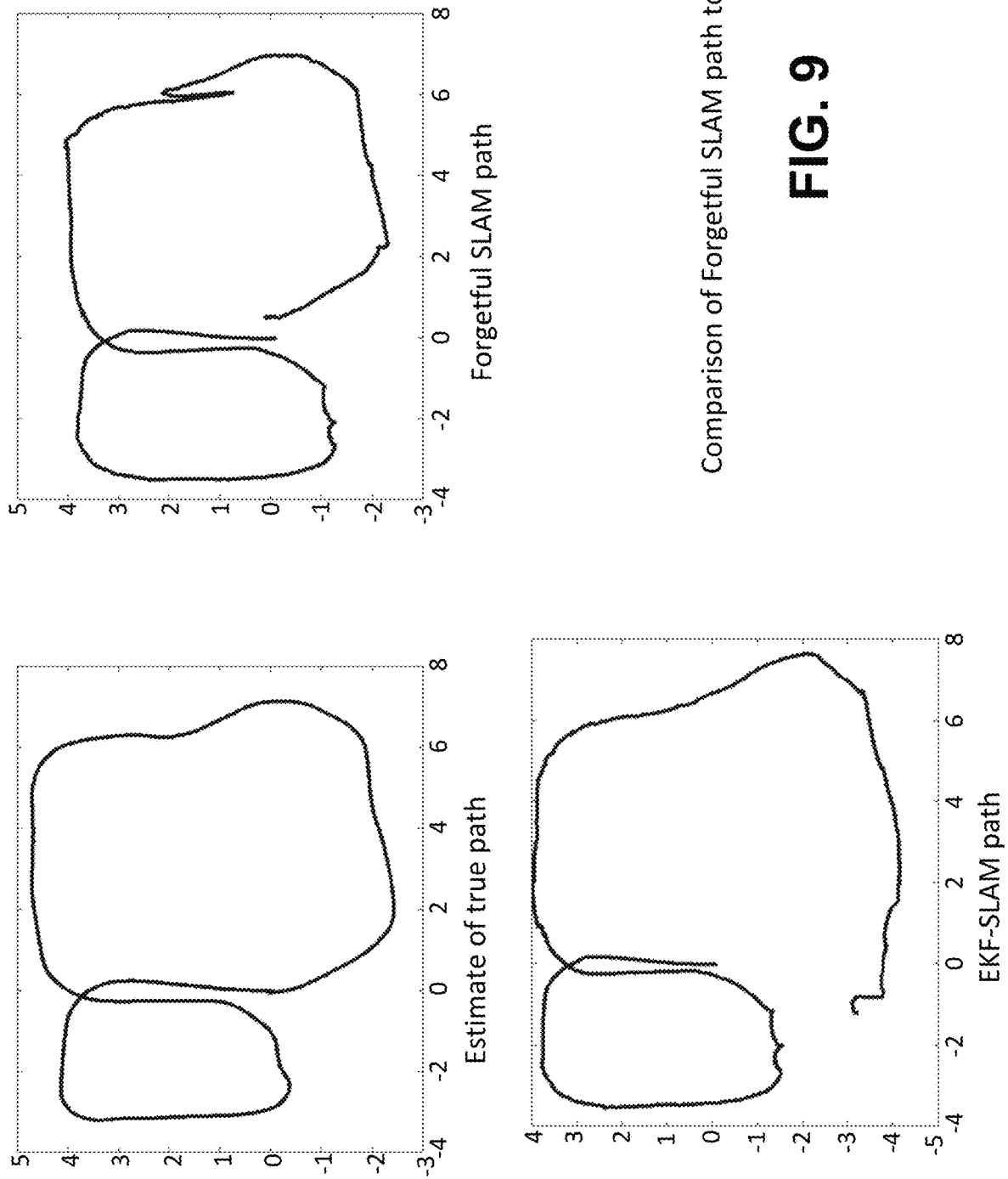

The example clearly shows the difference in computation time. EKF-SLAM took 16.98 hours to complete the sample map. Forgetful SLAM took 4.95 minutes to complete the same map. Both algorithms used the Robust Kalman Filter to eliminate outliers, thus both algorithms had the same number of landmarks. Furthermore, EKF-SLAM with outlier removal produced worse results on this example than Forgetful SLAM, even with outlier rejection. FIG. 9 shows a comparison of path generated by Forgetful SLAM, EKF-SLAM, and the estimate of the ground truth. Forgetful SLAM generated 1.35% error over distance travelled. EKF-SLAM with outlier removal generated 9.05% error over distance travelled.

Forgetful SLAM has a few disadvantages when compared to other SLAM techniques. The biggest disadvantage is that it has no capability to close-the-loop, meaning that revisiting landmarks does not improve the estimate of the state as it would with other SLAM techniques. Forgetting the map does not only ruin accuracy when revisiting landmarks, but doesn't improve the entire map as time goes on; only observed features are improved, forgotten features are left alone.

It is due to these disadvantages that another SLAM technique needs to run on top of Forgetful SLAM. However, in its current stage, Forgetful SLAM does not lend itself well to allowing the entire map to be recovered or modified. In a later section, modifications to Forgetful SLAM are developed that allow it to become useful to other SLAM techniques.

In order to handle system models from neural net based modeling techniques, the Unscented Transform is used. Neural net based models make it difficult to calculate Jacobians, which makes the Unscented Transform desirable, as it does not require any Jacobians, but instead linearizes the system noise, not the system model. Table 11 shows the replacement for the prediction stage in Table 10. The new method is based on the Unscented Transform, while the original technique uses the Extended Kalman Filter technique for state prediction.

TABLE 11

State prediction using Unscented Transform

UnscentedStatePrediction
   Input: $(X_{k-1}, P_{k-1}, U_k, f)$
   Output: $(X_k, P_k)$
Optimal Constants for Gaussians:
   $\alpha = 0.5, \beta = 2, \kappa = 0, \lambda = \alpha^2(N + \kappa) - N$, N = size of state
Calculate Sigma Points:
   $R = \text{chol}(P_{k-1})\sqrt{N+\lambda}$
   $\Sigma_0 = X_{k-1}$ $$\sum_{i=1\ldots N} = X_{k-1} + R \begin{bmatrix} \underset{<i}{0} & \underset{i^{th} \text{ column}}{1} & \underset{>i}{0} \end{bmatrix}$$

TABLE 11-continued

State prediction using Unscented Transform $$\sum_{i=N+1\ldots 2N} = X_{k-1} - R\left[\underset{<i/2}{0} \underset{(i/2)\,column}{1} \underset{>(i/2)}{0}\right]$$

Propagate Sigma Points:

$$\sum_{i=0\ldots 2N} = \begin{bmatrix} f(x_{\Sigma_i}, u_k) \\ m^1_{\Sigma_i} \\ \vdots \\ m^n_{\Sigma_i} \end{bmatrix}$$

Calculate Sigma Properties:

$$X_k = \frac{\lambda}{\lambda+N}\Sigma_0 + \sum_{i=1}^{2N}\left(\frac{\Sigma_i}{2(\lambda+N)}\right)$$

$$P_k = \left(1 - \alpha^2 + \beta + \frac{\lambda}{\lambda+N}\right)(\Sigma_0 - X_k)(\Sigma_0 - X_k)^T + \sum_{i=1}^{2N}\left(\frac{(\Sigma_i - X_k)(\Sigma_i - X_k)^T}{2(\lambda+N)}\right)$$

Instead of using the plain Unscented Transform, we could also use the prediction stage from CUMRF, as described above. This method uses the Unscented Transform as well, but also handles non-Gaussian noise through a Gaussian Mixture Model. This allows us to have a more accurate prediction stage, and with the consolidation part of CUMRF, we are left with only a single Gaussian, making the rest of the computations more efficient.

Forgetful SLAM was created in order to fuse sensors and landmarks in constant computational effort for local tracking. Current SLAM techniques cannot account for the unexpected errors in observations as elegantly as the Robust Kalman Filter stage of Forgetful SLAM. The technique was developed with HAR-SLAM in mind, where the features and poses could be organized in chains instead of large matrices. This technique improves the handling of inexpensive and inaccurate sensor measurements to produce correlated and accurate results. Modifications to Forgetful SLAM in order to retrieve correlations to past poses and landmarks are described below. These modifications allow Forgetful SLAM to be used by other high-level SLAM algorithms SLAM routines are either active or inactive. Kalman based SLAM routines are considered active since each landmark and robot state is updated at every sample. GraphSLAM is considered an inactive or lazy SLAM, since it can be solved in a batch process off-line. Hierarchical Active Ripple SLAM (HAR-SLAM) uses two layers for SLAM. The first layer is a modified Forgetful SLAM routine, where sensor measurements, robot poses, and landmarks are associated, improved, and then forgotten when they are out of visual range. In the second layer, the forgotten poses and landmarks are extracted in a similar method to GraphSLAM using properties of the Information matrix. Each pose has a correlation to the next pose, and as landmarks are removed from Forgetful SLAM, their correlations are tied to their last robot pose association only. The past poses and landmarks form a connected graph, where all landmarks are connected to a pose, and all poses form a chain.

As new poses are produced from Forgetful SLAM, the entire system is updated in a ripple technique. The ripple technique involves updating each pose in the connected chain in series, and updating the connecting landmarks. Each pose is updated by a linked neighbor (pose or landmark) with a Kalman-like Filter using the pose state, the pose covariance matrix, the linked neighbor's state, the linked neighbor's covariance matrix, and the cross-covariance matrix between the pose and neighbor. Each landmark is updated by an attached pose through a Kalman-like Filter using the landmark state and covariance, the pose state and covariance, and the cross correlation matrix between the pose and landmark. There is a state vector and covariance matrix per pose, a state vector and covariance matrix per landmark, and a cross-covariance matrix per link. This structure makes storage, and computation cost linear with number of landmarks and poses.

Figure 10:
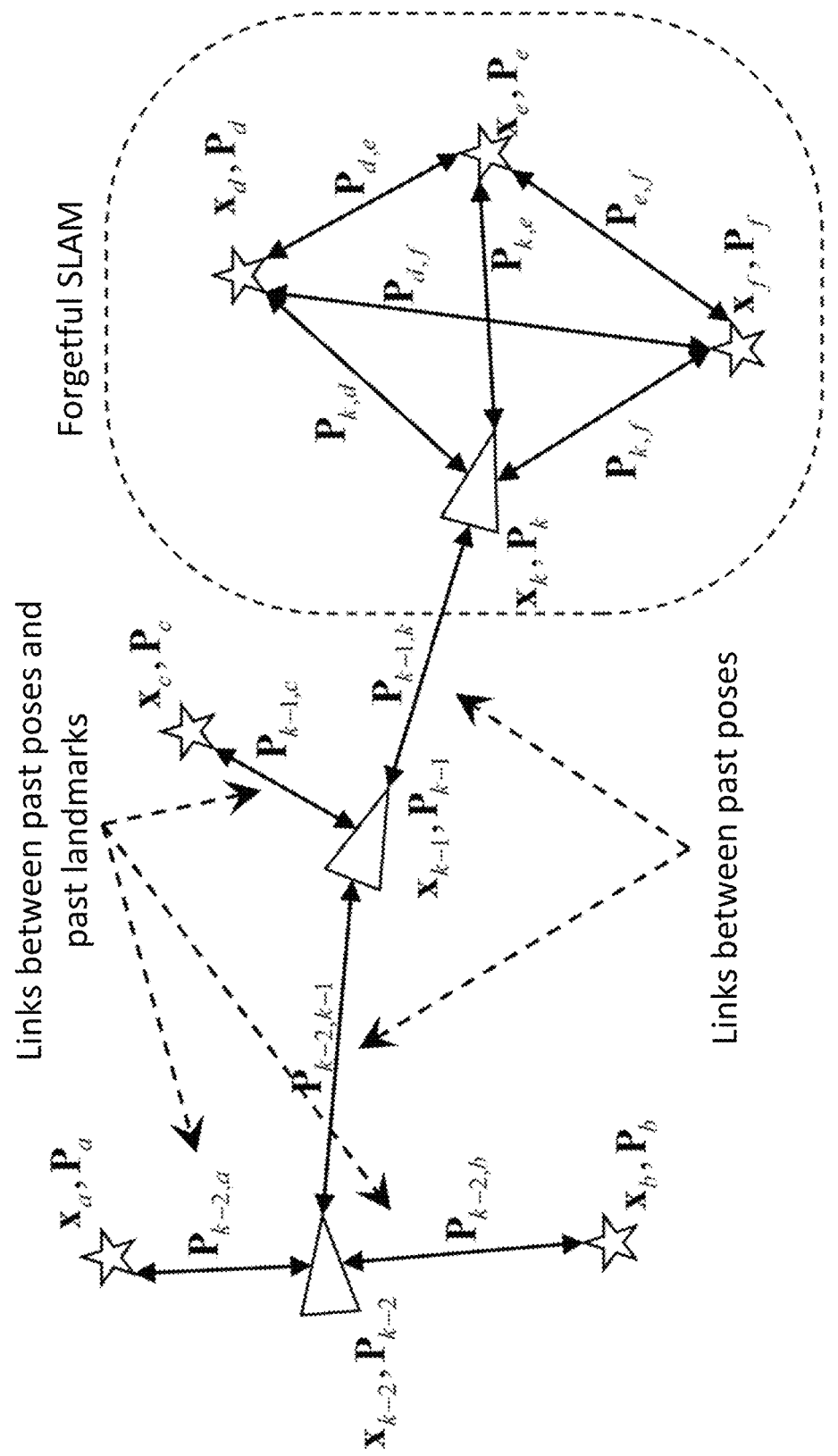

FIG. 10 shows the conceptual structure of HAR-SLAM. The section labeled Forgetful SLAM shows the most recent data being affected. Forgetful SLAM only correlates and updates visible landmarks. Each forgotten landmark is attached to a past pose. Each pose is connected in series over time. Updates in HAR-SLAM travel along the connections shown in FIG. 10.

HAR-SLAM is not guaranteed to be optimal like the Kalman Filter. HAR-SLAM operates on systems with non-linear dynamics, like EKF-SLAM, FastSLAM, and GraphSLAM, making an optimal solution infeasible in most cases. HAR-SLAM uses Forgetful SLAM, which employs the Robust Kalman Filter, making the system resistant to outliers. Remembering the entire path instead of only the best estimate allows HAR-SLAM to recover from errors, unlike EKF-SLAM. This property of remembering all poses and linking landmarks only to a single pose allows multiple robots to link maps together and asynchronously update portions of the map.

The updating mechanism of HAR-SLAM is similar to a physics engine in modern computer games, where every element in the engine is linked to its neighbors and updates upon some defined physics rule. In HAR-SLAM, each pose and landmark is updated depending only on its direct links using Kalman gains. Eventually, given enough steps, every component will be updated. Like GraphSLAM, HAR-SLAM will eventually converge to a solution. Unlike GraphSLAM, HAR-SLAM actively updates each component, and convergence is immediate for each updated pose and landmark in the map. HAR-SLAM, like physics engines, can be implemented in parallel, giving an incredible speed boost with today's processors.

In order for HAR-SLAM, or any other high level SLAM technique, to use Forgetful SLAM, the forgotten features need to be recoverable. A correlation matrix is generated per lost feature that relates the feature to the previous pose. Ultimately, a series of Kalman Filters can update these lost features from their past poses. In order to modify Forgetful SLAM properly, only the first function call to feature removal is replaced. It is not advantageous to recall features removed due to robustness issues. Table 13 shows the new removal algorithm, which returns a list of removed IDs, each features mean, each features covariance matrix, the past pose mean, and past pose covariance matrix. Table 12 shows the notation used in the new removal algorithm.

TABLE 12

Matrix notation for feature removal

Matrix Notation:

$$G_j = \begin{bmatrix} 0 & \ldots & 0 & 1 & 0 & \ldots & 0 & 0 & \ldots & 0 \\ 0 & \ldots & 0 & 0 & 1 & \ddots & \vdots & 0 & \ldots & 0 \\ \vdots & \ldots & \vdots & \vdots & \ddots & \ddots & 0 & \vdots & \ldots & \vdots \\ 0 & \ldots & 0 & 0 & \ldots & 0 & 1 & 0 & \ldots & 0 \end{bmatrix}_{\substack{\text{Elements} \\ \text{before} \\ \text{index } j}} \underbrace{\phantom{XX}}_{\substack{\text{State pertaining} \\ \text{to index } j}} \underbrace{\phantom{XX}}_{\substack{\text{Elements} \\ \text{after} \\ \text{index } j}} \quad G_{pose} = \begin{bmatrix} 1 & 0 & \ldots & 0 & 0 & \ldots & 0 \\ 0 & 1 & \ddots & \vdots & 0 & \ldots & 0 \\ \vdots & \ddots & \ddots & 0 & \vdots & \ldots & \vdots \\ 0 & \ldots & 0 & 1 & 0 & \ldots & 0 \end{bmatrix}_{\substack{\text{State pertaining} \\ \text{pose}}} \underbrace{\phantom{XX}}_{\substack{\text{State after} \\ \text{pose}}}$$

$$F_j = \begin{bmatrix} 1 & 0 & \ldots & 0 & 0 & 0 & 0 & 0 & 0 & 0 \\ 0 & 1 & \ddots & \vdots & 0 & 0 & 0 & 0 & 0 & 0 \\ \vdots & \ddots & \ddots & 0 & 0 & 0 & 0 & 0 & 0 & 0 \\ 0 & \ldots & 0 & 1 & 0 & 0 & 0 & 0 & 0 & 0 \\ 0 & 0 & 0 & 0 & 0 & 0 & 1 & 0 & \ldots & 0 \\ 0 & 0 & 0 & 0 & 0 & 0 & 0 & 1 & \ddots & \vdots \\ 0 & 0 & 0 & 0 & 0 & 0 & \vdots & \ddots & \ddots & 0 \\ 0 & 0 & 0 & 0 & 0 & 0 & 0 & \ldots & 0 & 1 \end{bmatrix}_{\substack{\text{Elements before} \\ \text{index } j}} \underbrace{\phantom{XX}}_{\substack{\text{State pertaining} \\ \text{to index } j}} \underbrace{\phantom{XX}}_{\substack{\text{Elements after} \\ \text{index } j}} \quad \hat{G}_j = \begin{bmatrix} G_{pose} \\ G_j \end{bmatrix}$$

$$\hat{F}_j = \begin{bmatrix} 0 & \ldots & 0 & 1 & 0 & \ldots & 0 & 0 & 0 & 0 & 0 & 0 & 0 \\ 0 & \ldots & 0 & 0 & 1 & \ddots & \vdots & 0 & 0 & 0 & 0 & 0 & 0 \\ \vdots & & \vdots & \vdots & \ddots & \ddots & 0 & 0 & 0 & 0 & 0 & 0 & 0 \\ 0 & \ldots & 0 & 0 & \ldots & 0 & 1 & 0 & 0 & 0 & 0 & 0 & 0 \\ 0 & \ldots & 0 & 0 & 0 & 0 & 0 & 0 & 0 & 1 & 0 & \ldots & 0 \\ 0 & \ldots & 0 & 0 & 0 & 0 & 0 & 0 & 0 & 0 & 1 & \ddots & \vdots \\ \vdots & & \vdots & 0 & 0 & 0 & 0 & 0 & 0 & \vdots & \ddots & \ddots & 0 \\ 0 & \ldots & 0 & 0 & 0 & 0 & 0 & 0 & 0 & 0 & \ldots & 0 & 1 \end{bmatrix}_{\substack{\text{State pertaining} \\ \text{to pose}}} \underbrace{\phantom{XX}}_{\substack{\text{Elements before} \\ \text{index } j}} \underbrace{\phantom{XX}}_{\substack{\text{State pertaining} \\ \text{to index } j}} \underbrace{\phantom{XX}}_{\substack{\text{Elements after} \\ \text{index } j}}$$

The algorithm presented in Table 13 shows the detail of recovering the information matrix associated with the current pose and lost landmarks. Since this is done before any prediction or updates, the pose and map are actually from the previous iteration. The algorithm correlates the past landmark with the past pose. The covariance matrix is generated in the same way GraphSLAM removes landmark links [20], except instead of removing a single landmark to generate new links, we remove all but the target landmark and leave just the pose and single landmark. Unlike GraphSLAM, covariance matrices are generated instead of information matrices; the canonical form GraphSLAM uses is computationally impractical for active updates. The landmark and pose covariance matrices are saved for later updates.

TABLE 13

Algorithm for retaining lost features

RemoveLostFeatures
Input: $(X, P, \langle ID_{current} \rangle, \langle ID_{observed} \rangle)$
Output: $(X_{reduced}, P_{reduced}, \langle ID_{reobserved} \rangle, \langle X_{lost} \rangle, \langle P_{lost} \rangle, \langle P_{cross} \rangle,$
$\langle ID_{lost} \rangle, X_{pose}, P_{pose})$
$\langle ID_{reobserved} \rangle = \langle ID_{current} \rangle \cap \langle ID_{observed} \rangle$ $$\langle ID_{lost} \rangle = \bigcup_{i \in \langle ID_{current} \rangle} i \notin \langle ID_{observed} \rangle$$

F = identity
For each ID in $\langle ID_{lost} \rangle$ find the index j in $\langle ID_{current} \rangle$
    F = $F_j$F
    $P_f = G_j P G_j^T$      Add $P_f$ to $\langle P_{lost} \rangle$
    $P_c = G_{pose} P G_j^T$      Add $P_c$ to $\langle P_{cross} \rangle$
    $X_f = G_j X$      Add $X_f$ to $\langle X_{lost} \rangle$
$X_{pose} = G_{pose} X$
$P_{pose} = G_{pose} P G_{pose}^T$
$X_{reduced} = FX$
$P_{reduced} = FPF^T$ Adapting techniques from GraphSLAM again, a covariance matrix is created between the previous pose and the current pose. This covariance matrix is created only using the re-observed features. This correlation algorithm can run at various spots in Forgetful SLAM. However, to get the entire benefit of the Robust Kalman Filter and to get the benefit of the Kalman Filter's ability to generate cross correlations during the update phase, the correlation algorithm runs after the second update stage. The operation is placed before new landmarks are added.

TABLE 14

Augmented state functions for pose correlation

Augmented State Function:

$$\tilde{f}(x, u) = \begin{bmatrix} f(x, u) \\ \begin{pmatrix} 1 & 0 & 0 \\ 0 & \ddots & 0 \\ 0 & 0 & 1 \end{pmatrix} \end{bmatrix}$$

$$\tilde{Q} = \begin{bmatrix} Q & 0 \\ 0 & 0 \end{bmatrix}$$

The algorithm combines the re-observed features into the cross-covariance between the past and present pose. This allows modifications of the current pose to propagate to past poses and eventually to past landmarks or features. However, if we want to correlate the past pose and current pose after the Kalman update, we need to augment the state to include the past pose. A few simple changes to the system equations can handle the augmented state. Table 14 shows the augmented state function that takes into account the past pose into the state allowing correlation to be done after the Kalman update. This is a simple expansion of the state, where the current state is set as the previous state. In practice, this expansion for $\tilde{Q}$ can yield unstable results. If this is the case, we simply inflate $\tilde{Q}$ a tiny amount in the bottom right block of zeros to prevent a determinant of zero.

Once the system is augmented, the correlation algorithm shown in Table 15 runs after the last update stage. The commonly seen features correlate the past and current pose in Forgetful SLAM. Given active updates, the reduced information matrix correlating the current and past pose is unnecessary as in GraphSLAM [20] or in the Sparse Extended Information Filter [17].

TABLE 15

Algorithm for creating pose cross variance from augmented state

CorrelatePoses
Input: ($\tilde{P}_k$)  Output: ($P_k$, $P_{k-1}$, $P_{cross}$)

$$\tilde{P}_k = \begin{bmatrix} \tilde{P}_k & \tilde{P}_{k,k-1} & \tilde{P}_{k,features} \\ \tilde{P}_{k,k-1}^T & \tilde{P}_{k-1} & \tilde{P}_{k-1,features} \\ \tilde{P}_{k,features}^T & \tilde{P}_{k-1,features}^T & \tilde{P}_{features} \end{bmatrix}$$

$P_k = \tilde{P}_k$
$P_{k-1} = \tilde{P}_{k-1}$
$P_{cross} = \tilde{P}_{k,k-1}$

After the poses are correlated, we reduce the state size again to remove the past state. We need to extract the newly placed past pose as well. This simple extraction is shown in Table 16. Inevitably, there is some uncertainty associated with the past pose, and the observations that updated the current pose will update the past pose. This newly updated past pose will update the existing chain of poses. This update phase will be described in the next section.

TABLE 16

Reduction of the augmented state

ReduceStateSize
Input: ($\tilde{X}_k$, $\tilde{P}_k$)  Output: ($X_k$, $X_{k-1}$, $P_k$)

$$F_k = \begin{bmatrix} 1 & 0 & \cdots & 0 & 0 & \cdots & 0 & 0 & 0 & 0 & 0 \\ 0 & 1 & \ddots & \vdots & 0 & \cdots & 0 & 0 & 0 & 0 & 0 \\ \vdots & \ddots & \ddots & 0 & \vdots & & \vdots & 0 & 0 & 0 & 0 \\ 0 & \cdots & 0 & 1 & 0 & \cdots & 0 & 0 & 0 & 0 & 0 \\ 0 & 0 & 0 & 0 & 0 & \cdots & 0 & 1 & 0 & \cdots & 0 \\ 0 & 0 & 0 & 0 & 0 & \cdots & 0 & 0 & 1 & \ddots & \vdots \\ 0 & 0 & 0 & 0 & \vdots & & \vdots & \vdots & \ddots & \ddots & 0 \\ 0 & 0 & 0 & 0 & 0 & \cdots & 0 & 0 & \cdots & 0 & 1 \end{bmatrix}$$

[State partaininit to post at time k | State pertaining to pose at k−1 | Remainder of the map]

$$F_{k-1} = \begin{bmatrix} 0 & \cdots & 0 & 1 & 0 & \cdots & 0 & 0 & 0 & 0 & 0 \\ 0 & \cdots & 0 & 0 & 1 & \ddots & \vdots & 0 & 0 & 0 & 0 \\ \vdots & & \vdots & \vdots & \ddots & \ddots & 0 & 0 & 0 & 0 & 0 \\ 0 & \cdots & 0 & 0 & \cdots & 0 & 1 & 0 & 0 & 0 & 0 \\ 0 & \cdots & 0 & 0 & 0 & 0 & 0 & 1 & 0 & \cdots & 0 \\ 0 & \cdots & 0 & 0 & 0 & 0 & 0 & 0 & 1 & \ddots & \vdots \\ \vdots & & \vdots & 0 & 0 & 0 & 0 & \vdots & \ddots & \ddots & 0 \\ 0 & \cdots & 0 & 0 & 0 & 0 & 0 & 0 & \cdots & 0 & 1 \end{bmatrix}$$

[State pertaining to pose at k | State partaininit to post at time k−1 | Remainder of the map]

$X_k = F_k \tilde{X}_k$
$P_k = F_k \tilde{P}_k F_k^T$
$X_{k-1} = F_{k-1} \tilde{X}_k$ HAR-SLAM has two main stages, the first is Forgetful SLAM, and the second is a rippling update. Forgetful SLAM has to be modified to include a link between forgotten landmarks and past poses. This is done in Table 13, where removed landmarks are correlated only to the past pose. These correlations are important for updating landmarks once the pose changes, and for revising landmarks to understand how to modify the past pose. Past poses have correlations to each other forming a chain; when a pose is modified, an update routine modifies all connecting neighbors. The rippling update is simply the propagation of updates to every connected pose and landmark in a directed graph. The correlation algorithm is shown in Table 15, where an augmented state is updated and the information matrix between the past and current pose is extracted. It is important to augment the system so the newly observed landmarks can be properly associated with the current pose and at the same time update the past pose correlation.

The second stage to HAR-SLAM is the actual update of the chain of poses and landmarks. After a pose and attached landmarks are extracted from the first stage of Forgetful SLAM, the pose is immediately updated by the end of an iteration of Forgetful SLAM. This causes the first and most common update in the system, which is an update in pose. The algorithm outlined in Table 17 shows how we update a destination pose from a source pose. For example, after $X_k$ is created, $X_{k-1}$ is updated. The update is then rippled as a change from $X_{k-1}$ to $X_{k-2}$, and from $X_{k-1}$ to all attached landmarks.

TABLE 17

Algorithm to update past poses and landmarks

UpdateLinkState
Input: ($X_{source}$, $X_{destination}$, $X_{source}^{new}$, $P_{source}$, $P_{destination}$, $P_{cross}$)
Output: ($X_{destination}^{new}$)

$$P := \begin{bmatrix} P_{source} & P_{cross} \\ P_{cross}^T & P_{destination} \end{bmatrix}$$

$K = P_{cross}^T (P_{source})^{-1}$
$X_{destination}^{new} = X_{destination} + K(X_{source}^{new} - X_{source})$ The update has a second stage, which updates the covariance matrix of each pose, landmark, and cross-covariance. This is shown in Table 18, where the same Kalman gain is used, but instead updates the covariance matrices. These two algorithms could be combined into a single algorithm; however, later developments require the separation of the two.

TABLE 18

Algorithm to update past covariance matrices

UpdateLinkCovariance
Input: ($P_{source}$, $P_{destination}$, $P_{cross}$, $P_{source}^{new}$)
Output: ($P_{destination}^{new}$, $P_{cross}^{new}$)

$$P = \begin{bmatrix} P_{source} & P_{cross} \\ P_{cross}^T & P_{destination} \end{bmatrix}$$

$K = P_{cross}^T (P_{source})^{-1}$
$P_{destination}^{new} = P_{destination} + K(P_{source}^{new} - P_{source})K^T$
$P_{cross}^{new} = P_{source}^{new} K^T$ Both update algorithms have a relatively small inverse that never grows in dimension. Typically, the source will be the latest state from the Forgetful SLAM routine, and every state that came before, and every landmark will be updated in a sequence. This update is linear with the number of states and landmarks. The direction is important as the source and destination are updated in different ways. The source state is assumed a known set value, with a known set covariance. If we switch directions between the source and destination, then we merely need to transpose the cross-covariance matrix that relates them together. It is important to note that if the cross-covariance is zero, then the destination will not be updated at all, as there is no relation between the two.

The other important update is when a landmark is observed again. A landmark matching routine can indicate a match at any time. There is one detrimental fact about observing the same feature again through Forgetful SLAM, and not matching until after it is forgotten. The issue is that the two observations are of the same feature and are correlated, unlike sensor observations, which have no correlation to the state. This presents an interesting update routine, which again uses Kalman-like updates. Table 19 shows the algorithm to update the system given revisited landmarks. There are two odd parts to this algorithm, first the residual covariance noted as S contains cross-covariance matrices computed by multiplying the chain of cross-covariance matrices and state covariance inverses that connect the two observations of the same landmark. The second oddity is that the Update Link routine is called starting at each feature, but only updates the state vector. The covariance matrices are updated after both features are completely updated, and again ripple from each feature. This is why the update algorithm is presented as two separate versions.

TABLE 19

Algorithm to update revisited landmarks

UpdateRevisitedLandmark
Input: $(X_A, X_B, P_A, P_B, P_{A \to B})$
Output: $(\hat{X}_A, \hat{X}_B, \hat{P}_A, \hat{P}_B)$
$P_{A \to B} := P_{A,1} (P_1)^{-1} P_{1,2} (P_2)^{-1} P_{2,3} \ldots P_{n-1,n} (P_n)^{-1} P_{n,B}$
$S = P_A - P_{A \to B} - P_{A \to B}^T + P_B$
$\hat{X}_A = X_A + P_A S^{-1} (X_B - X_A)$
$\hat{X}_B = X_B + P_B S^{-1} (X_A - X_B)$
Call UpdateLinkState on all states connecting feature A to feature B, starting at feature A to state 1, continue until state n and continue to include feature B.
Call UpdateLinkState on all states connecting feature B to feature A, starting at feature B to state n, continue until state 1 and continue to include feature A.
$\hat{P}_A = P_A - P_A S^{-1} P_A + \frac{1}{2}(P_A S^{-1} P_{A \to B}^T + P_{A \to B} S^{-1} P_A)$
$\hat{P}_B = P_B - P_B S^{-1} P_B + \frac{1}{2}(P_B S^{-1} P_{A \to B}^T + P_{A \to B}^T S^{-1} P_B)$
Call UpdateLinkCovariance on all states connecting feature A to feature B, starting at feature A to state 1, continue until state n and continue to include feature B.
Call UpdateLinkCovariance on all states connecting feature B to feature A, starting at feature B to state n, continue until state 1 and continue to include feature A.

The algorithm presented in Table 19 does not show the final values of the features, poses, or covariance matrices. These values are updated using the Update Link algorithms. A later section will derive and verify these update equations. The algorithm presented assumes features A and B are a successful match, the pose connected to A is arbitrarily labeled 1, the pose connecting to B is arbitrarily labeled n, and pose 1 connects to pose 2, and so on until pose n−1 connects to pose n. Once a feature is matched, the old feature needs to be removed in order to maintain the map being a chain with no loops or complications. This step is not necessary, but makes map storage and updating easier. Table 20 shows the necessary steps to update the map after removing a landmark. The actual removal of the landmark is as simple as just deleting the link, state, and covariance matrix; no real work is involved. Updating all the cross-covariance matrices is relatively simple given the path between the previously visited and newly revisited landmark is well known. Notice, only cross-covariance matrices are modified; this is because removing a feature has no effect on the pose estimate or landmark estimate, merely affecting the links between landmarks and poses.

TABLE 20

Algorithm to update map links after removing a revisited landmark

Map Reduction (Remove landmark A after matching landmark B to landmark A and updating)
Define:
$P_{A \to B} := P_{A,1} (P_1)^{-1} P_{1,2} (P_2)^{-1} P_{2,3} \ldots P_{n-1,n} (P_n)^{-1} P_{n,B}$
$P_{A \to i} := P_{A,1} (P_1)^{-1} P_{1,2} (P_2)^{-1} P_{2,3} \ldots P_{i-1,i}$
$P_{i \to B} := P_{i,j+1} (P_{i+1})^{-1} P_{i+1,j+2} (P_{i+2})^{-1} P_{i+2,i+3} \ldots P_{n-1,n} (P_n)^{-1} P_{n,B}$ TABLE 20-continued Algorithm to update map links after removing a revisited landmark $X_A = X_B$
$P_A \approx P_B$
For all cross-covariance matrices $P_{i,i+1}$ between landmark A and landmark B excluding $P_{A,1}$
$P_{i,j+1}{}^{new} = P_{i,j+1} + (P_{A \to i})^T (P_A)^{-1} (P_{i+1 \to B})^T$ Using multiple robots to generate a map cooperatively requires an additional calculation. The same updates and ripples can be used as previously described in HAR-SLAM; however, there is one extra state. The global coordinate state is required to unite all local robot coordinate systems together. For each robot, there is an entry in the state, and the state is composed of the local rotation to global coordinates and the location of the local origin in the global coordinate system. In the case of a 2D system, we can represent this as a 2D origin and a 1D rotation per robot. In the case of a 3D system, we can represent this as a 3D origin, and 3 orthogonal rotations, or a 4 dimensional quaternion. A simple translation and rotation function needs to exist to translate the local coordinates into the global coordinate frame.

In order to discover this global coordinate transformation, an Extended Kalman Filter will be used to update the estimate of the global coordinate state. A covariance matrix will be associated with the state; its usefulness will be shown soon. Every time a high-level algorithm decides two or more robots have seen the same feature, then the global coordinate state will be updated. There has to be some initialization of the global coordinate state, minimally let all robots have the same initial global state, and the same large covariance matrix, indicating little knowledge of the true state. Table 21 shows the Kalman Update Algorithm, where the observation of the same feature from two different frames is translated into an error and propagated using the optimal Kalman gain.

TABLE 21

Kalman Filter for global coordinate update

UpdateGlobalCoordinates
Input: $(X_{global}, P_{global}, X_{feature}{}^j, X_{feature}{}^k, P_{feature}{}^j, P_{feature}{}^k)$
Output: $(X_{global}{}^{new}, P_{global}{}^{new})$ $$X_{global} := \begin{bmatrix} X_{origin}^1 \\ X_{rotation}^1 \\ \vdots \end{bmatrix}$$

$$P_{global} := \begin{bmatrix} P_{1,1} & P_{1,2} & \cdots \\ P_{2,1} & P_{2,2} & \cdots \\ \vdots & \vdots & \ddots \end{bmatrix}$$

R (...) := Rotation Matrix to World Coordinates
$\tilde{y} = R(X_{rotation}{}^k)(X_{feature}{}^k - X_{origin}{}^k) - R(X_{rotation}{}^j)(X_{feature}{}^j - X_{origin}{}^j)$ $$R_i = \frac{\partial}{\partial X_{rotation}}(R(X_{rotation})(X_{feature} - X_{origin}))\bigg|_{\substack{X_{origin}=X_{origin}^i \\ X_{rotation}=X_{rotation}^i \\ X_{feature}=X_{feature}^i}}$$

$$F = \begin{bmatrix} 0 & \cdots & 0 & 1 & 0 & \cdots & 0 & 0 & \cdots & 0 & 0 & 0 & \cdots & 0 & 0 & \cdots & 0 \\ 0 & \cdots & 0 & 0 & 1 & & \vdots & 0 & \cdots & 0 & 0 & 0 & & \vdots & 0 & \cdots & 0 \\ \vdots & & \vdots & \vdots & & \ddots & 0 & \vdots & & \vdots & \vdots & & \ddots & 0 & \vdots & & \vdots \\ 0 & \cdots & 0 & 0 & \cdots & 0 & 1 & 0 & \cdots & 0 & 0 & \cdots & 0 & 0 & 0 & \cdots & 0 \\ 0 & \cdots & 0 & 0 & 0 & \cdots & 0 & 0 & \cdots & 0 & 1 & 0 & \cdots & 0 & 0 & \cdots & 0 \\ 0 & \cdots & 0 & 0 & 0 & & \vdots & 0 & \cdots & 0 & 0 & 1 & & \vdots & 0 & \cdots & 0 \\ \vdots & & \vdots & \vdots & & \ddots & 0 & \vdots & & \vdots & \vdots & & \ddots & 0 & \vdots & & \vdots \\ 0 & \cdots & 0 & \underline{0} & \cdots & 0 & 0 & 0 & \cdots & 0 & \underline{0} & \cdots & 0 & 1 & 0 & \cdots & 0 \end{bmatrix}$$
$\phantom{F=}$ state pertaining to robot j $\qquad$ state pertaining to robot k $H_{global} = [R(X_{rotation}{}^j) \quad -R_j \quad -R(X_{rotation}{}^k) \quad R_k]$
$H_i = R(X_{rotation}{}^i)$
$S = H_{global}FP_{global}F^TH_{global}{}^T + H_jP_{feature}{}^jH_j{}^T + H_kP_{feature}{}^kH_k{}^T$
$K = P_{global}F^TH_{global}{}^TS^{-1}$
$X_{global}{}^{new} = X_{global} + K\tilde{y}$
$P_{global}{}^{new} = P_{global} - KH_{global}FP_{global}$ The algorithm in Table 21 can operate as a standalone algorithm; however, this is not as error resistant as the rest of HAR-SLAM. Feature matching passes through the low-level Forgetful SLAM routine, which calls the Robust Kalman Filter. This allows the system to remove outliers, which the normal Kalman Filter cannot handle. In order to have the same advantage here, HAR-SLAM for multiple robots needs to keep track of all known features that match between robots. All features commonly observed by robots are passed into the robust update function as described in Table 22. This update function uses a modified Robust Kalman Filter. The version of the Robust Kalman Filter in Table 22 uses the Extended Kalman Filter from Table 21 as a subroutine.

The global coordinate update can operate as frequently or infrequently as desired; however, there is a consequence to its use. After the global coordinate frame is updated, every pair of features that managed to remain in the robust pairing needs to be updated and the resulting effects on each robot's individual map need to be rippled. The initial correction to the features is shown in Table 23, where each pair of features is updated based on the global coordinate state. Corrections are then propagated to the rest of the map using the standard Update Link method described in Table 17 and Table 18. Optionally, when each robot updates its individual map, all affected landmarks could be updated simultaneously using the same method outlined in Table 19, except each landmark would take into consideration the correlation from every other landmark being updated from other robots. This method is computationally more expensive than the simple Update Link method, but is ultimately more accurate. In practice, we can ignore the cross correlation values since they end up being much smaller than the rest of the system, and update often enough that the system settles to the correct answer. This approach is taken in GraphSLAM [20], where iterations and gradient descent methods are used to solve for the map.

TABLE 22

Robust global coordinate update

RobustGlobalCoordinateUpdate
Input: $(X_{global}, P_{global}, (X_{feature}^j, X_{feature}^k), (P_{feature}^j, P_{feature}^k))$
Output: $(X_{global}^{new}, P_{global}^{new})$
Calculate observation weights:
∀i ∈ observed feature pairs:

$$x_i = UpdateGlobalCoordinates\begin{pmatrix} X_{global}, P_{global}, \langle X_{feature}^j, X_{feature}^k \rangle_i, \\ \langle P_{feature}^j, P_{feature}^k \rangle_i \end{pmatrix}$$

$$\bar{x} = \frac{1}{n}\sum_{i=1}^{n} x_i \quad \tilde{X} = \sum_{i=1}^{n}(x_i - \bar{x})(x_i - \bar{x})^T$$

v = largest eigenvector by eigenvalue of $(\tilde{X})$
∀i ∈ observed features:
$w_i = v^T x_i$
Calculate features to remove:

$$mad(X) = \underset{x \in X}{median}(|x - median(X)|)$$

$$lb(X, k) = median(X) - k * mad(X)$$

$$ub(X, k) = median(X) + k * mad(X)$$

$$I_{keep} = \{i \mid ub(W_k, 2) > x > lb(W_k, 2), w_k^i \in W_k\}$$

Update state with robust observations:
$X_{global}^{new} = X_{global}$
$P_{global}^{new} = P_{global}$
∀i ∈ $I_{keep}$:

$$(X_{global}^{new}, P_{global}^{new}) = UpdateGlobalCoordinates\begin{pmatrix} X_{global}^{new}, P_{global}^{new}, \\ \langle X_{feature}^j, X_{feature}^k \rangle_i, \\ \langle P_{feature}^j, P_{feature}^k \rangle_i \end{pmatrix}$$

TABLE 23

Landmark update between multiple robots

CommonLandmarkUpdate
Input: $(X_{global}, P_{global}, (X_{feature}^j, X_{feature}^k, P_{feature}^j, P_{feature}^k))$
Output: $(\tilde{X}_{feature}^j, \tilde{X}_{feature}^k, \tilde{P}_{feature}^j, \tilde{P}_{feature}^k))$
For each pair of matched landmarks in $(X_{feature}^j, X_{feature}^k, P_{feature}^j, P_{feature}^k)$:

$$X_{global} := \begin{bmatrix} X_{origin}^1 \\ X_{rotation}^1 \\ \vdots \end{bmatrix}$$

TABLE 23-continued

Landmark update between multiple robots $$P_{global} := \begin{bmatrix} P_{1,1} & P_{1,2} & \cdots \\ P_{2,1} & P_{2,2} & \cdots \\ \vdots & \vdots & \ddots \end{bmatrix}$$

$$\tilde{y} = R(X_{rotation}^k)(X_{feature}^k - X_{origin}^k) - R(X_{rotation}^j)(X_{feature}^j - X_{origin}^j)$$

$$R_i = \frac{\partial}{\partial X_{rotation}}(R(X_{rotation})(X_{feature} - X_{origin}))\bigg|_{\substack{X_{origin}=X_{origin}^i \\ X_{rotation}=X_{rotation}^i \\ X_{feature}=X_{feature}^i}}$$

$$F = \begin{bmatrix} 0 & \cdots & 0 & 1 & 0 & \cdots & 0 & 0 & \cdots & 0 & 0 & 0 & \cdots & 0 & 0 & \cdots & 0 \\ 0 & \cdots & 0 & 0 & 1 & & \vdots & 0 & \cdots & 0 & 0 & 0 & & \vdots & 0 & \cdots & 0 \\ \vdots & & \vdots & \vdots & & \ddots & 0 & \vdots & & \vdots & \vdots & & \ddots & 0 & \vdots & & \vdots \\ 0 & \cdots & 0 & 0 & \cdots & 0 & 1 & 0 & \cdots & 0 & 0 & \cdots & 0 & 0 & 0 & \cdots & 0 \\ 0 & \cdots & 0 & 0 & 0 & \cdots & 0 & 0 & \cdots & 0 & 1 & 0 & \cdots & 0 & 0 & \cdots & 0 \\ 0 & \cdots & 0 & 0 & 0 & & \vdots & 0 & \cdots & 0 & 0 & 1 & & \vdots & 0 & \cdots & 0 \\ \vdots & & \vdots & \vdots & & \ddots & 0 & \vdots & & \vdots & \vdots & & \ddots & 0 & \vdots & & \vdots \\ 0 & \cdots & 0 & \underbrace{0 & \cdots & 0 & 0}_{\text{state pertaining to robot } j} & \underbrace{0 & \cdots & 0 & 0 & \cdots & 0 & 1 & 0 & \cdots & 0}_{\text{state pertaining to robot } k} \end{bmatrix}$$

$H_{global} = [R(X_{rotation}^j) \quad -R_j \quad -R(X_{rotation}^k) \quad R_k]$
$H_i = R(X_{rotation}^i)$
$S = H_{global} F P_{global} F^T H_{global}^T + H_j P_{feature}^j H_j^T + H_k P_{feature}^k H_k^T$
$K_j = P_{feature}^j H_j^T S^{-1}$
$K_k = P_{feature}^k H_k^T S^{-1}$
$\hat{X}_{feature}^j = X_{feature}^j + K\tilde{y} \qquad \hat{X}_{feature}^k = X_{feature}^k - K\tilde{y}$
$\hat{P}_{feature}^j = P_{feature}^j - KH_j P_{feature}^j \qquad \hat{P}_{feature}^k = P_{feature}^k - KH_k P_{feature}^k$
Add updated positions to $(\hat{X}_{feature}^j, \hat{X}_{feature}^k, \hat{P}_{feature}^j, \hat{P}_{feature}^k)$ The key components of HAR-SLAM are the update algorithms, which improves the entire map through a series of Kalman-like updates. There are basic ripple updates, revisited landmark updates, and multiple robot landmark updates. Three main differences exist with HAR-SLAM updates when compared to the standard Kalman Filter updates. First, the ripple technique uses a sub-optimal gain in order to achieve the ripple effect. Instead of modifying both states given a new observation, the new observation is applied to one state and propagated to another. Second, the observation is not independent of the state, which is assumed in the Kalman Filter. However, the difference between the observation and state is independent of the state due to the Markovian property of the recursive filters [21][22]. Third, revisiting landmarks or updating multiple landmarks on the same local map cannot use the typical Kalman gain since it assumes independent and uncorrelated observations. However, if two landmarks are on a map, they are correlated and a different approach to the Kalman gain is required. This differing approach is optimal for correlated observations, but again not the typical gain used in the Kalman Filter.

The sub-optimal gain of the ripple technique has two effects that are required and verified in Table 24, Table 25 and Table 26. The selected Kalman gain applies the updated observed state directly to the source state in the given link, giving it the same state and covariance as the observed state. Second, if the source observation has the same covariance as the state, then no changes will be made to the source covariance, destination covariance, or cross-covariance. Table 24 and Table 25 show that the selected gain in the Link Update routine forces the source state and covariance to match the observation state and covariance. Table 26 shows that having the same observation covariance as the original source covariance results in no changes to the destination covariance or cross correlation.

TABLE 24

Verification that gain selection in link update results in source state matching observation state Given:

$$P := \begin{bmatrix} P_{source} & P_{cross} \\ P_{cross}^T & P_{destination} \end{bmatrix} \quad x := \begin{bmatrix} x_{source} \\ x_{destination} \end{bmatrix} \quad z = \tilde{x}_{source}^{new} \quad H = [I \quad 0] \quad R = \tilde{P}_{source}^{new}$$

TABLE 24-continued

Verification that gain selection in link update results in source state matching observation state Show:

$$K = \begin{bmatrix} I \\ P_{cross}^T (P_{source})^{-1} \end{bmatrix} \Rightarrow x_{source}^{new} = \tilde{x}_{source}^{new}$$

Derivation:

$x_{predict} = x \quad P_{predict} = P$ $z_{predict} = Hx_{predict} = Hx = x_{source}$ $\tilde{y} = z - z_{predict} = \tilde{x}_{source}^{new} - x_{source}$ $$\begin{aligned} x^{new} &= x_{predict} + K\tilde{y} = x + K(\tilde{x}_{source}^{new} - x_{source}) \\ &= \begin{bmatrix} x_{source} \\ x_{destination} \end{bmatrix} + \begin{bmatrix} I \\ P_{cross}^T (P_{source})^{-1} \end{bmatrix} (\tilde{x}_{source}^{new} - x_{source}) \\ &= \begin{bmatrix} x_{source} + (\tilde{x}_{source}^{new} - x_{source}) \\ x_{destination} + P_{cross}^T (P_{source})^{-1} (\tilde{x}_{source}^{new} - x_{source}) \end{bmatrix} \\ &= \begin{bmatrix} \tilde{x}_{source}^{new} \\ x_{destination} + P_{cross}^T (P_{source})^{-1} (\tilde{x}_{source}^{new} - x_{source}) \end{bmatrix} \end{aligned}$$

$\therefore x_{source}^{new} = \tilde{x}_{source}^{new}$

TABLE 25

Verification that gain selection in link update results in source covariance matching observation Given:

$$P := \begin{bmatrix} P_{source} & P_{cross} \\ P_{cross}^T & P_{destination} \end{bmatrix} \quad x := \begin{bmatrix} x_{source} \\ x_{destination} \end{bmatrix} \quad z = \tilde{x}_{source}^{new} \quad H = [I \quad 0] \quad R = \tilde{P}_{source}^{new}$$

Show:

$$K = \begin{bmatrix} I \\ P_{cross}^T (P_{source})^{-1} \end{bmatrix} \Rightarrow P_{source}^{new} = \tilde{P}_{source}^{new}$$

Derivation:

$$\begin{aligned} P^{new} &= cov(x^{true} - \tilde{x}^{new}) \\ &= cov(x^{true} - (x + K(\tilde{x}_{source}^{new} - Hx))) \\ &= cov(x^{true} - x + K(\tilde{x}_{source}^{new} - x_{source})) \\ &= cov(x^{true} - x) + cov(K(\tilde{x}_{source}^{new} - x_{source})) \\ &= P + K(R - HPH^T)K^T \\ &= P + K(\tilde{P}_{source}^{new} - P_{source})K^T \\ &= \begin{bmatrix} P_{source} + (\tilde{P}_{source}^{new} - P_{source}) & P_{cross} + (\tilde{P}_{source}^{new} - P_{source})(P_{cross}^T P_{source}^{-1})^T \\ P_{cross}^T + (P_{cross}^T P_{source}^{-1})(\tilde{P}_{source}^{new} - P_{source}) & P_{destination} + \begin{pmatrix} (P_{cross}^T P_{source}^{-1})(\tilde{P}_{source}^{new}) \\ -P_{source})(P_{cross}^T P_{source}^{-1})^T \end{pmatrix} \end{bmatrix} \end{aligned}$$

$$P^{new} = \begin{bmatrix} (\tilde{P}_{source}^{new}) & (\tilde{P}_{source}^{new} P_{source}^{-1} P_{cross}) \\ (P_{cross}^T P_{source}^{-1} \tilde{P}_{source}^{new}) & \begin{pmatrix} P_{destination} + (P_{cross}^T P_{source}^{-1})(\tilde{P}_{source}^{new}) \\ -P_{source})(P_{cross}^T P_{source}^{-1})^T \end{pmatrix} \end{bmatrix}$$

$\therefore P_{source}^{new} = \tilde{P}_{source}^{new}$

TABLE 26

Verification that using an observation covariance equal to the source covariance in link update has no effect on the source covariance, destination covariance, or cross-covariance Given:

$$P := \begin{bmatrix} P_{source} & P_{cross} \\ P_{cross}^T & P_{destination} \end{bmatrix} \quad x := \begin{bmatrix} x_{source} \\ x_{destination} \end{bmatrix} \quad z = \tilde{x}_{source}^{new} \quad H = [I \quad 0] \quad R = \tilde{P}_{source}^{new}$$

Show:

$$K = \begin{bmatrix} I \\ P_{cross}^T (P_{source})^{-1} \end{bmatrix}, \tilde{P}_{source}^{new} = P_{source} \Rightarrow P^{new} = P$$

Derivation:
Using last line from Table 25:

$$P^{new} = \begin{bmatrix} (\tilde{P}_{source}^{new}) & (\tilde{P}_{source}^{new} P_{source}^{-1} P_{cross}) \\ (P_{cross}^T P_{source}^{-1} \tilde{P}_{source}^{new}) & \begin{pmatrix} P_{destination} + (P_{cross}^T P_{source}^{-1})(\tilde{P}_{source}^{new}) \\ -P_{source})(P_{cross}^T P_{source}^{-1})^T \end{pmatrix} \end{bmatrix}$$

$$= \begin{bmatrix} (P_{source}) & (P_{source} P_{source}^{-1} P_{cross}) \\ (P_{cross}^T P_{source}^{-1} P_{source}) & \begin{pmatrix} P_{destination} + (P_{cross}^T P_{source}^{-1})(P_{source}) \\ -P_{source})(P_{cross}^T P_{source}^{-1})^T \end{pmatrix} \end{bmatrix}$$

$$= \begin{bmatrix} (P_{source}) & (P_{cross}) \\ (P_{cross}^T) & (P_{destination} + P_{cross}^T P_{source}^{-1} (0) P_{source}^{-1} P_{cross}) \end{bmatrix}$$

$$= P$$

$$\therefore P^{new} = P$$

Upon observing a landmark again, a special update routine is called in order to accommodate the fact that the past landmark and current landmark are correlated through a chain of robot states. This correlation needs to be taken into consideration when calculating a gain that will propagate throughout the map. The proof that the correct gains are used when applying the correction to each landmark lies in the final values that result after the ripple update. If the gain is correct, then the two common landmarks will have the same position and have a difference of zero. Table 27 verifies that the gain choice in the update routine for revisited landmarks in Table 19 is valid.

TABLE 27

Verification of gain selection in update revisited landmark

Given:
Exists a connection from landmark A to pose 1 and several poses connect to pose N and pose N connects to landmark B Landmark A to pose 1: $P_{A \leftrightarrow 1} := \begin{bmatrix} P_A & P_{A,1} \\ P_{1,A} & P_1 \end{bmatrix} \quad x_{A \leftrightarrow 1} := \begin{bmatrix} x_A \\ x_1 \end{bmatrix} \quad P_{A,1} := P_{1,A}^T$ Landmark B to pose N: $P_{B \leftrightarrow n} := \begin{bmatrix} P_B & P_{B,n} \\ P_{n,B} & P_n \end{bmatrix} \quad x_{B \leftrightarrow N} := \begin{bmatrix} x_B \\ x_n \end{bmatrix} \quad P_{B,n} := P_{n,B}^T$ Pose i to pose i + 1: $P_{i \leftrightarrow i+1} := \begin{bmatrix} P_i & P_{i,i+1} \\ P_{i+1,i} & P_{i+1} \end{bmatrix} \quad x_{i \leftrightarrow i+1} := \begin{bmatrix} x_i \\ x_{i+1} \end{bmatrix} \quad P_{i,i+1} := P_{i+1,i}^T$ Show:

$$\begin{bmatrix} P_{A \to B} := P_{A,1}(P_1)^{-1} P_{1,2}(P_2)^{-1} P_{2,3} \ldots P_{n-1,n}(P_n)^{-1} P_{n,B} \\ S := P_A - P_{A \to B} - P_{A \to B}^T + P_B \\ K_A = P_A S^{-1} \quad K_B = P_B S^{-1} \end{bmatrix} \Rightarrow \hat{x}_A = \hat{x}_B$$

Derivation:

$$\vec{x}_A = x_A + K_A(x_B - x_A) = x_A + P_A S^{-1}(x_B - x_A)$$

$$\overleftarrow{x}_B = x_B + K_B(x_A - x_B) = x_B + P_B S^{-1}(x_A - x_B)$$

TABLE 27-continued

Verification of gain selection in update revisited landmark

Next we ripple the update from both A and B through all the poses and onto one another $$K_{i \to j} = P_{i,j}^T (P_i)^{-1}$$

$$\vec{X}_1 = X_1 + K_{A \to 1}(\hat{X}_A - X_A)$$
$$= X_1 + P_{A,1}^T (P_A)^{-1}(P_A S^{-1}(X_B - X_A))$$
$$= X_1 + P_{A,1}^T S^{-1}(X_B - X_A)$$

$$\vec{X}_2 = X_2 + K_{1 \to 2}(\hat{X}_1 - X_1)$$
$$= X_2 + P_{1,2}^T (P_1)^{-1}(P_{A,1}^T S^{-1}(X_B - X_A))$$
$$= X_2 + (P_{A,1}(P_1)^{-1} P_{1,2})^T S^{-1}(X_B - X_A)$$
$$= X_2 + P_{A \to 2}^T S^{-1}(X_B - X_A)$$

$$\vec{X}_3 = X_3 + K_{2 \to 3}(\hat{X}_2 - X_2)$$
$$= X_3 + P_{2,3}^T (P_2)^{-1}(P_{A \to 2}^T S^{-1}(X_B - X_A))$$
$$= X_3 + (P_{A \to 2}(P_2)^{-1} P_{2,3})^T S^{-1}(X_B - X_A)$$
$$= X_3 + P_{A \to 3}^T S^{-1}(X_B - X_A)$$

$$\vdots$$

$$\vec{X}_i = X_i + P_{A \to i}^T S^{-1}(X_B - X_A)$$

$$\vec{X}_B = X_B + P_{A \to B}^T S^{-1}(X_B - X_A)$$

$$\overleftarrow{X}_n = X_n + K_{B \to n}(\hat{X}_B - X_B)$$
$$= X_n + P_{B,n}^T (P_B)^{-1}(P_B S^{-1}(X_A - X_B))$$
$$= X_n + P_{n,B} S^{-1}(X_A - X_B)$$

$$\overleftarrow{X}_{n-1} X_{n-1} + K_{n \to n-1}(\hat{X}_n - X_n)$$
$$= X_{n-1} + P_{n,n-1}^T (P_n)^{-1}(P_{n,B} S^{-1}(X_A - X_B))$$
$$= X_{n-1} + (P_{n-1,n}(P_n)^{-1} P_{n,B}) S^{-1}(X_A - X_B)$$
$$= X_{n-1} + P_{n-1 \to B} S^{-1}(X_A - X_B)$$

$$\vdots$$

$$\overleftarrow{X}_i = X_i + P_{i \to B} S^{-1}(X_A - X_B)$$

$$\overleftarrow{X}_A = X_A + P_{A \to B} S^{-1}(X_A - X_B)$$

Ripples are additive so the two opposing ripples can simply be added at every pose, and at the end landmarks. To be more specific, the difference due to the ripple can be added.

$$\hat{X}_A = X_A + (\vec{X}_A - X_A) + (\overleftarrow{X}_A - X_A)$$
$$= X_A + P_A S^{-1}(X_B - X_A) + P_{A \to B} S^{-1}(X_A - X_B)$$
$$= X_A + (P_A - P_{A \to B}) S^{-1}(X_B - X_A)$$

$$\hat{X}_B = X_B + (\vec{X}_B - X_B) + (\overleftarrow{X}_B - X_B)$$
$$= X_B + P_{A \to B}^T S^{-1}(X_B - X_A) + P_B S^{-1}(X_A - X_B)$$
$$= X_B + (P_{A \to B}^T - P_B) S^{-1}(X_B - X_A)$$

$$\hat{X}_A - \hat{X}_B = (X_A + (P_A - P_{A \to B}) S^{-1}(X_B - X_A)) - (X_B + (P_{A \to B}^T - P_B) S^{-1}(X_B - X_A))$$
$$= -(X_B - X_A) + (P_A - P_{A \to B} - P_{A \to B}^T + P_B) S^{-1}(X_B - X_A)$$
$$= -(X_B - X_A) + S S^{-1}(X_B - X_A)$$
$$= 0$$
$$\therefore \hat{X}_A = \hat{X}_B$$

The primary advantage of HAR-SLAM is its low computational cost. The computation grows linearly with the number of states and landmarks, while in typical Kalman based SLAM algorithms computations grow quadratically, and in particle filters computations grow exponentially. FastSLAM is the closest in computational cost, with the same linear growth with poses and number of landmarks; however, FastSLAM maintains several particles each with its own map compared to the single map in HAR-SLAM. Depending on how many particles FastSLAM has, FastSLAM could require more or less computation than HAR-SLAM.

HAR-SLAM can have every link and state update in parallel. It will not necessarily get the exact optimal results per ripple, but the system should settle to the correct answer, a tremendous speed boost from the parallelization of HAR-SLAM is possible. Parallel programming languages like CUDA, which runs on graphics cards can easily be used to speed up HAR-SLAM [23]. If the system does not settle, a practical addition would be a dampening coefficient (between 0 and 1) multiplied to each gain.

Another main advantage of HAR-SLAM is that it actively corrects the map and entire history of the robot's poses. FastSLAM only selects the best map, but does not correct the position of the robot. HAR-SLAM is similar to GraphSLAM and the Sparse Extended Information Filter (SIEF), which lend well to multiple robots and large map sizes. Those methods are known as "lazy" SLAM algorithms; they run in batch after the data is collected. HAR-SLAM is active, rippling changes to the entire map and to other robots.

A small advantage HAR-SLAM has over other methods is the ease and explicit definition of how to close-the-loop and merge multiple robot maps together. A simple shortest path algorithm can find the chain of connecting poses between two landmarks, and update the entire system.

The last main advantage of HAR-SLAM is its robust nature. By utilizing the Robust Kalman Filter for both low-level sensor acquisition, and for joining several robots to a common map, HAR-SLAM is able to remove outliers, and recover from bad data associations. Kalman filters in general cannot recover from unexpected errors, and particle filters can only recover from unexpected errors if enough random particles exist to shift the system to the true state.

Every method has its shortcomings, and HAR-SLAM is no exception. Though HAR-SLAM is active, and utilizes Kalman-like filters, by the act of extracting poses and features into a chain makes the system sub-optimal. Though the required behaviors for the system were shown, without every cross correlation from every pose and feature to every other pose and feature, the gains and ripple are not exact but an approximation. Thus, HAR-SLAM cannot achieve the system-wide optimal gains that a Kalman-based SLAM could achieve. Both SEIF and GraphSLAM suffer from this as well, as sparsification and landmark removal become approximations of the system correlations, but not the actual correlations.

While HAR-SLAM is computationally fast, it still requires a considerable amount of time to execute. The ripple is not the slow part of the algorithm; rather the Forgetful SLAM portion is the slow section. Though Forgetful SLAM operates in linear time using only the visible landmarks, the process has shown to be unable to keep up in a real time system due to the large number of landmarks that can be seen at once.

The key advantage HAR-SLAM has over other Kalman-based SLAM techniques is low computational complexity. HAR-SLAM only grows linearly over time, while both EKF-SLAM and GraphSLAM grow quadratically. FastSLAM is a particle filter based algorithm that has less computational complexity than HAR-SLAM; however, FastSLAM relies on having enough particles to correctly estimate the path and map. Since particles are not related to time, the computation time of FastSLAM does not grow over time, but instead remains constant. Particle resampling in FastSLAM does grow over time [17].

Table 28 shows the computational complexity of EKF-SLAM, GraphSLAM, HAR-SLAM, and FastSLAM. Estimates were not explicitly shown for FastSLAM particle resampling, which at best grows logarithmically with time [17]. The notation used for the computational complexity is big-O notation. The new landmarks observed at time t is $n_t$, on average it is noted as $\tilde{n}$. Reobserved landmarks at time t is $r_1$, on average it is noted as $\tilde{r}$. The dimension of the landmarks is d. Time is represented as t, which can be considered the number of iterations that have passed. For particle filters, k is the number of particles.

TABLE 28

Comparison of SLAM computational complexity

| Algorithm | Computational Complexity |
|---|---|
| EKF-SLAM | (reobserved landmarks) * (update expanded state) |

$$O\left((r_t)\left(\sum_{j=1}^{t} dn_j\right)^2\right) = O\left(\frac{\tilde{r}d^2\tilde{n}^2t^2}{2}\right) = O(\tilde{r}d^2\tilde{n}^2t^2) = O(t^2)$$

| GraphSLAM | (add observations to information matrix) + (reduce information matrix) + (solve information matrix) |
|---|---|

$$O((r_t + n_t)d^2) + O\left(d(r_t + n_t)\sum_{i=1}^{t} d\right) + O\left(\left(\sum_{i=1}^{t} d\right)^2\right) =$$

$$O\left((r_t + n_t)d^2 + \frac{(r_t + n_t)d^3 t}{2} + \frac{d^4 t^2}{4}\right) = O(1 + t + t^2) = O(t^2)$$

TABLE 28-continued

Comparison of SLAM computational complexity

| Algorithm | Computational Complexity |
|---|---|
| HAR-SLAM | (reobserved landmarks) * (update visible landmark state) + (add new landmarks) + (update past poses) + (update past landmarks) $$O((r_t)(r_t)^2) + O(n_t(r_t)^2) + O\left(\sum_{i=1}^{t} d^2\right) + O\left(\sum_{j=1}^{t} n_j d^2\right) =$$ $$O\left(\tilde{r}^3 + \tilde{n}\tilde{r}^2 + \frac{d^2 t}{2} + \frac{\tilde{n} d^2 t}{2}\right) = O((\tilde{n}+1)d^2 t) = O(t)$$ |
| FastSLAM | (number of particles) * (number of new and reobserved landmarks) * (update or create landmark) + (resample particles) $O(k(n_t + r_t)) * O(d^2) + O(k \log(t)) = O(kd^2 (\tilde{r} + \tilde{n}) + k \log(t)) = O(\log(t))$ |

Of the Kalman-based SLAM techniques, HAR-SLAM is less computationally expensive. Computation is linear in relation to time. Particle filter techniques are computationally superior to HAR-SLAM if the number of particles needed is less than t/log(t). In terms of storage space, Kalman-based techniques are typically quadratic, while FastSLAM is linear in terms of the number of landmarks. HAR-SLAM is linear compared to the number of landmarks, making it equivalent to FastSLAM.

HAR-SLAM was created with parallel processing, low computational cost, and multiple robots in mind. HAR-SLAM was designed to operate in real-time, given proper implementation and computational resources. All test results were processed after data collection, but simulated as if processed in real time. The heart of Cooperative SLAM with Landmark Promotion (LP-SLAM) is HAR-SLAM using Forgetful SLAM with extra thresholds to reduce the global map size. HAR-SLAM is the theoretical component of LP-SLAM, enforcing that all operations are theoretically sound, with proven gains, and methods to handle all update scenarios.

Cooperative SLAM with Landmark Promotion (LP-SLAM) consists of HAR-SLAM using Forgetful SLAM as a low-level sensor fusion, and incorporating visual features using LK-SURF. Specific modules are outlined for storing landmarks, matching landmarks to determine loop-closure, and sharing landmarks amongst robots. Spatial storage techniques are presented to improve landmark lookup time. Landmark matching methods are presented to reduce the likelihood of false matches. Selecting a group of landmarks at a time, SURF recall methods are used as an initial matching technique followed by using a threshold on the Mahalanobis distances of homography transformations using select features [24]. A cooperative mapping module is presented that determines the global offset and rotation of each robot. Extra methods are presented on cooperative control, path planning, and an alternate network design using a central server.

Figure 11:
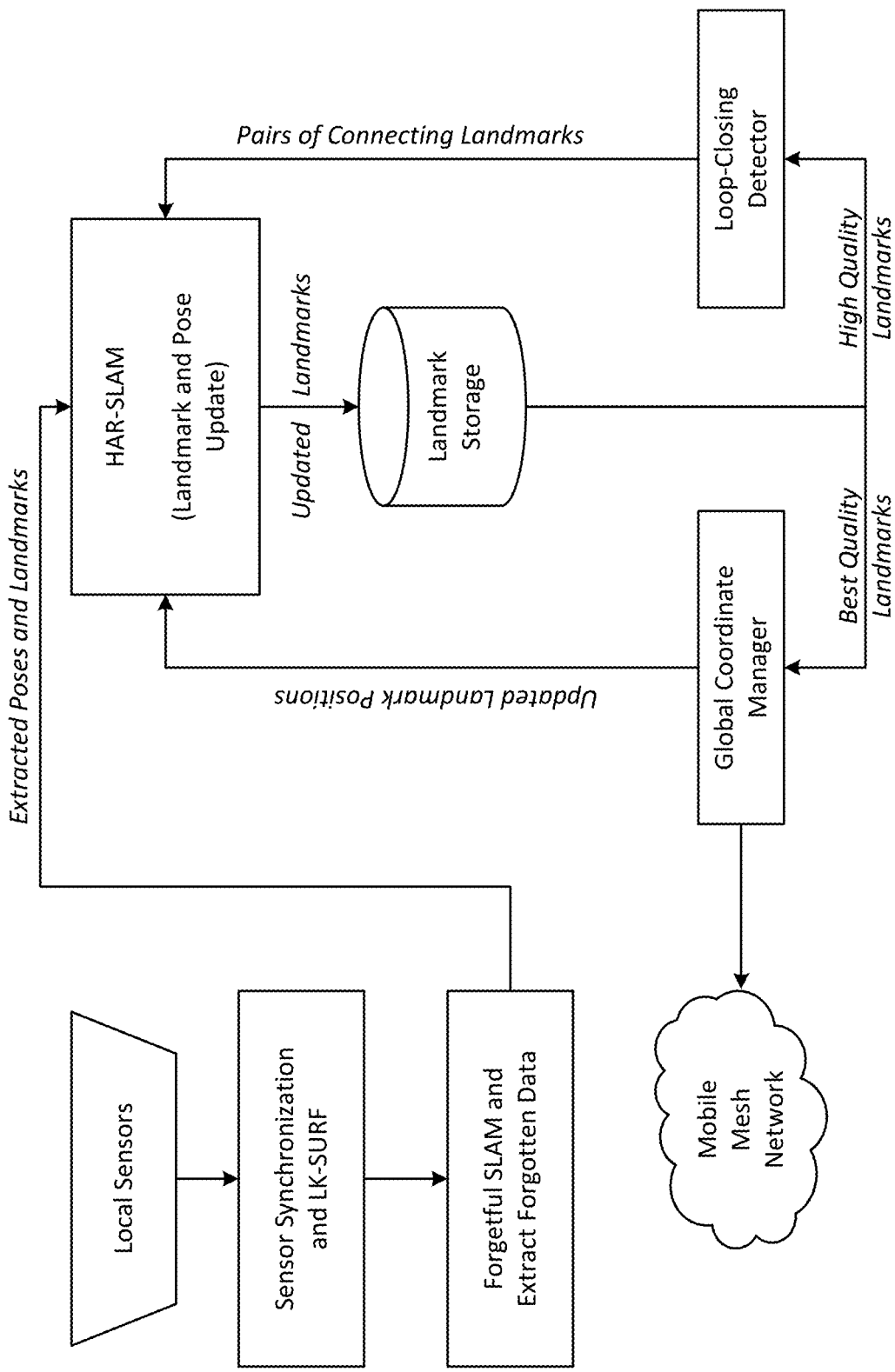
FIG. 11—Diagram of Cooperative LP-SLAM
FIG. 12—Figure-eight path; Left: Forgetful SLAM path; Right: HAR-SLAM updated path
FIG. 13—HAR-SLAM map with corrected path and landmark locations
FIG. 14—Sonar produced from HAR-SLAM path; Left: Raw sonar values; Right: Filtered sonar values
FIG. 15—Hybrid sonar and visual landmark map on figure-eight path
FIG. 16—Hybrid sonar and visual landmark map on short counterclockwise loop (left) and long clockwise loop (right)
FIG. 17—CAD drawing of the test location; Left: layout with approximate location of furniture; Right: HAR-SLAM map and path drawn on top of the CAD drawing
FIG. 18—Paths with marked features for promotion; Top-Left: Figure-eight path; Top-Right: Long clockwise path; Bottom: Short counterclockwise loop
FIG. 19—Histogram of landmark strength, calculated by the landmark promotion metric for the figure-eight path
FIG. 20—Visual landmark maps generated by Cooperative LP-SLAM using Figure-eight path, long clockwise path, and short counterclockwise path
FIG. 21—Sonar maps generated by Cooperative LP-SLAM using Figure-eight path, long clockwise path, and short counterclockwise path
FIG. 22—View of the test platform
FIG. 23—CAD design of custom chassis modifications [27]
FIGS. 24A, 24B, and 24C—Diagram, schematic, and view of the sensor acquisition board [27]
FIG. 25—Encoder parts and assembled encoder [27]
FIG. 26—Close view of the TRX INU with Point Grey cameras, the Optical INU
FIG. 27—ASL Framework hierarchy
FIG. 28—ASL Framework data flow
FIGS. 29A, 29B, and 29C—Sample screenshots of the ASL Application
FIG. 30—Diagram of connecting devices (blue) and functional units (black) for Cooperative LP-SLAM
FIGS. 31A, 31B, 31C, and 31D—Point Grey camera status and settings panels
FIG. 32—Parallax servo controller device status and parameter panel
FIG. 33—Xbox controller device status panel
FIG. 34—Mesh networking device status and parameter panels [36]
FIG. 35—Snapshot of stereo synchronizer functional unit
FIG. 36—Snapshot of stereo rectifier functional unit
FIG. 37—Snapshot of LK-SURF functional unit
FIG. 38—Encoder calibration environment [27]
FIG. 39—Histogram and Gaussian fit for sample encoder calibration FIGS. 40A and 40B—Matlab toolbox calibration—camera-centered (left) and world-centered (right) views given multiple checkerboard samples FIG. 41—Screenshot of stereo camera calibration in ASL FIG. 42—Top: Sample unprocessed stereo image pair; Bottom: Rectified stereo image pair FIG. 43—Diagram of an epipolar line [29]

Cooperative Landmark Promotion SLAM is the combination of many elements presented herein. FIG. 11 illustrates the different modules contained in Cooperative LP-SLAM. Initially, sensors are synchronized to match the image acquisition frequency. After being synchronized, stereo images are processed with LK-SURF, which extract and identify visual features. Visual features along with the synchronized control and sensor data are sent to Forgetful SLAM. Forgetful SLAM maintains the current state. As poses and landmarks are removed from the current state, they are extracted and sent to the HAR-SLAM mapping module. This module maintains the map as a set of links (see FIG. 10). Landmarks are sent to the loop-closing detector and to the global coordinate manager. Each of these modules maintains a spatial database of landmarks, which is illustrated by a common storage block in the diagram. The loop-closing detector compares incoming landmarks to the current database to find matches. Once a match has been made, the matched pair of landmarks is sent back to the HAR-SLAM mapping module. The global coordinate manager communicates with other robots. Only landmarks that pass a quality threshold are shared with other robots in order to limit network. Cooperatively, the global coordinate manager determines the global coordinate transform of each robot, which results in an update to landmarks that were linked to other robots.

The environmental data in LP-SLAM is the 3D visual landmarks. Using stereo cameras and LK-SURF, image features are projected into 3D space. Each feature has a descriptor from SURF, which consists of a vector of 64 floating-point numbers. As Forgetful SLAM runs, these features are correlated, filtered, and finally removed from Forgetful SLAM providing a location in the robot's local coordinate frame. In addition to a position, Forgetful SLAM provides an estimate of the covariance matrix associated with that map position, and a cross-covariance matrix linking that feature or map landmark to the last robot pose to see it. Thus, each landmark has five pieces of data, the position, the descriptor, a covariance matrix, a cross-covariance matrix, and the ID of the last pose to have seen that landmark.

In the HAR-SLAM mapping module, the storage of landmarks is done using a graph structure. Every pose state and covariance is attached to other poses and landmarks using references to their objects. Each reference is associated with a cross-covariance matrix in order to perform HAR-SLAM updates. Robot poses are linked and stored chronologically; this allows pose retrieval to occur in constant time. Landmarks are linked to only one state; landmark retrieval requires knowledge of the connecting pose. The graph structure of this module allows HAR-SLAM updates to occur in linear time with the number of elements in the graph.

In order to perform loop-closing, new landmarks need to be compared to the entire map of landmarks. Each feature or landmark has a descriptor from SURF. This descriptor is used for matching. Each landmark also has a position, a covariance matrix, a cross covariance matrix, and an ID of the pose that last saw the landmark. Matching not only involves descriptor comparisons, but position comparisons. An efficient approach for storing data is a hash-grid [25] [26]. Hash-grid storage uses a position based hash code to store landmarks in bins. A hash-grid can create bins dynamically as needed, thus storage space is not wasted with empty bins. With a hash-grid, if a location is known then lookup time is constant. Searching a space for landmarks is constant, but depends on the resolution of the bins, and the size of the search space.

The global coordinate manager module needs to access all landmarks regardless of location or connected pose. Storage for this module is a list of the features. The module shares the list with other robots, and in return receives lists of features from other robots. Since there is no advantage to spatial storage or chronological storage, the only improvement that can be made to speed up performance and storage is to use fewer landmarks.

In order to limit the number of landmarks promoted to the global coordinate manger, a metric is created that reflects reliability. The cross covariance matrix between the landmark and pose is used in combination with the inverse of the landmark covariance matrix to determine how much a landmark can affect a pose. The gain used in HAR-SLAM is adapted as a metric of the landmark's certainty: maxEigenvalue ($P_{cross}^T (P_{landmark})^{-1} P_{cross}$). This metric is similar to a Mahalanobis distance [24], which is commonly used in statistics as a metric. If the certainty metric of the landmark is smaller than a set threshold, it can be discarded. Landmarks sent from Forgetful SLAM to the HAR-SLAM mapping module can be filtered using this metric. The same is true for landmarks sent to the loop-closing detector, and the global coordinate manager.

Landmark matching is a critical process for both loop-closing and global coordinate determination. Since landmarks have SURF descriptors, a nearest neighbor ratio can be used to demine individual landmark matches. This is a typical feature matching technique used in computer vision [12]. The nearest neighbor ratio uses the Euclidean distance between two SURF feature descriptors as a cost: $\sqrt{(a-b)^T (a-b)}$. A match is determined if the lowest cost is less than a threshold fraction of the next lowest match using the same landmark. SURF was tested using various ratios; the best nearest neighbor ratio was 0.7, which achieved a recognition rate of 82.6% on a set of tested features [12].

TABLE 29

Calculating landmark transformation

Landmark Homography Calculation
Matched Pair = $\langle x_i, \tilde{x}_i \rangle$   $x = [x, y, z]^T$ $$M = [\tilde{x}_1 \; \tilde{x}_2 \; \tilde{x}_3 \; \tilde{x}_4] \begin{bmatrix} x_1 & x_2 & x_3 & x_4 \\ 1 & 1 & 1 & 1 \end{bmatrix}^{-1}$$

Matching SURF features requires a group of landmarks since the nearest neighbor matching technique is used. In addition to SURF matching, once a set of landmarks are matched, a distance metric can be used to verify the match. If a group of at least four landmarks is matched to another group then a homography calculation can be calculated. Table 29 shows the equation to calculate a homography transformation given a set of four matches. The transformation produces a rotation and translation that can be used to determine spatial fitness. Each match produces a spatial distance based on the Mahalanobis distance [24]. Table 30 shows the distance metric between two landmarks after the transformation is applied. The average distance of each match in a group is used as the group metric. If this average distance falls below a set threshold, the group can be accepted as successful matches. If a group contains more than four matches, homography calculation exists to best estimate the transformation; however, a successful technique used in image processing for homography calculations is random sample consensus (RANSAC) [9]. Selecting four matches at random from the group, the entire group average distance can be calculated using the metric in Table 30. After a set number of random selections, the transformation with the lowest average distance is kept as the best transformation.

TABLE 30

Calculation of landmark fitness

Landmark Match Distance Function

Matched Pair = $\langle x_i, \tilde{x}_i \rangle$   $x = [x, y, z]^T$   $P_i, \tilde{P}_i$ = 3x3 covariance matrices
Transformation Matrix: M = [R  t] = 3x4 matrix of a rotation and translation $$Cost = \sqrt{(\tilde{x}_i - Rx_i - t)^T (R\tilde{P}_i R^T + P_i)^{-1} (\tilde{x}_i - Rx_i - t)}$$

Matching landmarks can occur at any time thanks to the nature of HAR-SLAM. Thus, we can consider landmark matching a background process that occurs at any interval. Incorrect landmark matching is avoided by comparing groups of landmarks to other groups of landmarks. Comparing two groups requires that the SURF descriptors match, and that an affine transformation can map one group's coordinates to the other group's coordinates. Setting overly strict thresholds reduces the risk of outliers entering the HAR-SLAM mapping routine.

When matching a group of landmarks, the entire map of landmarks should be compared to the current group to determine if a loop has been closed. However, this process can be sped up by limiting comparisons to a certain subset of landmarks, which is not optimal, but practical. Each landmark has a covariance matrix that expresses the uncertainty in the landmark's position estimate. The size of the search space around each landmark can be defined as a function of the uncertainty by limiting the lookup space relative to the covariance matrix. In practice, this can be done by finding the eigenvectors of the covariance matrix, then finding the rotated bounding box that bounds a set ratio of each eigenvector in both positive and negative directions to form the region. Since the landmarks are stored in a hash-grid, each landmark has a very limited lookup space, and the search for potential matches requires very few operations.

Map merging is a difficult process in most SLAM algorithms. SEIF has shown to lend itself well to the multiple robot case, but only as an aftermath in batch mode [17]. HAR-SLAM allows multiple robots to join maps actively whenever an outside process decides what landmarks to join. In order to join maps, the algorithm needs to decide when features are in common, and which features to select.

The global coordinate manager is the external module to HAR-SLAM that decides which features are shared with other robots, and calculates the global coordinate transformation. The promotion metric can be used to limit the landmarks the global coordinate manager receives. The module shares landmarks with all robots in the mesh network, and receives landmarks from other robots. The array of landmarks from each robot is compared to every other robot. The same landmark matching technique that is used in loop-closing is used to determine matches between robots. Though landmarks are in different coordinate frames, the homography transformation still works. A strict threshold on the average distance metric should be used to limit the chance of false matches.

The global coordinate manager cooperates with other robots by dividing work. Each robot compares its own set of landmarks to all other robots. There is a level of redundancy by a factor of two, but this redundancy can be used to validate a match. Each match is shared amongst all robots. After every robot completes the matching phase, the global coordinate update filter can be used. The method is deterministic, so each robot can calculate the global coordinate transformation locally using the common list of matched landmarks each robot received. The filter uses a subset of matched landmarks. The subset of matched landmarks involving the local robot is updated based on HAR-SLAM update equations. The updated landmarks are sent to the HAR-SLAM mapping module, as indicate in FIG. 11. The global coordinate manager operates independently of the HAR-SLAM mapping module, and can perform updates at any time.

Cooperative control is important for autonomous mapping of buildings. LP-SLAM and HAR-SLAM have an interesting advantage based on map storage. By using a set of linked poses, the path connecting two regions is always known.

LP-SLAM has a unique advantage in map formation. Every landmark and data sample is associated with a robot location; this means that every point of the map has an associated pose and thus a chain of poses that connect any two points on the map. Overlapping paths and multiple robot paths would take a little extra work to create intersection nodes, but the entire map is already a graph of poses. Simple path planning algorithms can run on top of this connected graph in order to find shortest paths.

This application allows robots not only to map a region, but return to any position in the map. Navigation becomes much simpler when a known path exists, only obstacle avoidance needs to be considered along a set trajectory. This idea can be expanded to have special sensors pick up or interpret labels, allowing the robot to know where a particular label is associated on the map, and allowing the robot to return to that position. Such sensor could be speech recognition engines that interpret voice commands, or optical character recognition that could read door numbers.

Instead of having the global coordinate manager cooperatively determine the global coordinate transformation, a server could be used. Instead of updating all robots, update only the server. The server would be responsible for the global coordinate system. It would perform the global coordinate update filter, report which matches were used in the filter, and transmit the newly updated coordinate system to each robot individually. This method would reduce network traffic by a factor linearly dependent on the number of robots; however, this increases the workload on a single machine. The increase in workload is linearly related to the number of robots. One point of performance increase is that only one machine would perform the global coordinate update filter; though, this allows for a single point of weakness in the network.

This section presents some examples that show maps LP-SLAM and HAR-SLAM produce. The examples in this section used LK-SURF to track visual features, filtered observed data using Forgetful SLAM, updated past map data using HAR-SLAM mapping, then finally detected and applied loop-closing.

Figure 12:
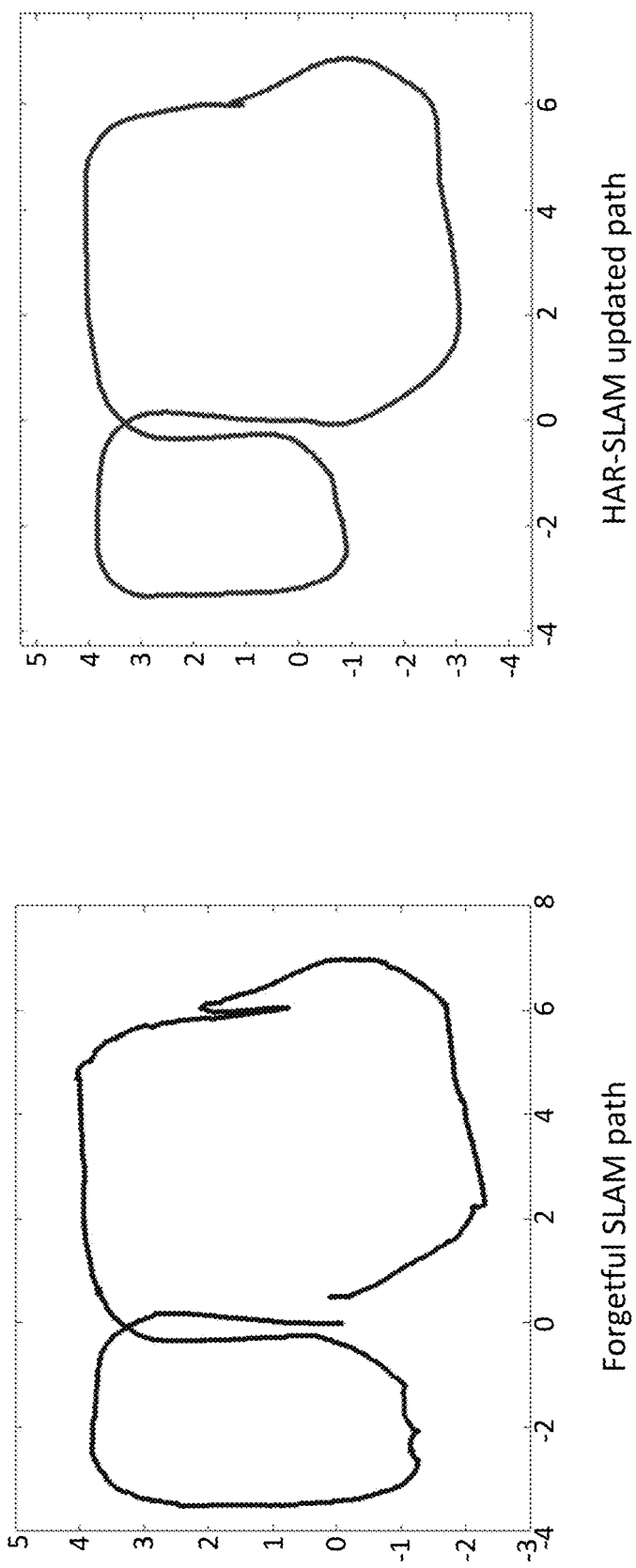

FIG. 12 compares the path generated by Forgetful SLAM and the path generated by HAR-SLAM. HAR-SLAM continuously modifies past elements using the rippling update. The updates appear to reduce the effect of outliers (notice the right side of the loop near coordinate (6, 1)). Loop-closing performed the final correction to the path and map. The Forgetful SLAM routine took 4.95 minutes to operate on a 2 minute path. All the HAR-SLAM rippling updates took 53.5 seconds. The loop-closing update only took 0.09 seconds. The total computation time of LP-SLAM was 5.84 minutes. EKF-SLAM took 16.98 hours, and did not include loop-closing (see FIG. 8).

Figure 13:
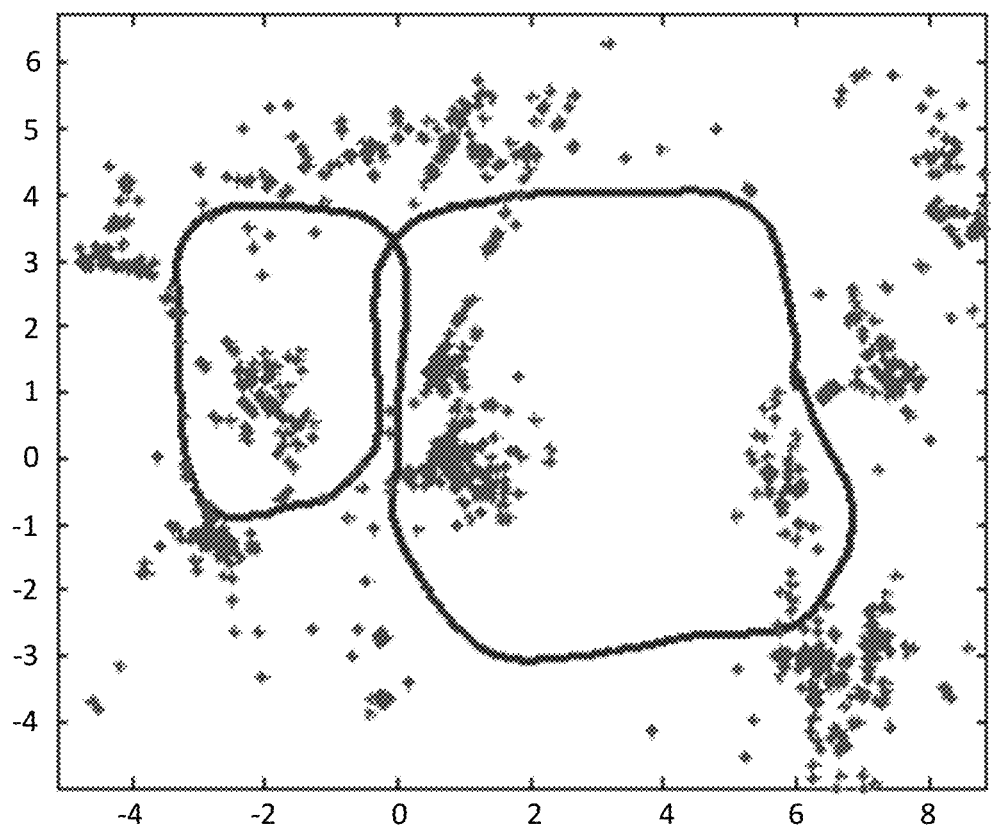

In addition to path corrections, HAR-SLAM maintains a map of landmarks. FIG. 13 shows locations of landmarks in 2D along with the path of the robot. The landmarks are not easy for humans to interpret since the landmarks are determined by visual features from LK-SURF. In order to present a better map, the ultrasonic ping sensors were used. The ping sensors are primarily used for obstacle avoidance. FIG. 14 shows the raw ranges from the ping sensors mapped using HAR-SLAM. The map is not corrected by sonar values. The right map in the figure shows a filtered version of the ping ranges. The values were filtered using an occupancy gird. The ranges provide a map of walls and obstacles in the environment.

Figure 15:
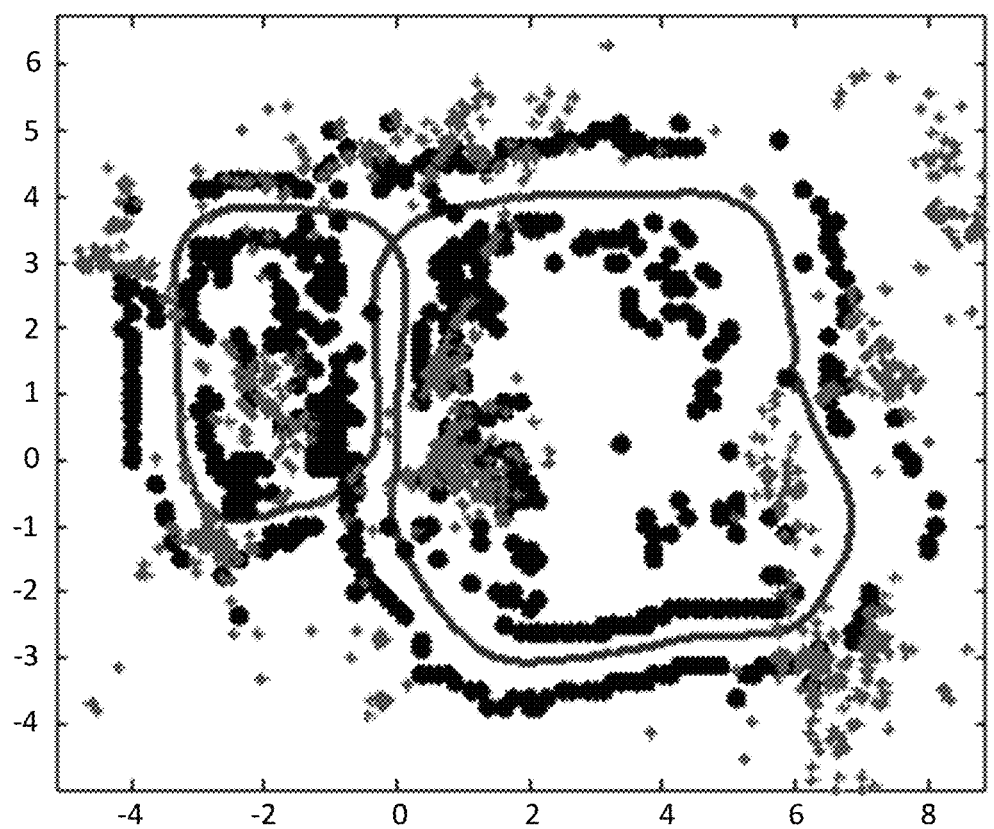

FIG. 15 shows the hybrid map of the sonar map from FIG. 14 and visual landmarks from FIG. 13. Some visual features align with detected obstacles. Many visual features exist randomly around the map; this is because features could be ceiling lights, floor tiles, textures on the wall, or any object in the room.

Figure 16:
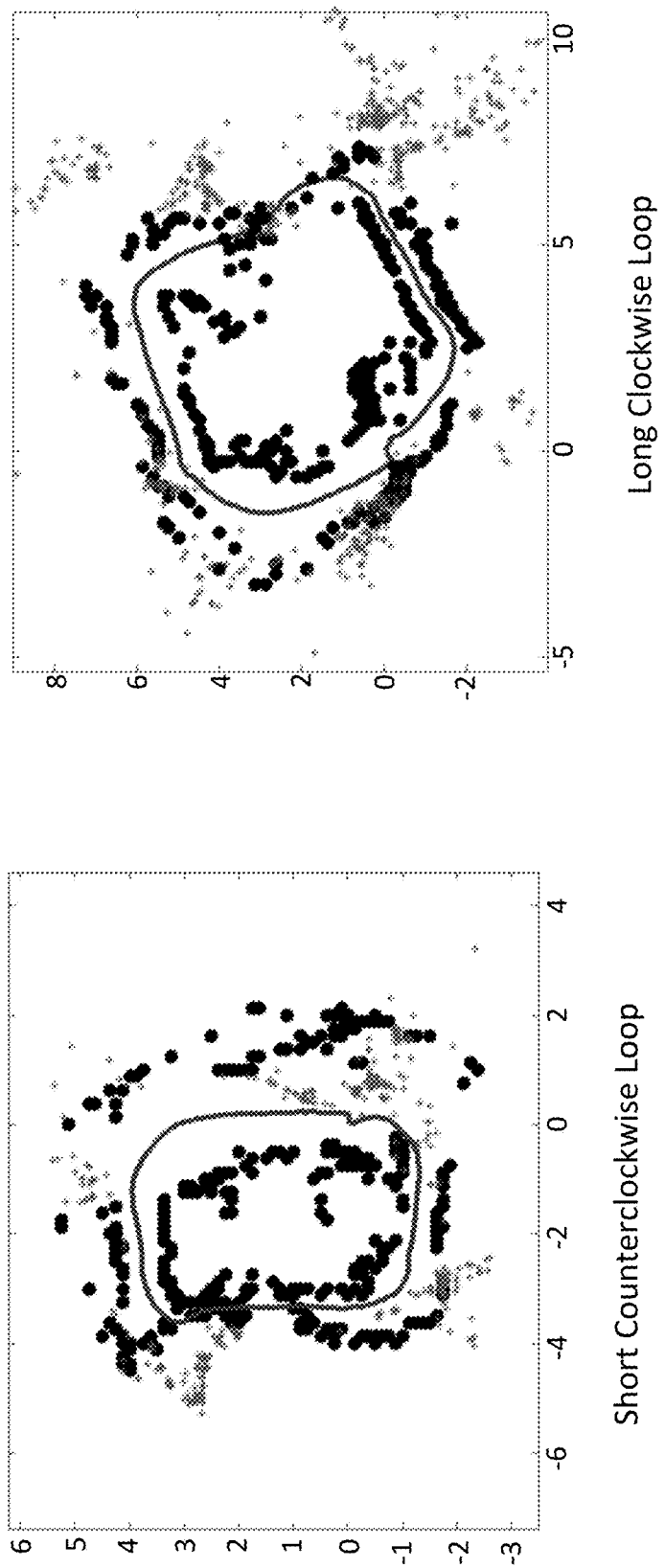

FIG. 16 shows two other maps generated using HAR-SLAM. The map on the left is the same area as the smaller loop on the left in FIG. 15; the right map is the same as the larger loop on the right in FIG. 15. Some of the visual landmarks appear to be in the same location as in FIG. 15, which would allow for map merging.

FIG. 17 shows a scale CAD drawing of the test location. The drawing includes the approximate location of furniture in the environment. On the right, the figure-eight path is drawn on top with ranging to obstacles and visual landmarks. Given the CAD drawing as a reference, visual landmarks appear to be located around furniture, walls, and doorframes. Obstacle ranging shows the bounds of walls and tables.

Figure 19:
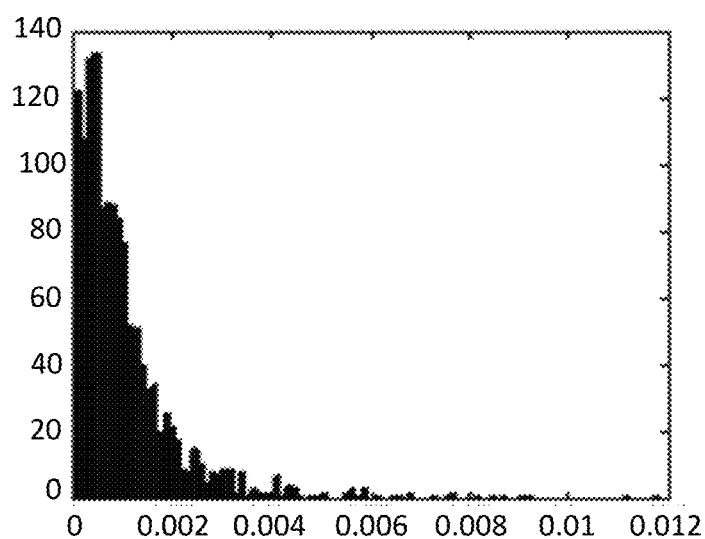
Figure 20:
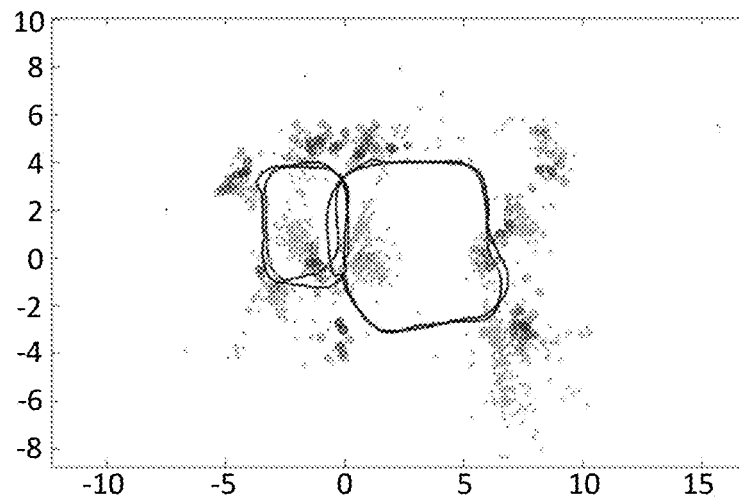
Figure 21:
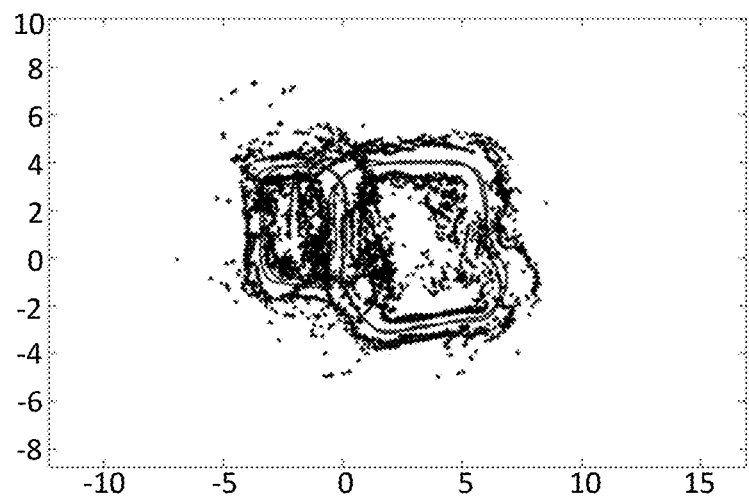

As an example, the three separate maps, generated using HAR-SLAM, are merged by calculating the global coordinate transform. First, to reduce computational complexity, features are filtered using the promotion metric. FIG. 18 shows the three example paths with features that were selected for promotion circled in red. For these examples, a threshold of 0.002 was used to promote landmarks. A histogram of the landmark strengths, as calculated by the landmark promotion metric, is shown in FIG. 19. The histogram contains data for the figure-eight path. FIG. 20 shows the merged map of visual landmarks from all three paths. Many of the selected landmarks are brought within close range of each other. FIG. 21 shows the sonar map, which shows how well the walls and obstacles align for this given example.

Figure 22:
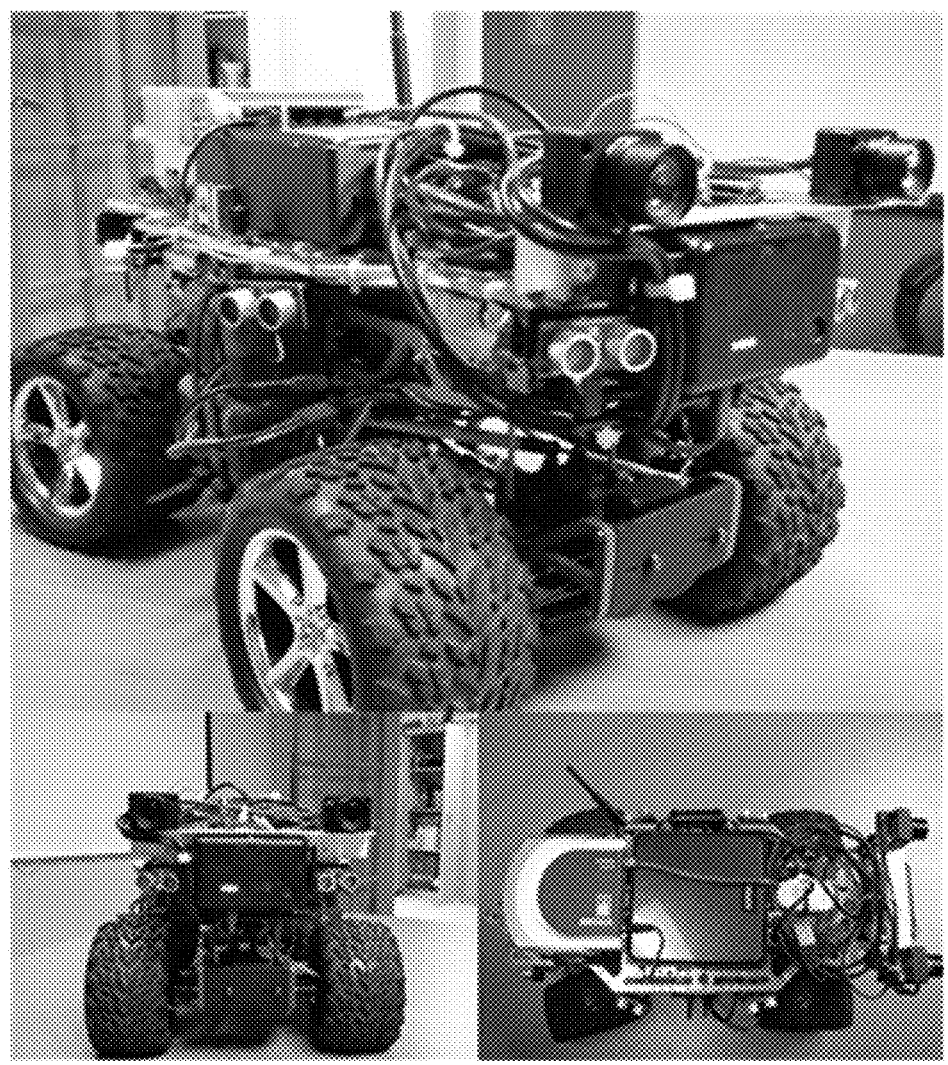

The test platform used for embodiments was a custom designed and built robot. The chassis of the robot is a Tamiya TXT-1 remote control truck. The upper platform is custom made, as are the sensor acquisition boards, the optical inertial navigation unit, wheel encoders, and the mounting brackets. FIG. 22 shows several views of the fully assembled test platform. The platform consists of two Firefly MV cameras from Point Grey mounted in front; under the cameras is the TRX INU with glowing lights indicating the unit is on. Those three components make up the Optical INU, which is mounted on the front of the robot. In the center is an AOpen miniPC, which is a miniature desktop with an Intel Core 2 Duo 2.0 GHz process and 2.0 GB of RAM. A high-powered Buffalo router is on the opposite side of the robot from the cameras. The blue packs on the sides of the robot are lithium-ion batteries that are connected to a DC voltage converter located under the router. The batteries power the PC, the router, and the USB hub. Around the outside of the custom mounting platform are eight ultrasonic ping sensors that are typically used for obstacle avoidance. Not clearly shown in this picture are two sensor acquisition boards, one used to acquire ultrasonic ping sensor data, the other to collect wheel encoder data. The wheel encoders are located inside the hub of each wheel and are not clearly shown. Finally, a Parallax servo controller is located under the custom platform to interface from the computer to the motor controller and steering servo.

Figure 23:
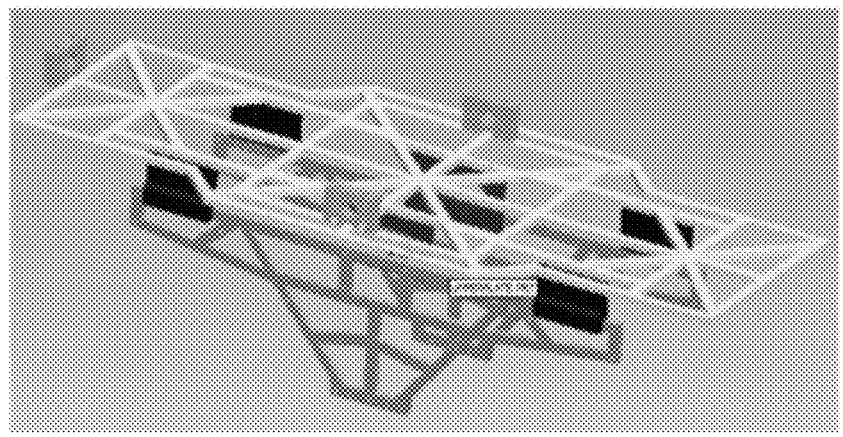

The metal platform on top of the Tamiya chassis was custom made and designed in the Autonomous Systems Laboratory (ASL). FIG. 23 shows the design of the top platform, the connecting brackets, and the accessory mounts. The platform has proved to very useful as most sensors, electronics, and accessories are mounted to the main platform.

The entire list of parts to build the test platform is shown in Table 31. The total cost of parts is estimated to be between $2,000 and $3,000, which is half target cost. This platform meets the goal of an inexpensive mobile sensing unit with high computational power.

TABLE 31

Test platform components

| | |
|---|---|
| 1 | Tanniya TXT-1 Monster Truck 4WD |
| 1 | Set of Custom ASL Platform and Brackets |
| 1 | AOpen Core 2 Duo miniPC (Windows XP Pro) |
| 1 | Buffalo WHR-HP-G54 Wireless Router |
| 1 | CarNetix CNX-1900 DC-DC Regulator |
| 1 | Novak Goat Crawler ESC |
| 1 | Parallax Servo Controller |
| 2 | ASL Sensor Boards |
| 2 | Point Grey Firefly MV Cameras |
| 4 | 11.1 V 6600 mAh Li-Ion Battery Pack |
| 2 | 8.4 V 4200 mAh NiMH Battery Pack |
| 4 | US Digital E4P Miniature Optical Encoder Kit |
| 8 | Parallax Ultrasonic Ping Sensors |
| 2 | Futaba HS-5645MG digital high torque servo |
| 1 | TRX Systems Inertial Navigation Unit (INU) |
| 1 | Wireless Xbox Controller and USB Receiver |

Figure 24A:
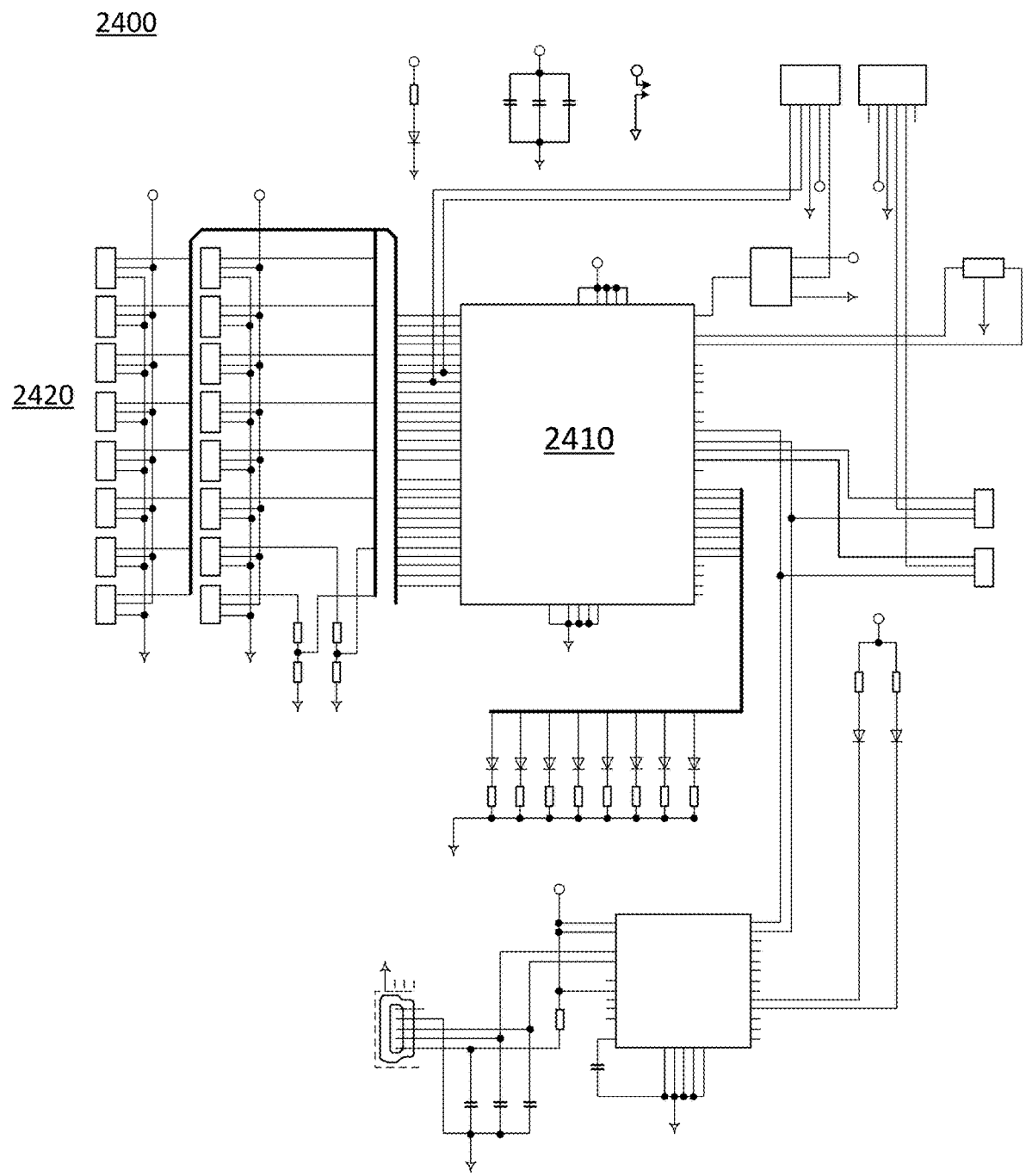

At the Autonomous Systems Lab (ASL), a sensor acquisition board was designed. The design is flexible enough that it was repurposed for independent projects as a motor controller, as a voltmeter, and a full array of digital, analog, and pulse width modulated sensors. A diagram of the sensor board, as well as a schematic of the layout, and the actual board itself are shown in FIGS. 24A, 24B, and 24C. The pin layout allows many different sensors to plug into the board directly. The board has a USB interface to the PC, and communicates over a serial protocol.

Figure 25:
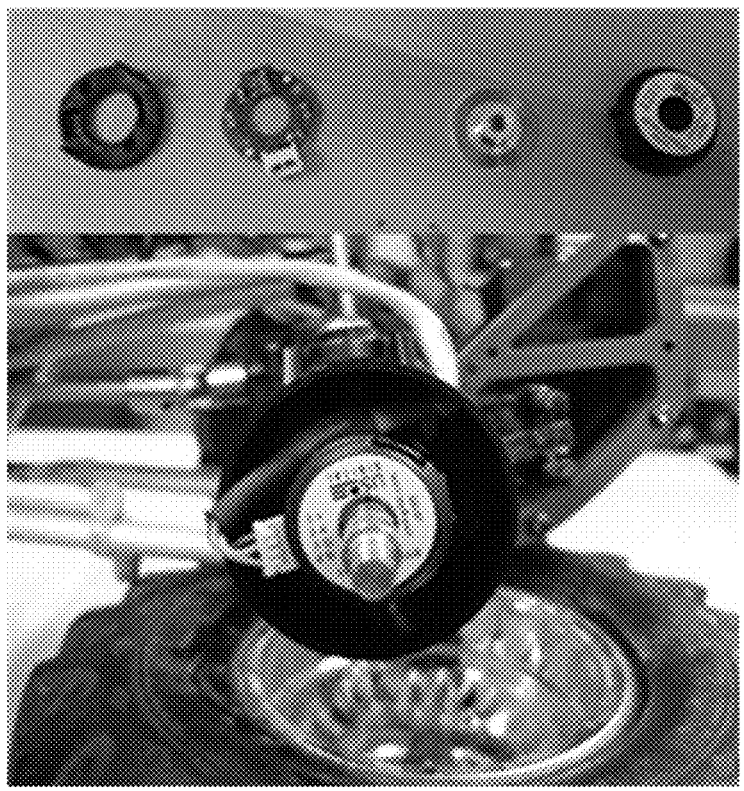

The ultrasonic ping sensors are visible in the main image of the test platform, but the encoders are hidden inside the wheel hubs. FIG. 25 shows the inside of the wheel hub, revealing the small encoder placed on the shaft. In the same figure, the individual parts of the encoder are shown, including the protective enclosure, the sensor board, and the marked disc. With approximately 1000 marks per rotation, the encoder has a resolution of 0.36 degrees.

Figure 26:
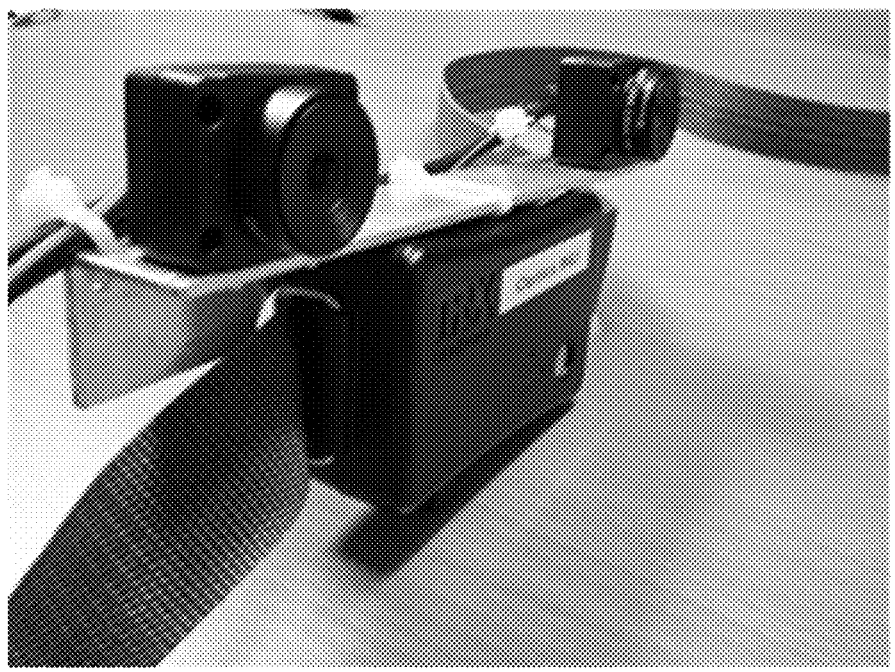

The Optical INU is a combination of Point Grey Firefly MV cameras and the TRX Systems Inertial Navigation Unit. The Firefly MV cameras are inexpensive machine vision cameras. Like most machine vision cameras, the lenses are interchangeable; this allows future work of comparing different lenses against Optical INU performance. Point Grey provides a .NET library to make interfacing to the camera quite simple. The TRX INU is a custom-made tracking device by TRX Systems [28] [29] [30] [31]. The device was designed to track humans in GPS-denied environments. It is typically worn on a belt around the waist. The device can also stream calibrated sensor data via USB. TRX developed a .NET library to interface with the device as well, making the data acquisition quite easy. FIG. 26 shows a TRX INU with a belt attached and the Firefly MV cameras, forming the Optical INU.

Each robot is equipped with a full PC. The PC, manufactured by AOpen, is a complete Windows XP machine with a Core 2 Duo processor at 2 GHz. Resembling a Mac Mini, the PC collects all sensor data and controls the robot's movement. An Xbox controller and USB receiver are attached to the robot to manually control its movement, and override an algorithm if the robot appears to be veering off course. This same platform is used for many projects in the Autonomous Systems Lab. The PC does not contain a Graphics Processing Unit (GPU) that can run CUDA or OpenCL. Due to the lack of a GPU, no parallel processing techniques can be explored using this computer. However, it is easy to replace the PC with a newer one since components are connected via USB.

A software framework, the ASL Framework, was created at the Autonomous Systems Lab. This framework was written in C# and works with all Windows Platforms. The ASL Framework makes use of several third-party libraries. Within this framework is an image processing suite based on Intel's OpenCV library [9]. For use in C#, a wrapper library called EMGU is used; it simply calls the native C++ OpenCV routines in C#. Image processing capabilities include color filters, edge detectors, blurring, corner detection with Harris corners [32], face tracking, and feature tracking with Lucas-Kanade Optic Flow [33].

This ASL Framework supports various hardware platforms, such as the Tamiya based platform used in the Autonomous Systems Lab. Additional platforms are supported, such as UMD's ENEE408I class robots, certain helicopters, the iCreate from iRobot, and several others. The framework is flexible enough to allow any platform to be integrated into the system. The framework includes networking capabilities, which allow the robots to behave as client-server models or as peer-to-peer networks. The framework's network implementation allows the robots to disconnect and reconnect at any given time—this allows the system to be as robust as possible with any network hardware. Given that the current platform implements mobile mesh networking, the system may break and reconnect at any given time without adverse effects.

Figure 27:
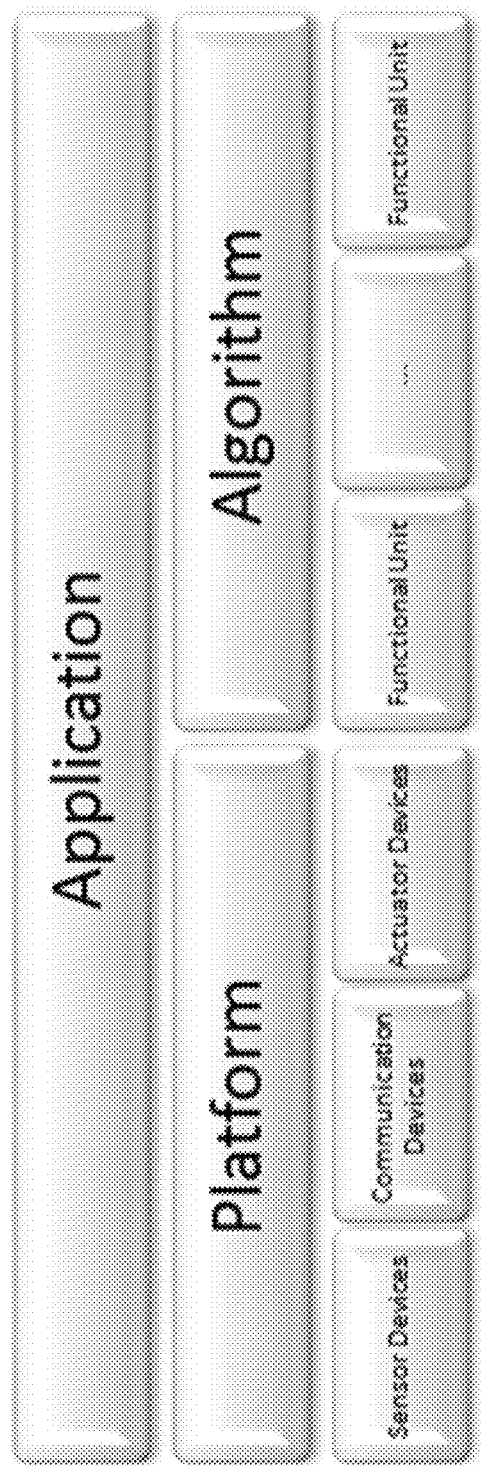

FIG. 27 shows the ASL Framework hierarchy. The executable application controls both a platform and an algorithm. A platform is defined as collection of sensors, actuators, and communication devices. For example, a camera and server network configuration could be described as a platform and used with various algorithms. The functional units perform core functions, such as feature detection, image processing, or perhaps a Kalman Filter. An algorithm is simply a collection of functional units in a particular order. They can be setup in parallel, in series, and even in cycles; however, cycles need to be carefully dealt with in code to prevent infinite loops.

Figure 28:
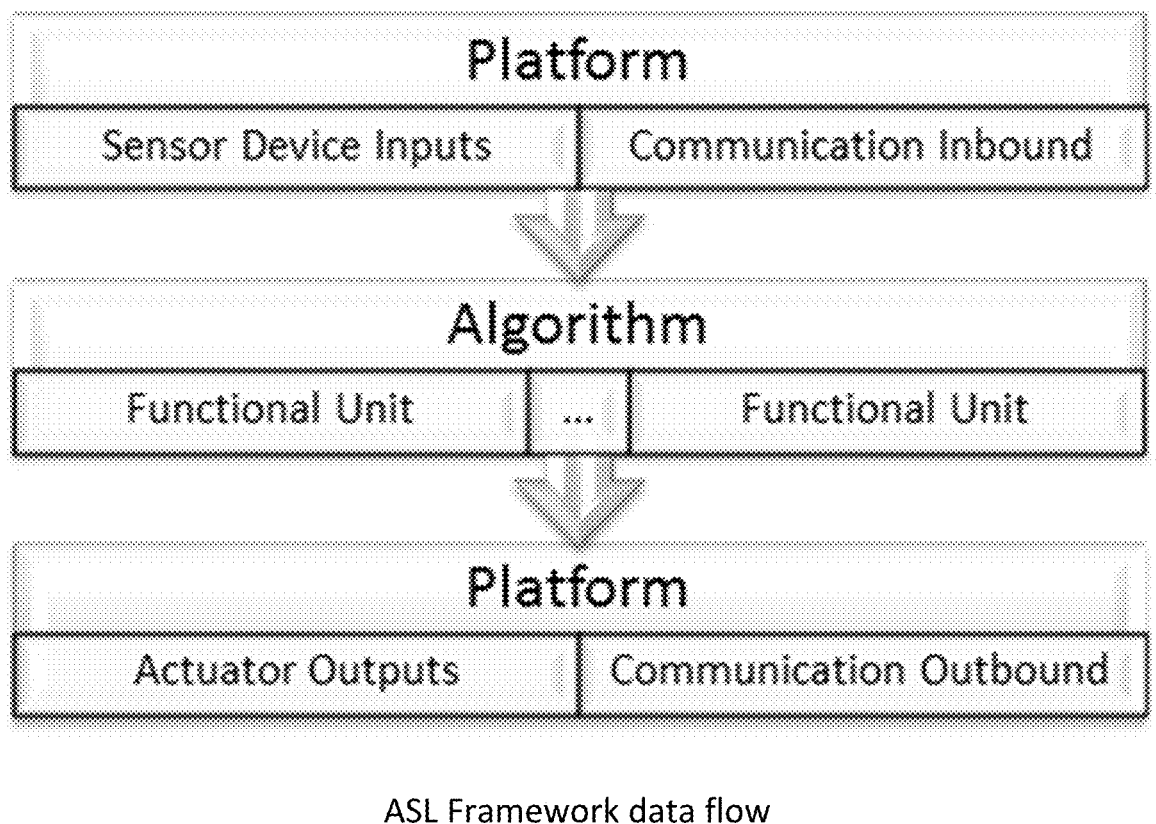

The entire system works as a flow as shown in FIG. 28. Data is collected from the sensors and from inbound communication from other robots. The data is transferred from the platform and into the algorithm. The algorithm then links this data into a chain of functional units. Afterwards, the chain returns outbound communication (the network and actuator information), and the robot moves or acts.

It is important to note that the framework is simply a way to organize algorithms and easily interface with hardware. Each component of the framework can be customized for any application. Our framework has been tested with UMD's ENEE408I class.

Figure 29B:
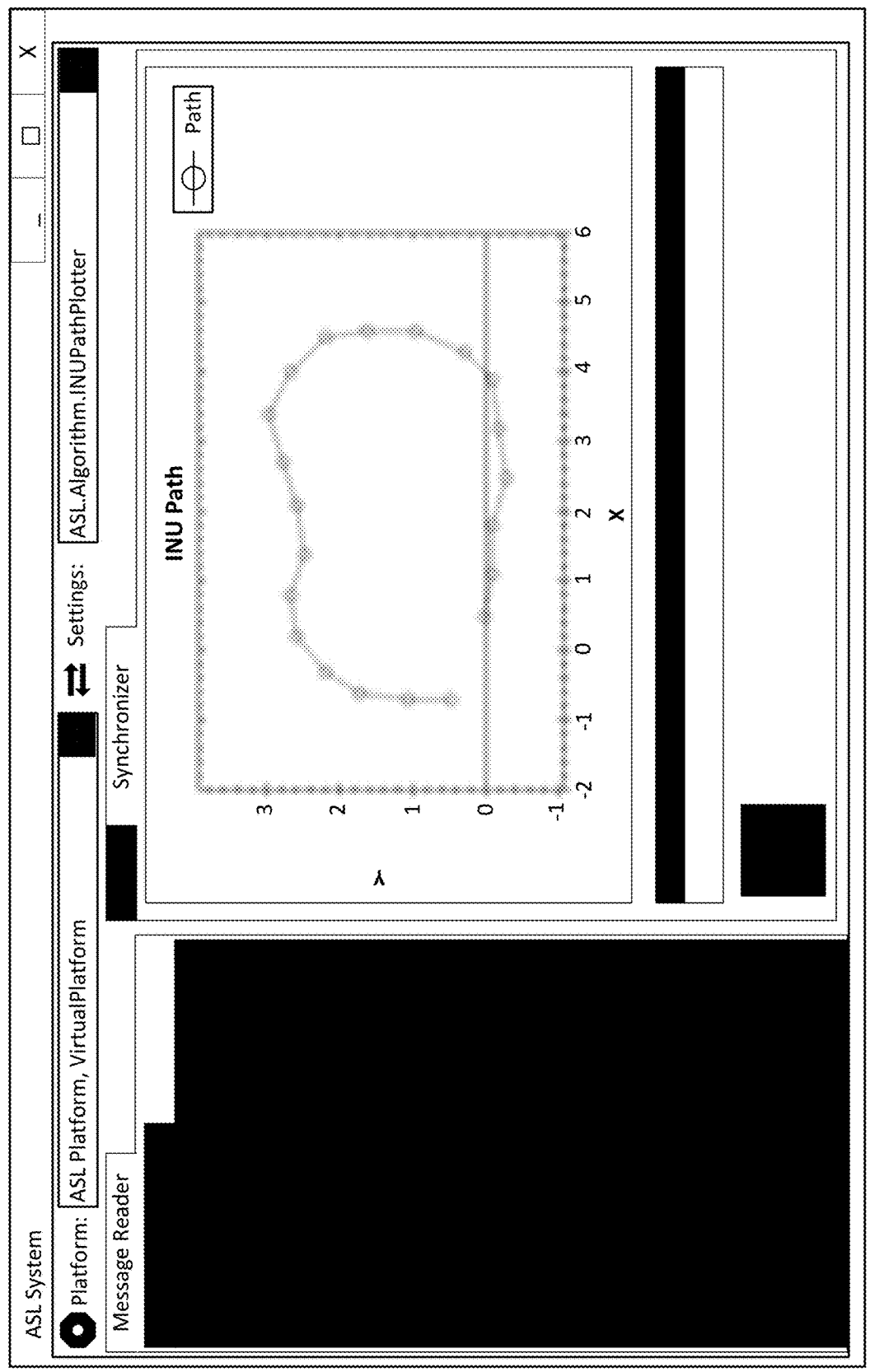
Figure 29C:
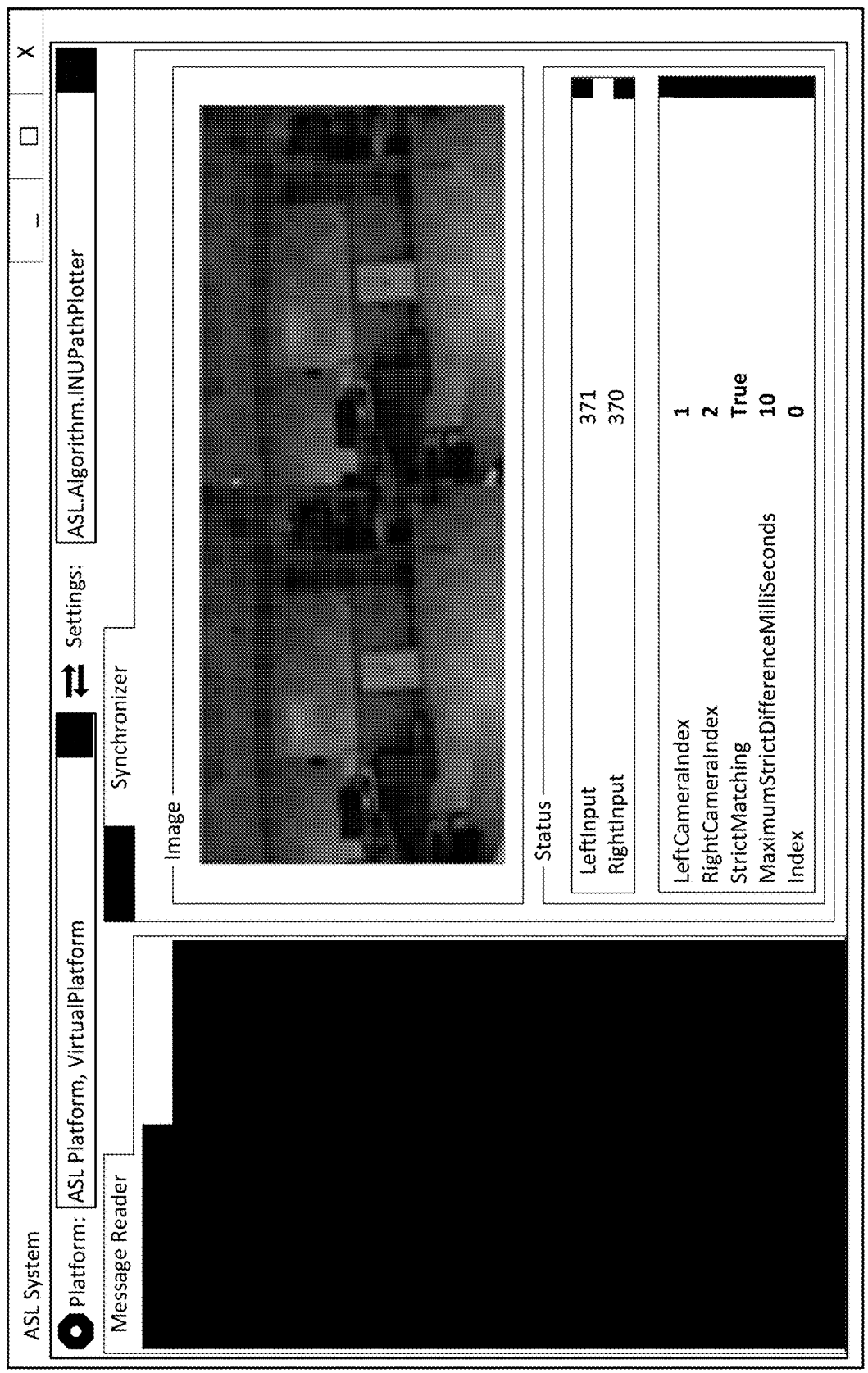

A few sample screenshots of the ASL Application are shown in FIGS. 29A, 29B and 29C. The ASL Application is the main program that selects the platform and algorithm, and actually initializes and starts the system. This application could be modified for command line versions or remote operation versions, but for simplicity, it is just a Windows application. These particular examples show a virtual platform being used; a virtual platform is a special platform that replays recorded data providing a fake robot. The virtual platform allows algorithms to be tested against the exact same data. The examples show the various displays the framework contains, with no end in options, from 3D rendering, to 2D plots, to stereo camera views.

An event-based architecture is a key component of the ASL Framework. In .NET languages like C#, event driven patterns are very fast. When an event is fired, functions listening to that event are called. In the ASL Framework, these events are all fired asynchronously, allowing multiple operations to perform in parallel across multiple cores. Typically, the ASL Framework can occupy all cores of a processor if a task requires the computing power. The framework takes care of all parallel processing issues by internally providing data locks and semaphores, thus there are no deadlock issues, or race conditions. Furthermore, if a functional unit becomes a bottleneck, the framework is designed to drop data in order to prevent the system from lagging behind.

The platform component of the ASL Framework is a collection of devices. A device interfaces either to hardware or to a network. Devices that interface to hardware have only two primary functions, collect sensor data and implement actuator data. Collecting sensor data results in listening to a port, polling for data, or directly interfacing using a third-party library. Once a sample of data has been collected, the sample is transmitted to the algorithm portion of the framework using the event architecture. Implementing actuator data involves receiving actuator packets that instruct a particular type of device to perform an action. This action is then carried out by interfacing to an external device, or sending instructions to a third-party library.

Communication based devices handle incoming and outgoing data to and from other robots. These modules can be UDP clients, multicast clients, servers, or a custom peer-to-peer UDP networking modules. The custom networking module is given in more detail in a later section. Communication devices can send any type of data supported by the ASL Framework, which includes all sensor information and all actuator information. The framework also supports tele-operation of the robot. A custom serialization module is used in the framework to compress all known data types. This is achieved through special indexing, which shows much better compression than standard .NET serialization. Data packets from the custom serialization module are approximately 10% the size of standard serialized objects from .NET.

The platform contains a list of all associated devices. Every device receives the same actuator information and only devices that accept a known actuator will operate on it. All sensor data is sent through the same event, resulting in the platform having a single input and output event structure. The communication side of the platform also has a single inbound and outbound event for traffic. This has an important consequence—any platform can be swapped with another platform so long as the expected input and output types are the same. Thus, we can run the same algorithm on many different types of robots, or use a simulator with no known difference to the algorithm. For example, the virtual platform used in the screenshots in FIGS. 29A, 29B and 29C is a specific platform that reads sensor logs taken at an earlier time and replays the data in the exact same way it was received the first time.

Algorithms are designed just like platforms, but with mirrored inputs and outputs. Algorithms input sensor data and output actuator data. Algorithms have the same communication inbound and outbound paths as platforms. Aside from the event connection scheme, algorithms are quite different from platforms. Algorithms have functional units, which are similar in theory to devices, except functional units all have the same input and output of actuators, data, sensors, and communication. Essentially a functional unit has four inputs and outputs of these specified types. An algorithm can arrange these functional units in any way creating interesting data paths.

An algorithm contains several stages. First at construction, all functional units are created and linked. These links can be changed at anytime during system operation; however, they are typically linked to functions that can switch the receiver of the data instead of switching the link itself. After construction, the platform begins to send data. This data flows into the algorithm and is sent to a sensor handling function and a communication handling function; these functions directs all incoming sensor data and communication data in the algorithm. Once data enters a functional unit, it is passed from one unit to another using the event architecture. Finally, functional units that send actuator or communication data outbound can link to the algorithm itself. The event architecture is vital to the operation of the ASL Framework.

Figure 30:
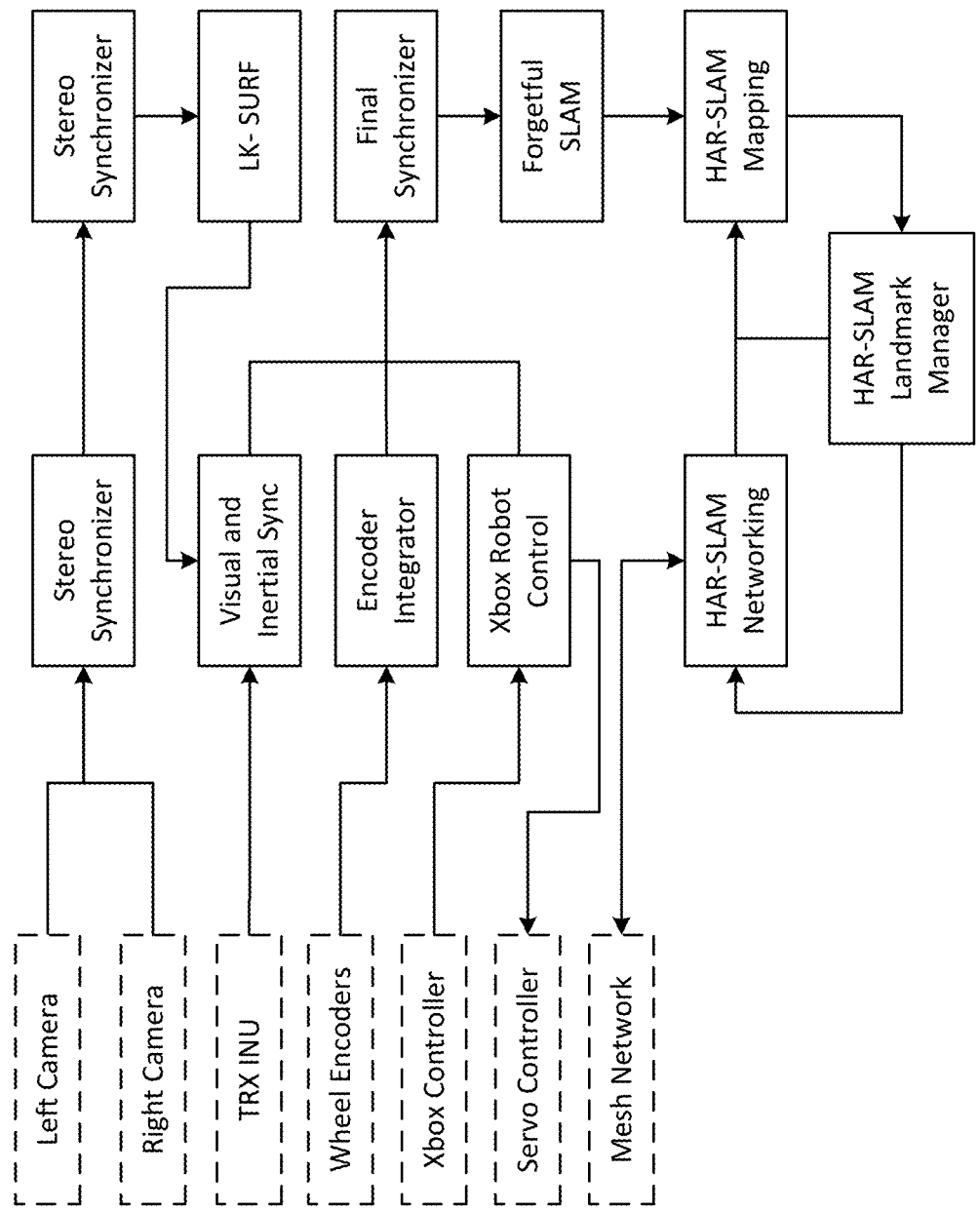

This section contains brief descriptions, screen shots, and a code diagram for all the components that are assembled to execute Cooperative LP-SLAM in the ASL Framework. FIG. 30 shows the diagram of connecting devices and functional units in the ASL Framework. The dotted boxes indicate devices on the Tamiya platform. The solid boxes indicate functional units in the Cooperative LP-SLAM algorithm. The connecting arrows indicate the flow of information over the event architecture.

Figure 31A:
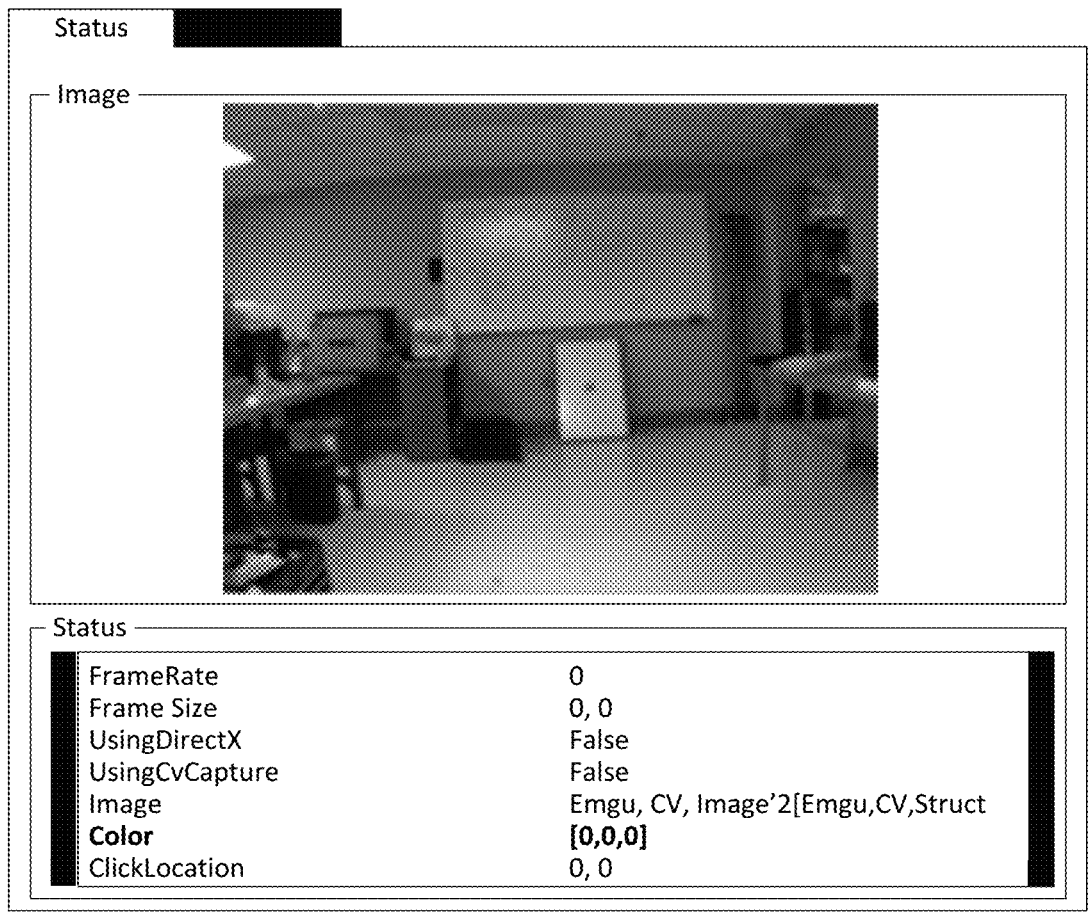
Figure 31B:
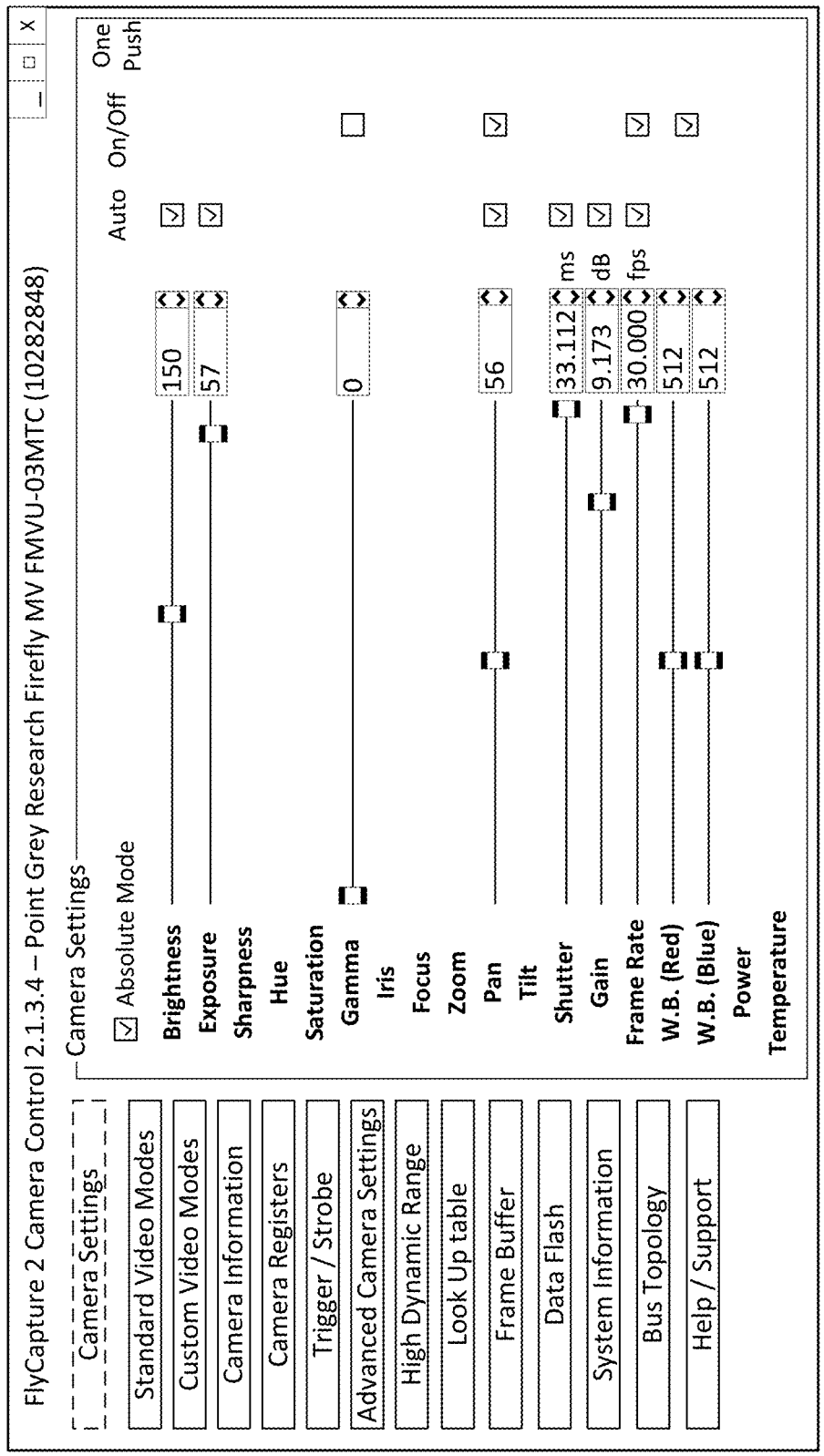
Figure 31C:
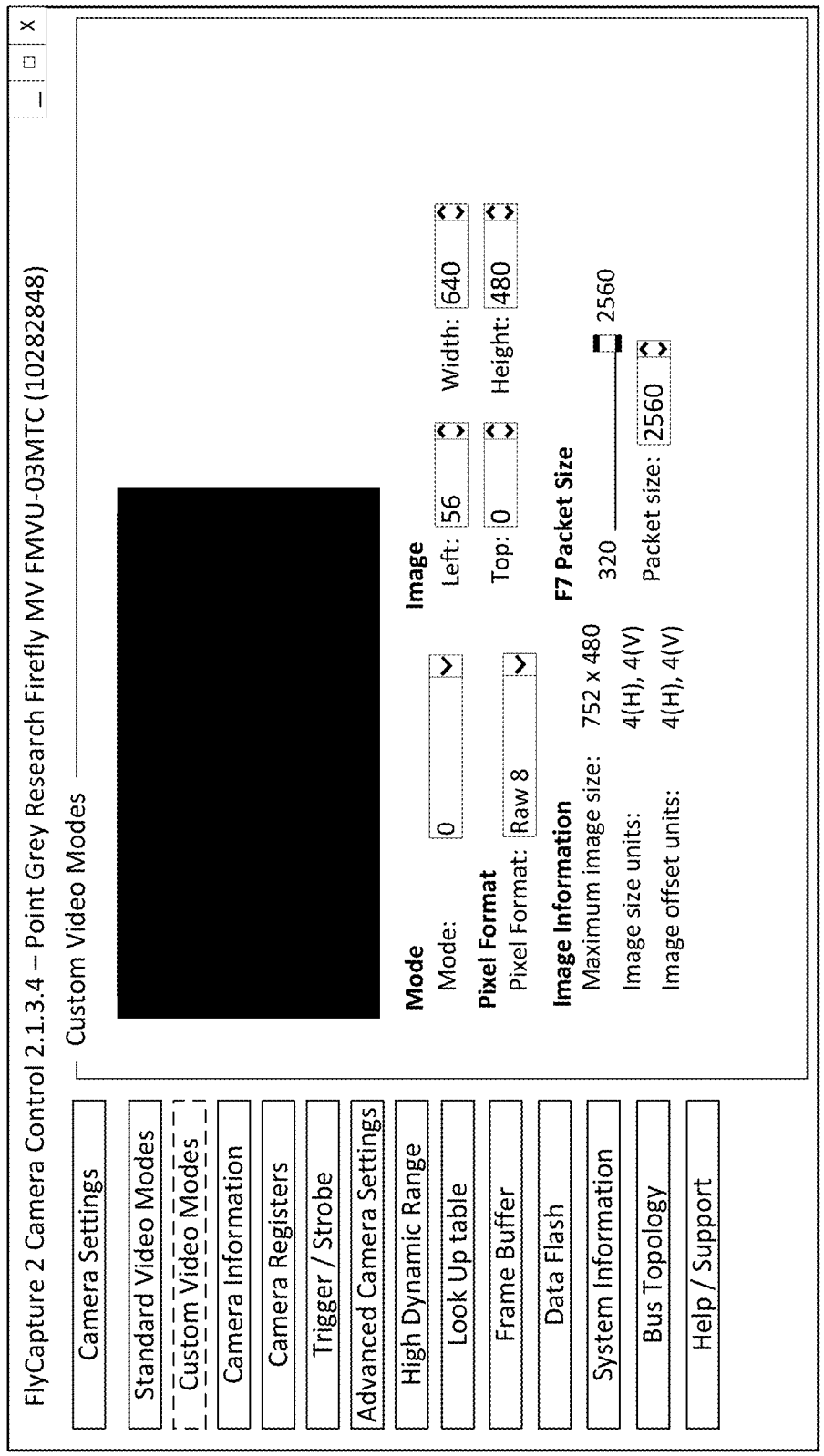
Figure 31D:
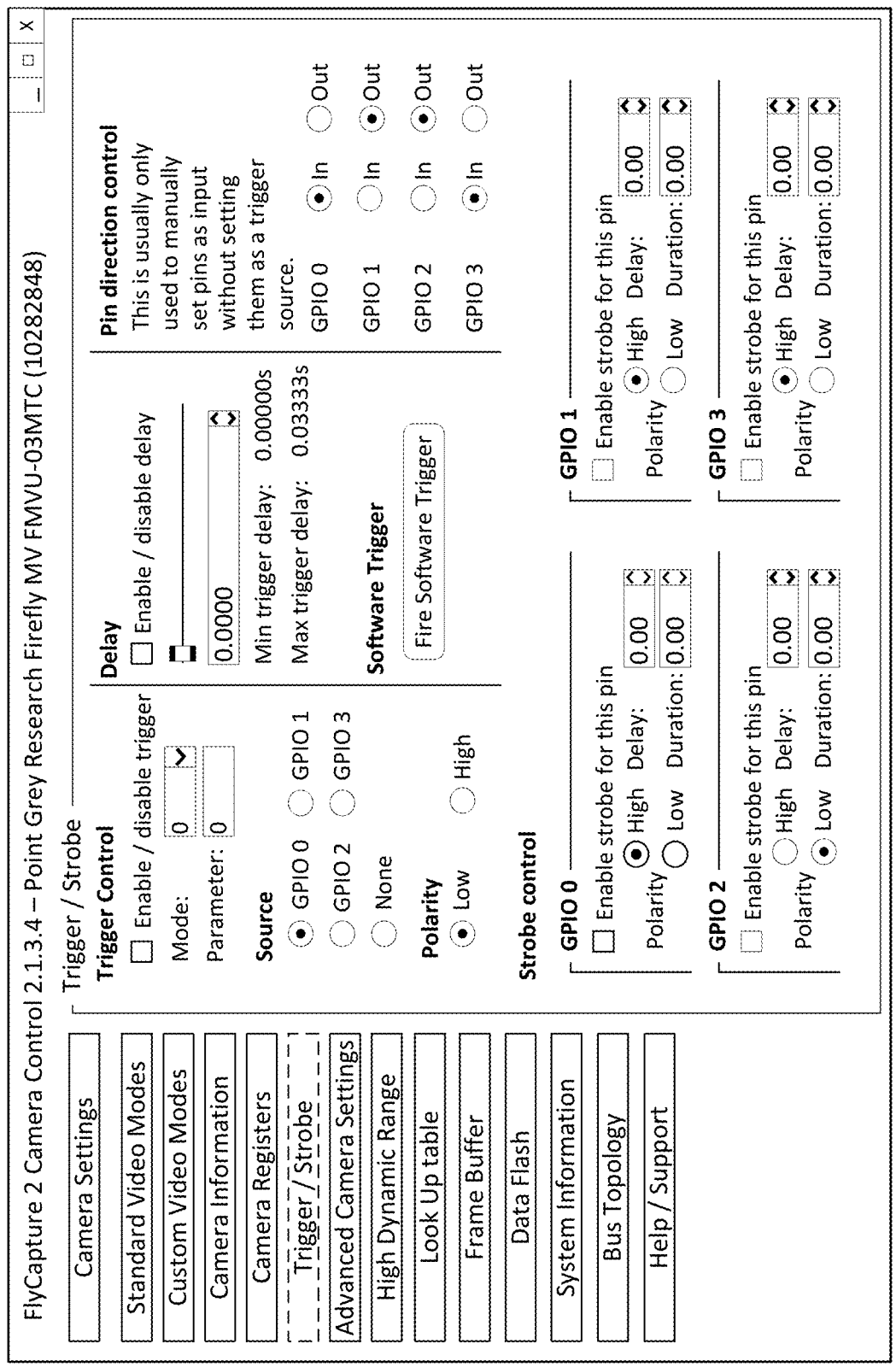

The Tamiya platform is comprised of a set of devices. These devices all communicate in parallel with an algorithm. There are:
  Two Point Grey camera devices for stereo camera acquisition
  A TRX INU device to interface with the INU
  A wheel encoder device to capture wheel encoder data
  A sonar acquisition device to acquire sonar values A Parallax servo device to send commands to the parallax servo controller An Xbox controller device to interface to an Xbox USB controller A mesh networking device to communicate with other robots The Point Grey camera device uses a third-party library provided by Point Grey Research to interface with the cameras[34]. The device allows for fine tune modification of exposure time, brightness, frame rate, frame resolution, and more. FIG. 31A shows a sample screenshot of the device status. In FIGS. 31B, 31C and 31D, various camera options provided by the Point Grey Research library are shown. Each image is captured, given an ID specifying which camera the image originated from, and is sent to the algorithms.

The TRX INU device uses a third-party library provided by TRX Systems. The module connects to the INU over a USB serial port. The only settings required for this device is the COM port number. The TRX INU is manually turned on, and cannot be turned on by the ASL Framework. The TRX INU has been modified to connect to the Point Grey cameras, allowing all three devices to be synchronized by a clock pulse provided by the INU. The software module does not provide an interesting view of inertial data. The device captures raw inertial data, calibrated inertial data, and quaternion orientation data. All the data is sent to the algorithms in sensor packets.

The wheel encoder device connects to the sensor acquisition board developed by ASL. The connection is over a USB serial port. There are two settings for this device, the first is the COM port number, and the second is the wheel encoder calibration. The calibration allows data to be returned in meters instead of arbitrary units. Similar to the TRX INU device, there is no interesting status screen.

A sonar acquisition device is contained in the Tamiya platform. The SLAM algorithm does not make use of this device; however, other algorithms that perform obstacle avoidance use this device. The device connects to the sensor acquisition board developed by ASL. The connection is over the USB serial port, and the only setting is the COM port number.

Figure 32:
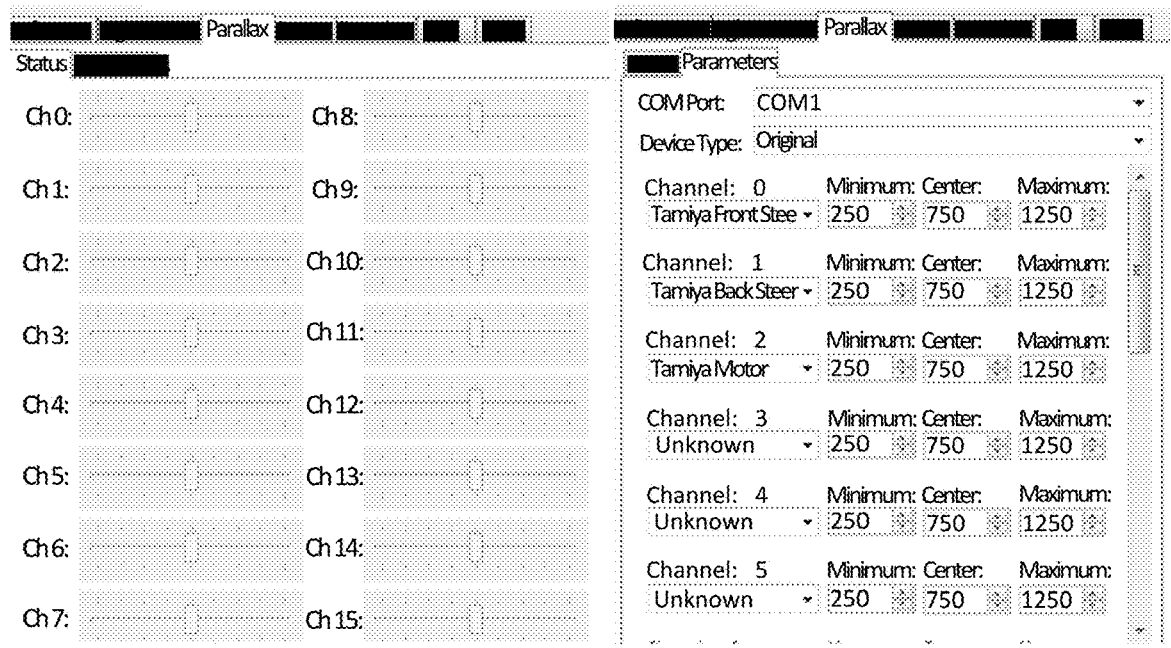

The Parallax servo device interfaces with the Parallax Servo Controller. There is no third-party library to interface with this device. Similar to the TRX INU device, wheel encoder device, and sonar device, a COM port is used for serial communication. A set of known instructions is provided by Parallax to instruct the device to output pulse-width modulated (PWM) signals. This device is used to control both the steering servos and motor controller. The device does not provide sensor output; instead, it accepts actuator input from an algorithm. FIG. 32 shows a sample screenshot of the Parallax servo device status and parameter panels from the ASL Framework. Actuator outputs range between −1 and 1 for servos. The status shifts the position of the markers depending on the actuator instruction. The parameter panel is for settings; settings include COM port number, servo channel assignments, and servo calibration information.

Figure 33:
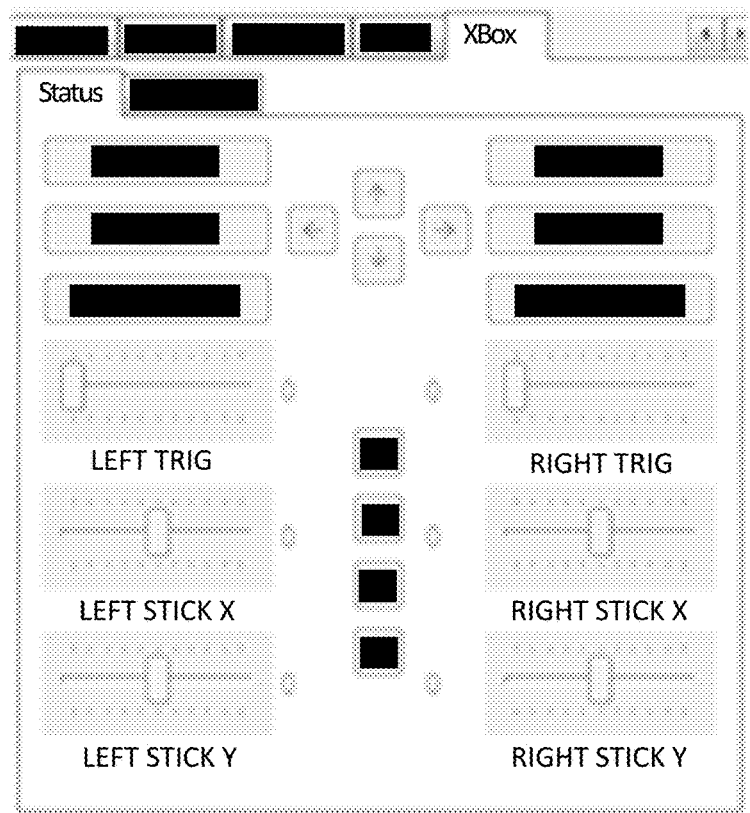

The Xbox controller device uses the Microsoft XNA Studio library to connect to the Xbox controller [35]. This device is used for manual control of the robot. FIG. 33 shows the status panel of the Xbox device from the ASL Framework. The parameter panel only contains settings for the controller number to read from and the identifier to attach to sensor packets.

Figure 34:
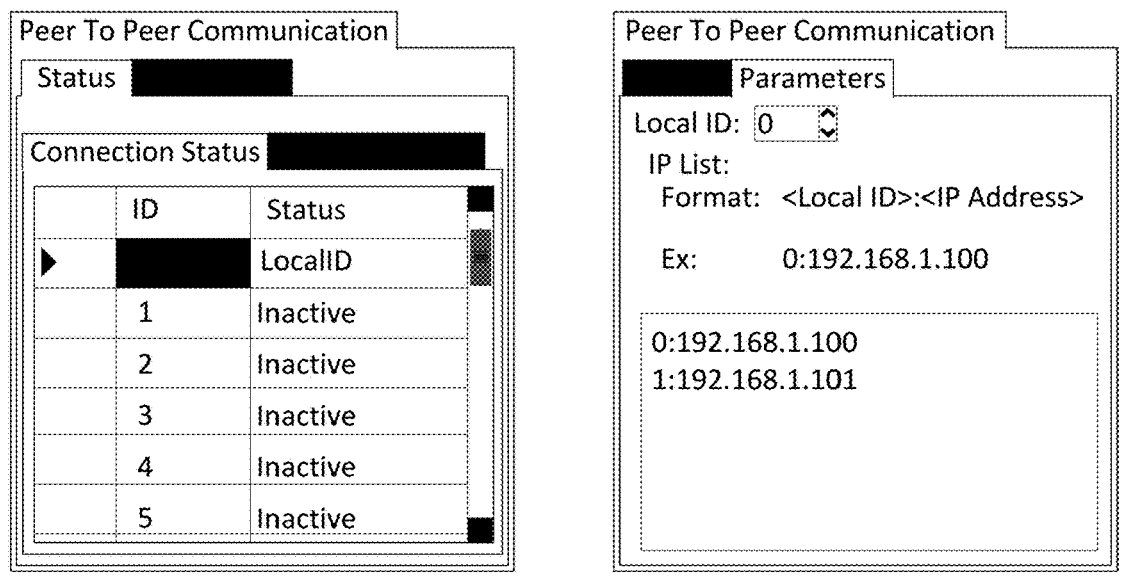

The mesh networking device is the only device used for communication on the robot. It handles incoming and outgoing communication data from the algorithm. The device uses UDP socket connections between robots. FIG. 34 shows the status and parameter panel of the device. The status reports if each connection is inactive and the ping time to each robot. The parameter contains settings for the local ID number, the ID numbers of other robots, and the IP address of other robots. The connections are allowed to break at anytime; the only constraint on the design is that IP addresses and IDs are assigned manually.

Figure 35:
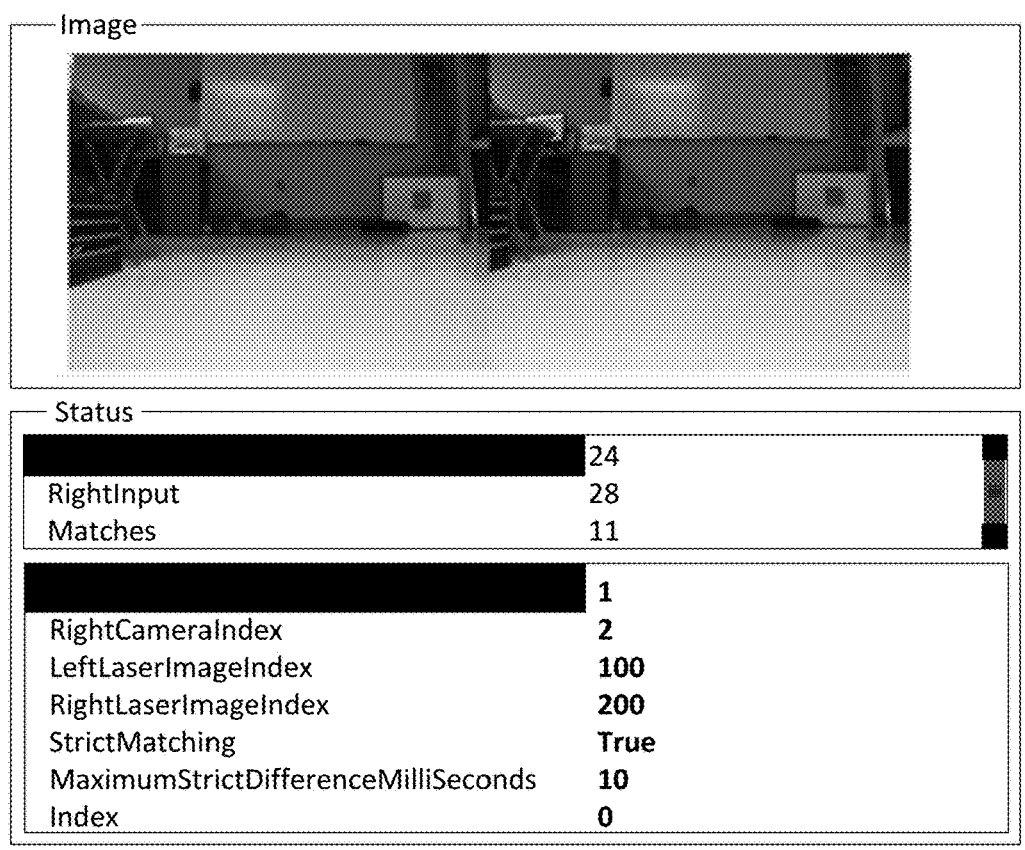
Figure 36:
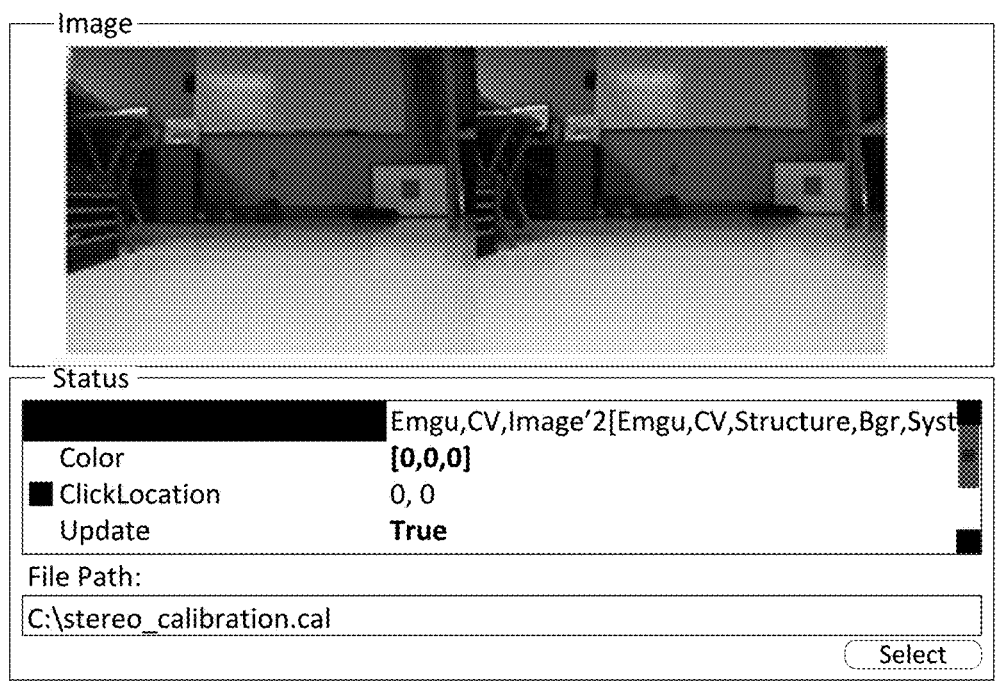

The LP SLAM algorithm contains a collection of functional units organized as a block diagram. FIG. 30 shows the various functional units contained in the LP-SLAM algorithm and the connections between each unit. The following functional units are used:

Stereo synchronizer, used to create a single stereo image packet from two camera sources Stereo rectifier, removes distortions from images in a stereo image packet LK-SURF feature tracker, performs LK-SURF routine on incoming stereo images Forgetful SLAM, applies the Forgetful SLAM routine to the incoming actuator, inertial, and visual data HAR-SLAM mapping, performs HAR-SLAM updates on poses and landmarks HAR-SLAM landmark manager, stores landmarks spatially in a hash grid, detects loop-closing, sends updates to HAR-SLAM mapping HAR-SLAM networking, communicates with other HAR-SLAM networking functional units, determines global coordinates, sends updates to HAR-SLAM mapping Xbox control, converts Xbox sensor data into actuator data Encoder integrator, sums wheel encoder distances Visual and inertial sync, synchronizes packets from LK-SURF and INU device Final synchronizer, synchronizes actuator, encoder, inertial, and visual data into a single packet The stereo synchronizer functional unit combines separate images from two cameras into a single packet. It matches images based on timestamps. If images are from synchronized cameras, such as the Point Grey cameras, then strict matching can be enabled, giving a small window of 10 ms in order for images to be paired. Regular stereo matching finds the closest timestamp per image. FIG. 35 shows a sample snapshot of the stereo synchronizer. In the LP-SLAM algorithm, it combines the raw image from the Point Grey cameras.

There stereo rectifier functional unit removes lens distortion from images. Using the camera calibration parameters, the functional unit applies image rectification routines from OpenCV [9]. The only parameter to the rectifier functional unit is the stereo calibration file.

Figure 37:
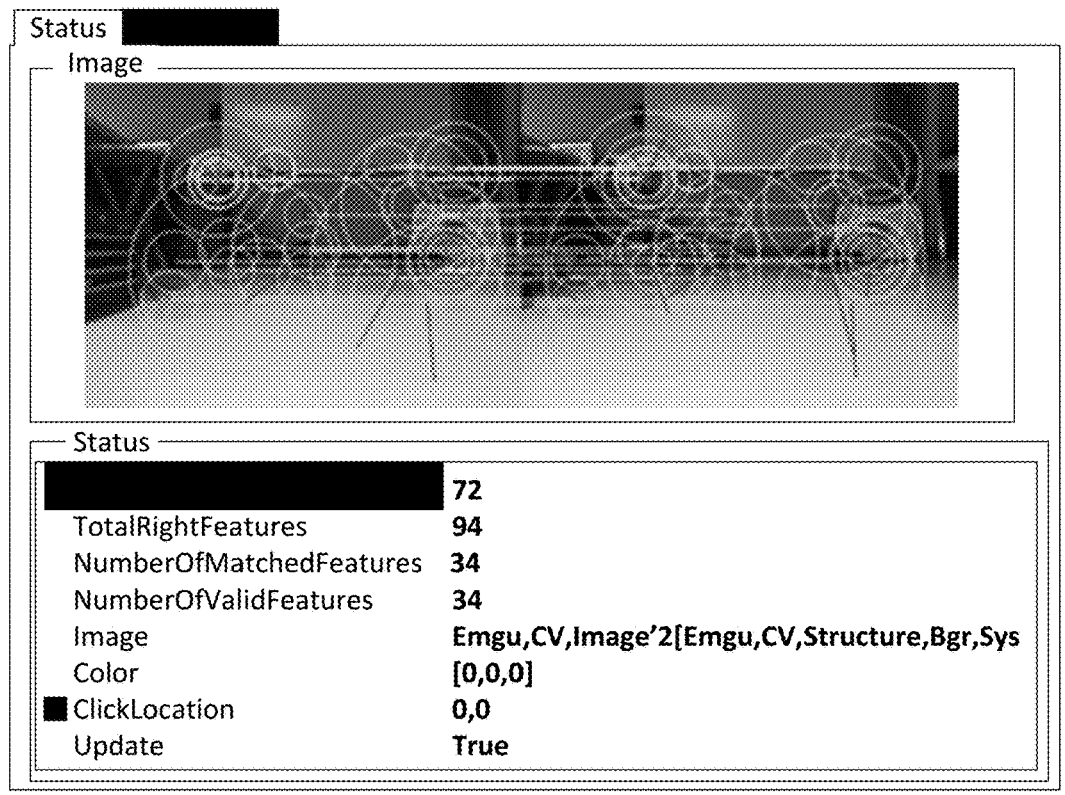

The LK-SURF functional unit uses the LK-SURF algorithm described herein. Each feature is given a unique identifier and a descriptor from SURF. The feature is tracked over time. For each pair of new stereo images, the known features are tracked, and when features are depleted, the SURF stereo matching routine is called to replenish the list. The list of currently tracked features is sent in a packet to the vision and inertial synchronizer. The only parameter to LK-SURF is the stereo calibration file, which is used to calculate the epipolar geometry. Calculating the epipolar geometry allows the tracker to remove features that do not align with the calibrated images. FIG. 37 shows a pair of stereo images with marked locations of SURF features being tracked on both images.

The Forgetful SLAM functional unit accepts packets of synchronized data that contains actuator information, encoder distance, inertial orientation, and the list of currently tracked features. The functional unit performs the Forgetful SLAM routine as described above. This functional unit uses a third-party library from Mathworks called the Matlab Common Runtime (MCR)[37]. This allows the functional unit to call SLAM routines written in Matlab. This functional unit does not have an interesting display as data is passed to Matlab.

The HAR-SLAM mapping, landmark manager, and networking functional unit also uses the MCR library. Since data from Forgetful SLAM is stored using the MCR library, and HAR-SLAM routines were developed in Matlab, it is easy to just call the routines from the functional unit rather than implement them again.

The HAR-SLAM mapping functional unit takes in new landmarks and poses from Forgetful SLAM. It also receives updated landmarks from the HAR-SLAM landmark manager, and receives landmark updates from the HAR-SLAM networking functional unit. In this functional unit, all data is organized using graph structures. Updates of landmarks are sent to the HAR-SLAM landmark manager and the HAR-SLAM networking functional unit if they pass certain criteria.

The HAR-SLAM landmark manager functional unit organized landmarks spatially using a hash grid. All landmarks come from the HAR-SLAM mapping functional unit. The role of this functional unit is to close-the-loop by comparing incoming sets of landmarks to its spatial database. When a match is found, the pair of matching landmarks is sent back to the HAR-SLAM mapping functional unit.

The HAR-SLAM networking functional unit receives updated landmarks from HAR-SLAM mapping. It is the only functional unit to use the communication events. It sends landmarks to the other robots. The landmarks of each robot are compared to every other robot. When a match is determined, the match is shared amongst all robots. Each robot locally performs the global coordinate update filter as it deterministic. The global coordinate update results in landmarks being updated. The updated landmarks are sent to HAR-SLAM mapping.

The Xbox robot control functional unit translates Xbox controller input information into actuator data for the Tamiya. This functional unit has no parameters and does not have an interesting status panel.

The encoder integrator functional unit accepts wheel encoder packets. The functional unit adds up all wheel encoder data and sends out an integrated wheel encoder packet instead of the normal packet. This is done to prevent data loss from accidental packet drops. The ASL Framework is event driven, and if a functional unit has a backup of incoming packets, the packets will be dropped to prevent system lag. If a packet is dropped, having the total distance travelled allows interpolation to estimate distance travelled.

There are two more synchronizer functional units. The vision and inertial synchronizer matches feature packets from LK-SURF to inertial data from the TRX INU. A matching routine similar to the stereo synchronizer is used to pair packets. The paired packets are sent to the last synchronizer. The last synchronizer combines actuator data from the Xbox controller, integrated encoder data from the encoder integrator, and the pair of inertial and visual data from the previous synchronizer. The wheel encoder data is upsampled to match the frequency of the visual and inertial data packet. The INU, Xbox controller, and cameras operate at 20 Hz, but the wheel encoders operate at 15 Hz. Using the integrated wheel encoder results, the encoder information is upsampled using linear interpolation to match the 20 Hz signal. The final synchronizer sends a single packet, containing all the incoming data types, to the Forgetful SLAM functional unit.

Calibration and modeling are vital when implementing algorithms on actual platforms. Encoders have only one primary role in the Tamiya-based platform, and this is to measure distance. Since the wheels are not rigidly aligned to the robot platform, encoders provide a poor measure of rotation. Rotation measurements are left to the inertial measurements. The encoders simply return a count of the total of lines that pass on the wheel strip in a particular interval. The encoder has the ability to discriminate between backward and forward motion; the total count is either added or subtracted depending on the motion. Ideally, we could just measure the diameter of the wheel, calculate the circumference, and divide by the total number of counts per rotation; however, in practice this is not accurate.

Figure 38:

The encoders are easy to calibrate, we simply have the robot follow a straight line for a known distance, and count the total number of encoder lines measured. A longer distance will produce a more accurate calibration. This process can be repeated several times in order to produce an accurate result. FIG. 38 shows the encoder calibration path used for the robot. A simple red line following algorithm was used with a PID controller to keep the robot as precisely on the line as possible. The length of the path was 18 meters, and the calibration was repeated several times for accuracy. The encoder calibration for one robot was 0.4655 mm per encoder value on the front left tire, 0.4655 mm per encoder value on the front right tire, 0.4638 mm per encoder value on the back left tire, and 0.4666 mm per encoder value on the back right tire.

Figure 39:
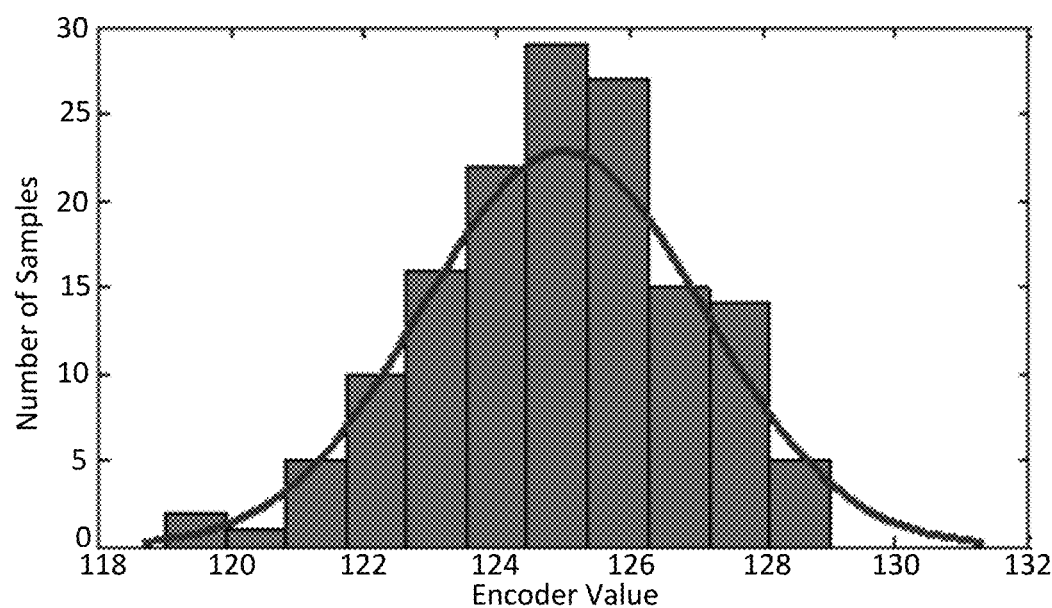

For error modeling, we need to test different scenarios and determine an approximate model to apply that best describes the noise. Several logs need to be taken at constant speed such that there is a single target mean. In the case of the encoders, we seem to have a consistent result. Most of our samples successfully fit Gaussian models, with the standard deviation linearly related to the mean at a ratio of approximately 0.02. The Kolmogorov-Smirnov Test (KS-Test) was used to validate the approximations [22]. FIG. 39 shows an encoder dataset plotted in a histogram with a Gaussian model fitted.

A stereo camera is much more complicated than an encoder is. While an encoder only measures one dimension, a stereo camera system measures three. In order to use stereo cameras, we need to calibrate each camera, and calibrate the stereo pair. Errors in stereo camera readings propagate from errors in each separate camera image, and from false matches. Only errors in the image can be analyzed, false matches are completely non-Gaussian and have no means of prediction. The Robust Kalman Filter takes care of the false matches.

Figure 40A:
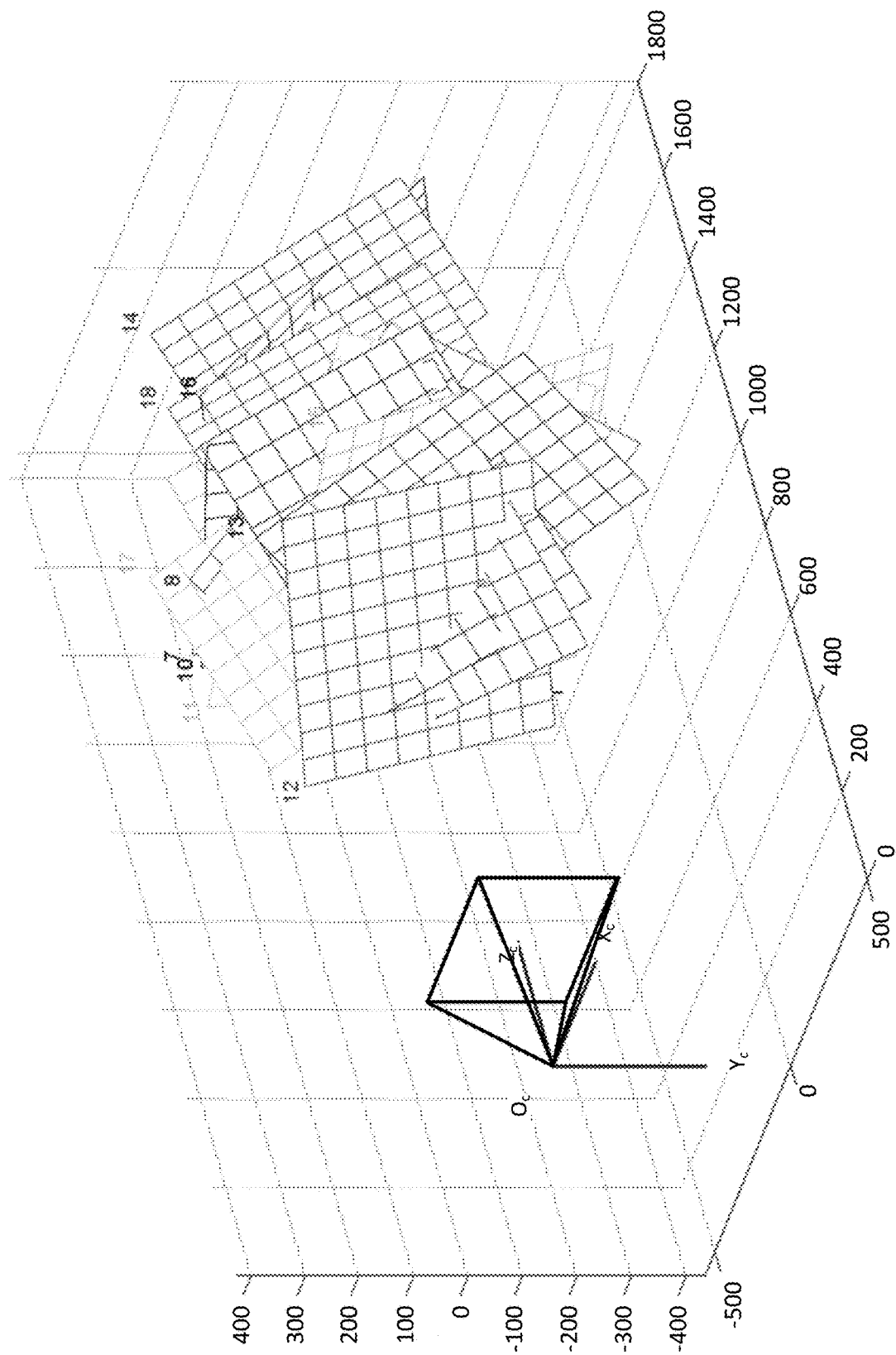
Figure 40B:
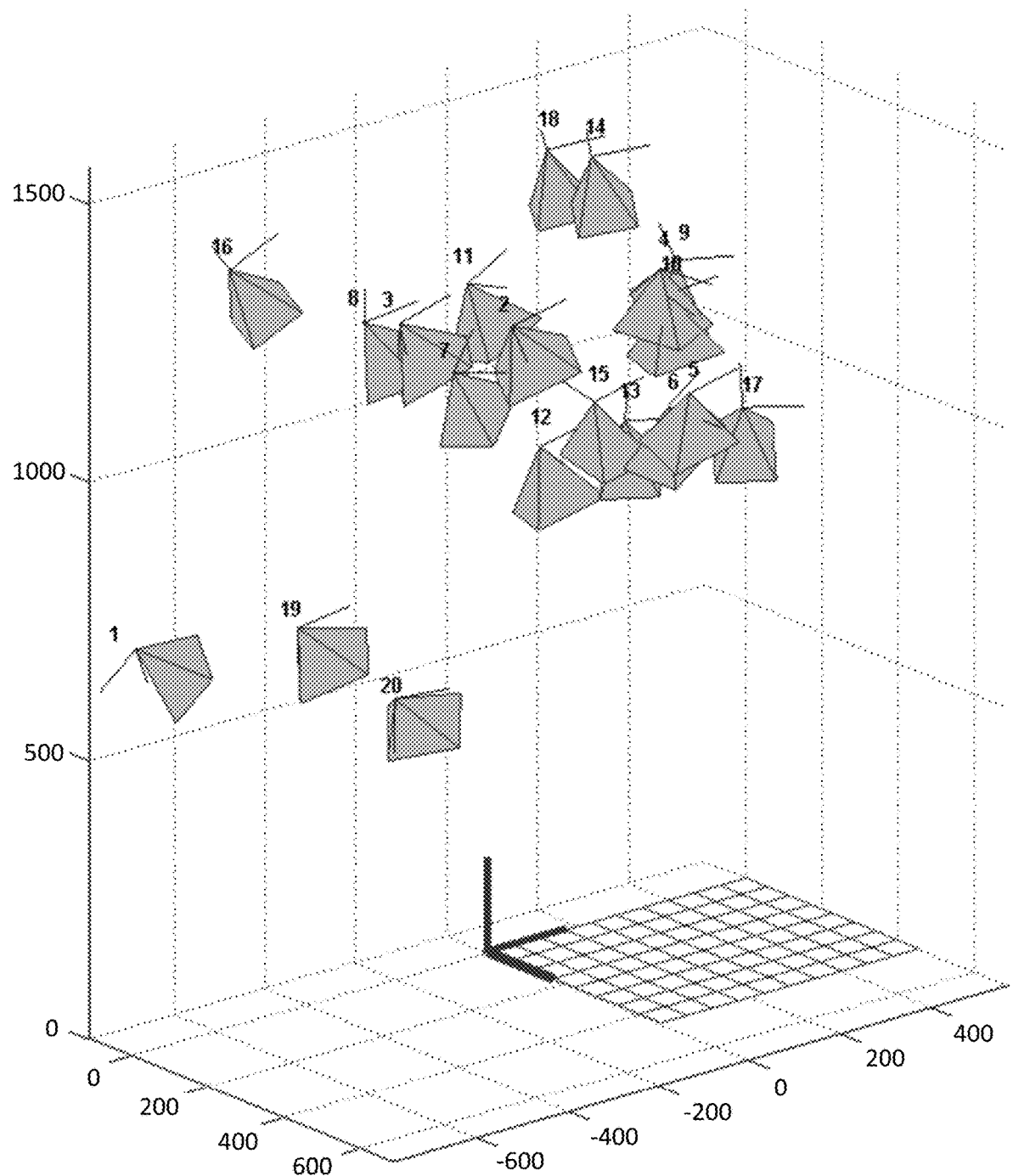

A calibration routine is required for any accurate optical systems. Two libraries were tested. The first is a toolbox based in Matlab, and the second is the Intel OpenCV library. The latter was selected due to its accuracy and speed. The Matlab toolbox has nice visualizations, while OpenCV has none. FIGS. 40A and 40B show a sample calibration result from the Matlab toolbox. It is interesting to see the various checkerboard positions in relation to the camera (left), as shown in FIG. 40A, or the camera positions in relation to the checkerboard (right) as shown in FIG. 40B. In order to use the Matlab toolbox, each checkerboard had to be manually added to the toolbox, and each image required the user to select the four primary corners in the same order on every image.

Figure 41:
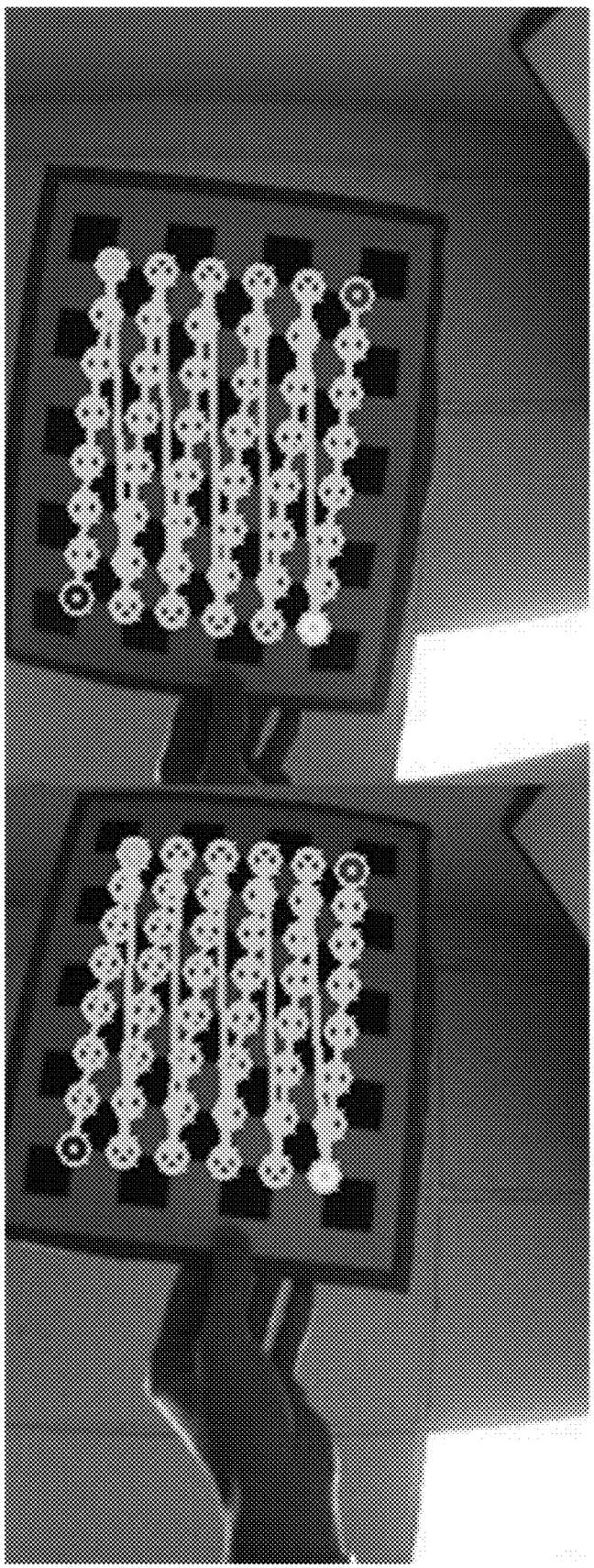

The OpenCV library has built in checkerboard finding routines. With some extra programming, a visualization was created, as is shown in FIG. 41. The software automatically determines the four primary corners, and all the corners in between. Instead of using a small set of calibration images taken manually, the ASL Framework version of stereo camera calibration—using OpenCV functions—is able to continuously sample a live video, extract checkerboard data, and finally calculate all of the calibration parameters on hundreds of images.

The ASL Framework stereo camera calibration routine performs individual camera calibration, and then uses the same data again to perform stereo camera calibration. This stereo calibration information is used to rectify the captured checkerboard data and perform additional stereo calibration on the rectified data. This results in two sets of calibration data. The second set of calibration data is used to triangulate features after the images have been rectified. The next section explains rectification.

Rectifying images involves removing lens distortions as calculated by the camera calibration, and aligning the images as if it were a perfect stereo pair. A perfect stereo pair would be exactly aligned in orientation and on the same horizontal axis, thus any common point in the pair of images only shifts sideways between the images. Having this property can reduce computation time by a significant amount since the images are already aligned. The stereo image pair in FIG. 42 shows the raw captured images from the stereo cameras on top. Notice the distortions in the ceiling tiles, and the location of objects in different vertical positions.

Using a set functional unit in the ASL Framework that applies the OpenCV rectification, the same raw images are combined with the calibration information. This yields the image shown on the bottom in FIG. 42. The rectified image has the distortions removed, the cameras appear to be oriented in the exact same manner, and all objects are straight and aligned vertically.

The camera calibration routine provides the information necessary to perform the rectification. However, once rectified, the cameras behave as if they have a new set of calibration parameters since they have been moved virtually. Though the data source has not changed, the images are transformed resulting in new calibrations being required. The camera calibration routine considers this, warps the checkerboard information according to the first calibration, and calculates a secondary set of calibration information for all functions and algorithms that make use of the rectified images instead of the raw images.

When performing stereo triangulation, there are two sources of error. The first is the precision and accuracy of the selected points. In a physical system, sensor information is prone to errors. Estimating the accuracy of finding a feature in an image is one important source of error. The other source of error is falsely matching features. This error cannot be predicted since it is based on higher-level routines that use Boolean logic versus mathematical equations.

Figure 43:
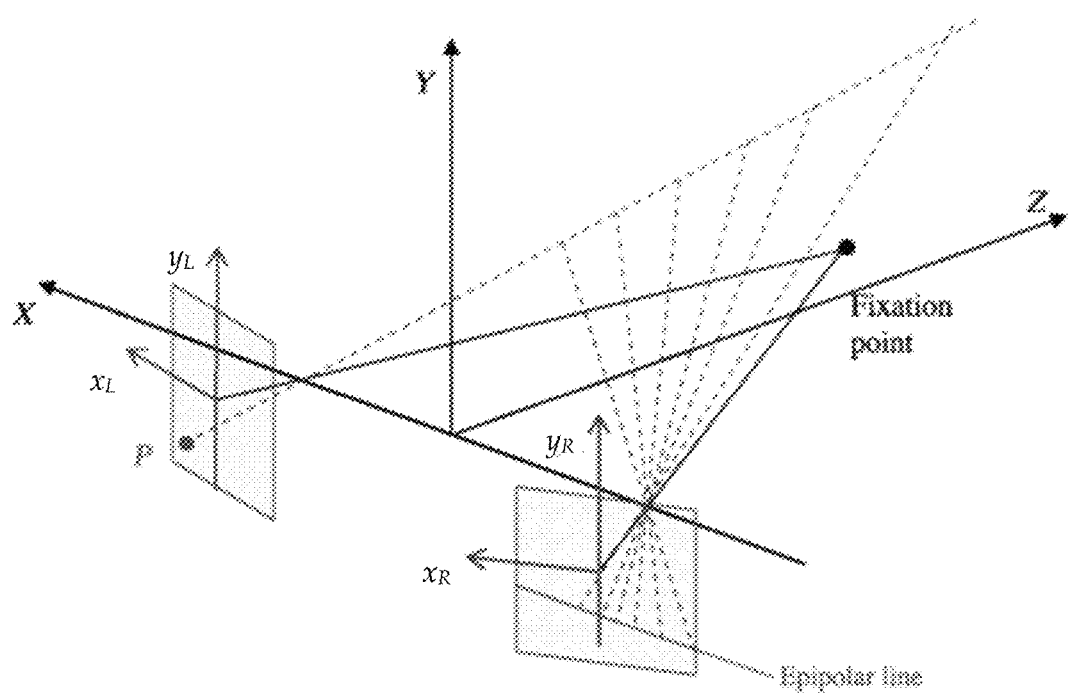

In order to model the error of a stereo camera, the noise in selecting a feature is analyzed. Using epipolar geometry an estimate of the true location of a feature can be estimated using its stereo match. FIG. 43 shows how a point in the image on the left-hand side of the figure projects a ray into the real world. On the image on the right-hand side of the figure, this ray is seen as a line, which indicates all the possible locations for a feature in the image on the right-hand side of the figure. This information can be used to estimate a feature's distance from the ideal epipolar line given the location of its stereo pair.

Figure 44:
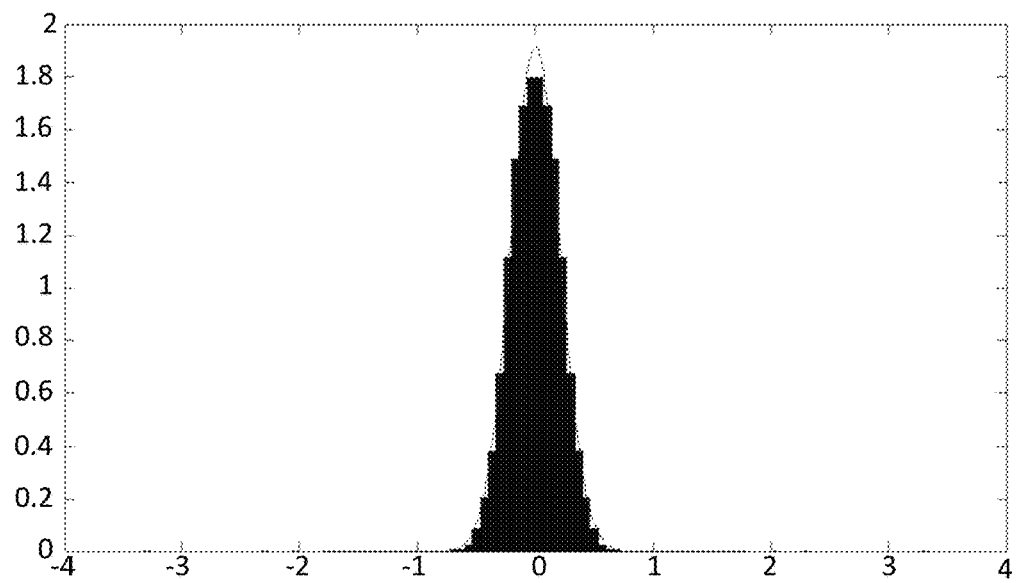
FIG. 44—Histogram of epipolar-based errors with a Gaussian Mixture Model fit

In order to determine what feature should match without any chance of error, the checkerboard finding routine is revisited. It is quite simple to find a checkerboard in an image given the OpenCV routines; matching two checkerboards to each other for stereo correspondence is also easy, assuming that the checkerboard is not square, and the cameras have relatively similar orientations. A collection of matched points is logged; these points are all selected in a similar manner to how other features herein are selected. Each pair of features gives us a point in the left and right image, and by using the calibration of the cameras, the epipolar line is determined. The distance each point is from the line is shown in FIG. 44. A Gaussian Mixture Model of two Gaussians is used to describe the distribution accurately, and passes the KS-Test.

Having an error model fit the pixel error shown in FIG. 44 does not solve the problem of modeling the triangulation error. It is not practical to capture every possible location in front of a stereo camera set to produce an accurate error distribution; instead, the data is synthesized. By selecting a random point in one camera's image, the expected epipolar line can be determined in the other image from the calibration. Now, randomly select a point on that line, then given these two random points, a projection can be made in three dimensions. Given a point on each image there is now a valid projection representing the "true location." Randomly select points away from each of the two points using the pixel error model, then find the 3D projection. The error is the difference between this projection and the "true location" projection previously computed before adding the pixel error. This technique can be approximated using the Unscented Transform, a linearization of the projection, or using many samples.

A Gaussian Mixture Model was propagated using the Unscented Transform. FIG. 45 shows only the distance projection from the cameras. The horizontal and vertical angular measurements from the camera matched similar error models as the camera pixel error, which is expected based on the transformation. The distance calculation from the camera involved several trigonometric functions; this magnifies error as a target is further away.

FIG. 45 shows all the random samples scattered over distance away from the camera. The top plot shows the mean of the Gaussian error model at each random sample. The graph is not clearly a single line as the position of the target from left to right plays a role in accuracy, however a best-fit power line approximated the model mean at a given distance. The bottom plot shows the variance of the error model given distance; after 10 to 15 meters, the variance becomes too great to be of any use. Physically this makes sense as the camera's low resolution and small separation between the stereo camera pair prevents it from accurately ranging at large distances.

The result of the error model is a set of independent Gaussians, with mean and variance given by the curves in FIG. 45, which represent the stereo camera ranging error distribution as a function of distance from the camera. Only the Gaussian distributions dealing with distance measure actually varies with distance, the vertical and horizontal angular measurements are independent of distance. A Kalman-like prediction stage was used to propagate the Gaussian Mixture Model of the pixel error to obtain a single Gaussian distribution.

Figure 46:
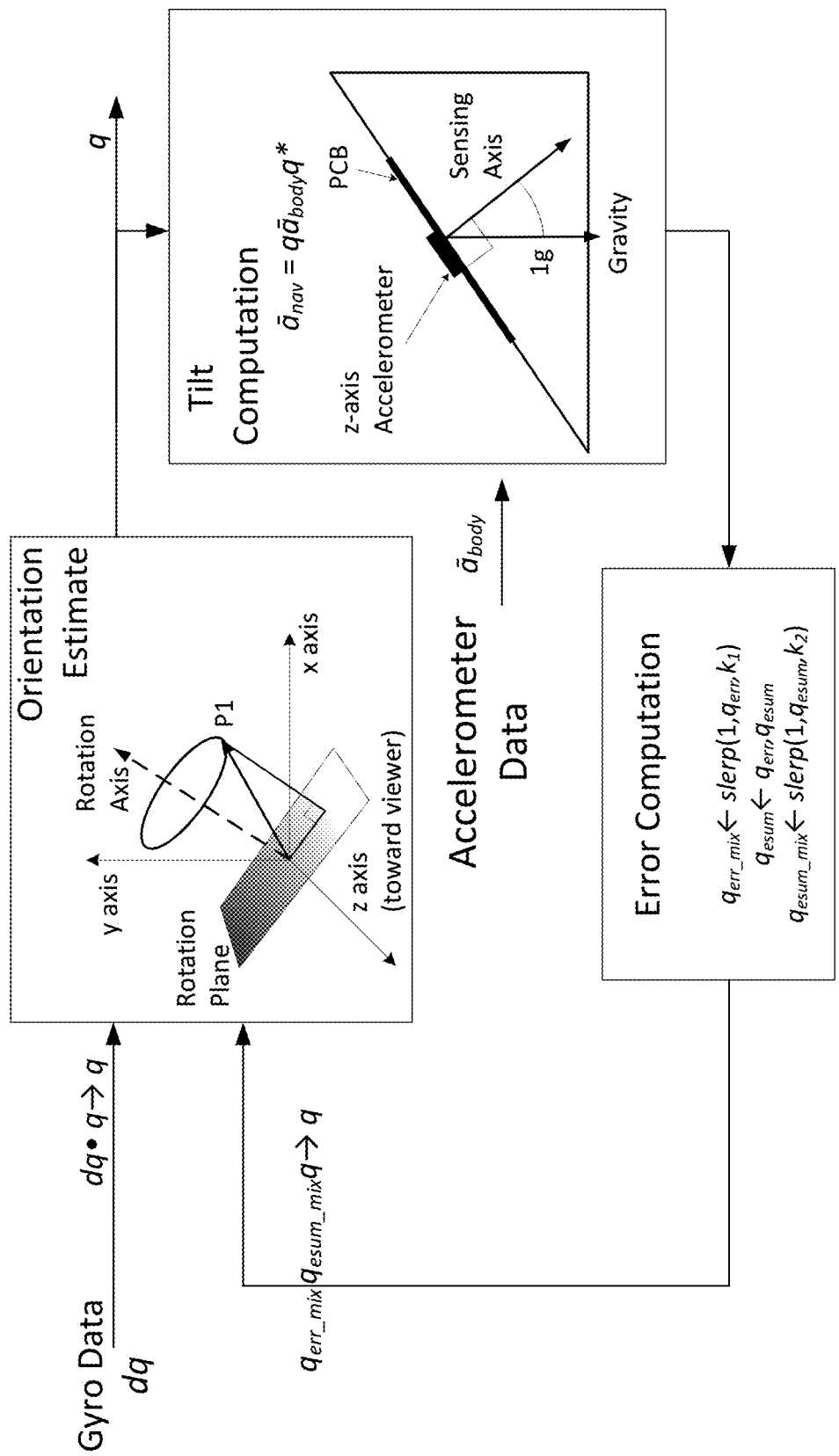
FIG. 46—PI implementation of orientation estimator [28][29][31][30]

The Inertial Navigation Unit (INU) from TRX Systems provides an extra level of stability and performance above traditional MEMS INUs. Internally an orientation filer operates to reduce drift and improve the orientation estimate of the INU. FIG. 46 shows a basic outline of the orientation filter. The exact mechanics of this filter are not publicly available, but regardless, the device provides an estimate of the orientation instead of raw angular rate measurements like most inertial measurement units provide.

Regardless if the unit is stationary or in motion, the TRX INU seems to have a consistent level of random noise that is nearly Gaussian. The INU noise is computed by reading orientation output of the unit over a period of 10 minutes while stationary. The noise is taken as the difference in orientations over a single sample. The system operates at 40 Hz. FIG. 47 shows on the top side a sample histogram of noise generated by the INU when stationary with a Gaussian fit. It appears to be Gaussian, but fails the Kolmogorov-Smirnov Test (KS-Test) [22]. The bottom side shows a Gaussian Mixture Model fit, using three Gaussians. Visually the Gaussian Mixture Model seems to pass the test; furthermore, this fit passes the KS-Test, making it mathematically valid. If we wish to be accurate, we use the Gaussian Mixture Model, if we wish to have faster results; we can use the Gaussian approximation.

Figure 48:
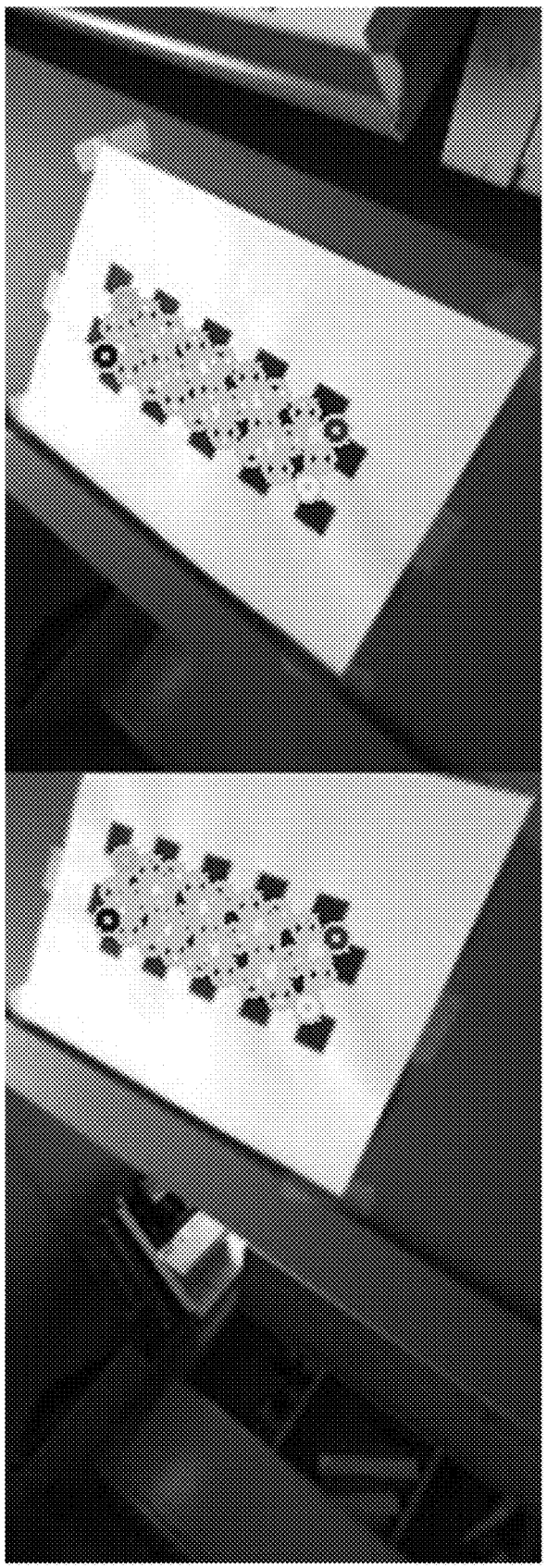

Once both the stereo cameras and the inertial orientation are well calibrated, another step is required before the two systems can be used together. No matter how precisely two devices are mounted together, it is always a good idea to make sure the separate devices have the same coordinate system. Minimally with an orientation device, we must calculate the rotation between the optical and inertial coordinate systems. A simple experiment can be setup, where a rectangular checkerboard is fixed in a position such that the vertical direction of the checkerboard matches the direction of gravity. Normally an optical system has no indication of the direction of gravity, but by aligning this checkerboard, we can take a sample video of the checkerboard and from each frame, we can calculate the direction of gravity based on the direction of the checkerboard. FIG. 48 shows a sample view of the aligned checkerboard, notice how the longer side of the checkerboard aligns with gravity.

Figure 49:
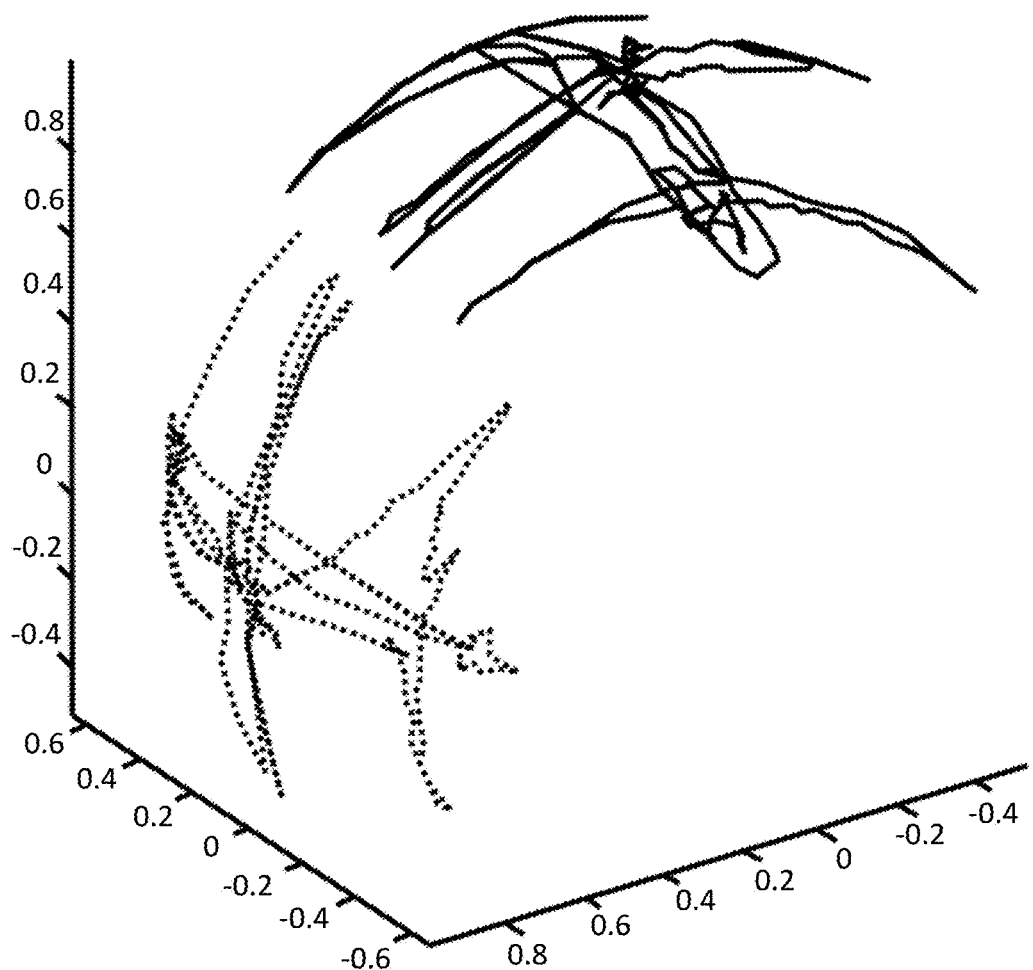

Once a log has been captured, the inertial estimate of the direction of gravity can be compared to the optical direction of gravity. FIG. 49 shows the optical (dotted) and inertial (solid) direction of gravity over the entire log taken. The plot is on a unit sphere, and the paths are the continuous sampling of the direction of gravity over time. There are significant coordinate system differences. These major differences are fixed with a simple rotation. By collecting the entire set of vectors in three dimensions from both systems, we can use the Kabsch algorithm, which uses singular value decomposition to determine the optimal rotation matrix that minimizes the root mean square deviation [38].

TABLE 32

Kabsch algorithm [38]

Kabsch Algorithm
  Input:(A,B) Output:(R)
    A is a matrix of n by 3, and B is a matrix of n by 3,
      where we have a list of 3D
    vectors TABLE 32-continued Kabsch algorithm [38]

$X = A^T B$
$[U,S,V] = SVD (X)$ resulting in $X = USV^T$
$R = VU^T$

Figure 50:
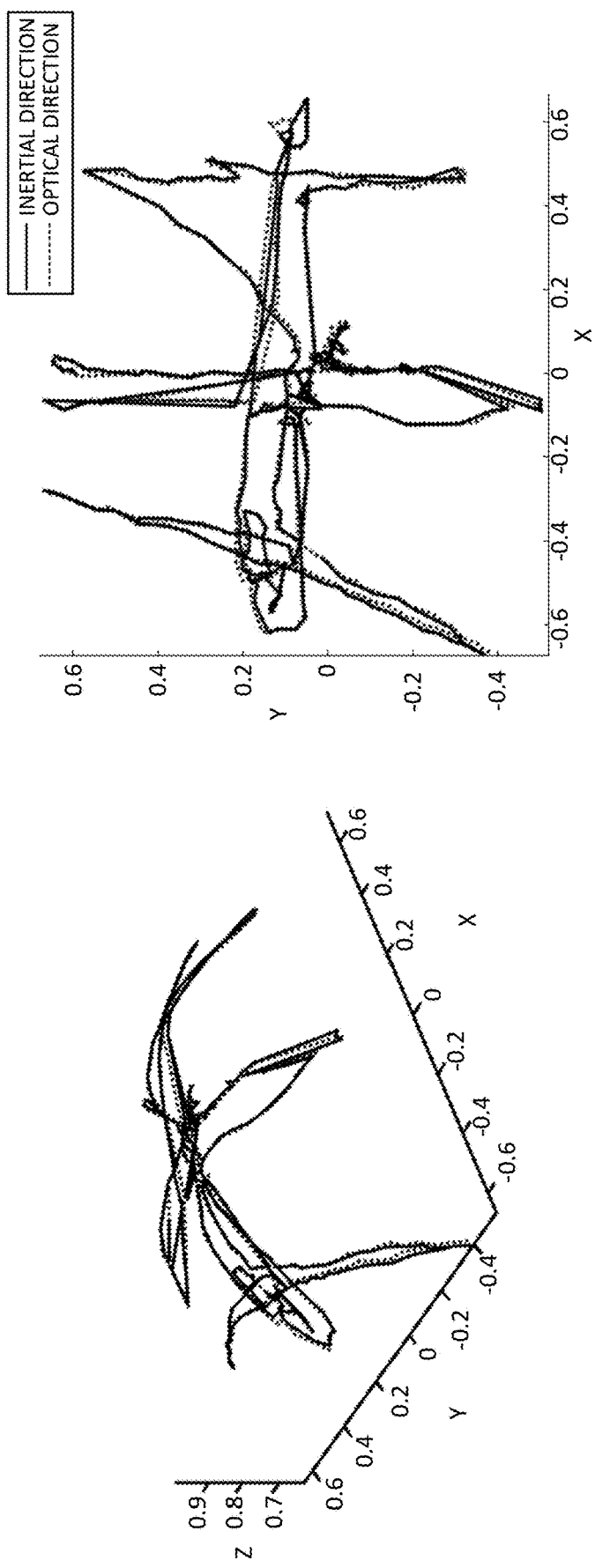

After running the Kabsch algorithm on this data set, we obtain a rotation matrix that results in the Euler rotations of X=−90.0401 degrees, Y=0.4555 degrees, and Z=−179.8732 degrees. Notice that these rotations are more than just a change of coordinates, but show the slight imperfections in mounting of less than half a degree. FIG. 50 shows the same inertial plot of gravity (solid) with the newly transformed optical plot of gravity (dotted). The different views of the plot show the paths on the unit sphere to be nearly identical, which is exactly the result we want. Now we simply apply this rotation matrix to all data from the Optical INU in order for it to be in the same coordinate system and the inertial unit.

Additional References

[9] (2009) Intel Open Source Computer Vision Library. [Online]. http://opencv.willowgarage.com/[10]

[10] Kat Bradley and Kaylin Spitz, "Face Tracking and Pose Approximation," Computing Research Association, 2009.

[11] Akitsugu Noguchi and Keiji Yanai, "A SURF-based Spatio-Temporal Feature for Feature-fusion-based Action Recognition," in *Third Workshop on HUMAN MOTION Understanding, Modeling, Capture and Animation*, Crete, 2010.

[12] Herbert Bay, Andreas Ess, Tinne Tuytelaars, and Luc Van Gool, "SURF: Speeded Up Robust Features," *Computer Vision and Image Understanding*, vol. 110, no. 3, pp. 346-359, 2008.

[13] Frank R. Hampel, Elvezio M. Ronchetti, Peter J. Rousseeuw, and Werner A. Stahel, *Robust Statistics: The Approach Based on Influence Functions*. New York, USA: Wiley-Interscience, 1986.

[14] T. Tommasini, A. Fusiello, E. Trucco, and V. Roberto, "Making Good Features Track Better," in *IEEE Computer Society Conference on Computer Vision and Pattern Recognition*, Santa Barbara, 1998, pp. 178-183.

[15] I. T. Jolliffe, *Principal Component Analysis*, 2nd ed. New York: Springer-Verlag, 2002.

[16] Matthew Turk and Alex Pentland, "Face Recognition Using Eigenfaces," *Journal of Cognitive Neuroscience*, vol. 3, no. 1, pp. 71-86, Winter 1991.

[17] Sebastian Thrun, Wolfram Burgard, and Dieter Fox, *Probabalistic Robotics*. Caimbridge, Mass.: MIT Press, 2005.

[18] Andrew J. Davison, Ian D. Reid, Nicholas D. Molton, and Olivier Stasse, "MonoSLAM: Real-Time Single Camera SLAM," in *Conference on Pattern Analysis and Macine Intelligence*, vol. 29, 2007.

[19] Tim Bailey and Hugh Durrant-Whyte, "Simultaneous Localization and Mapping (SLAM): Part II," *Robotics & Automation Magazine*, vol. 13, no. 3, pp. 108-117, September 2006.

[20] Sebastian Thurn and Michael Montemerlo, "The Graph SLAM Algorithm with Applications to Large-Scale Mapping of Urban Structures," *International Journal on Robotics Research*, vol. 5, no. 6, pp. 403-430, 2005.

[21] Dimitri P Bertsekas, *Dynamic Programming and Optimal Control*, Third Edition ed. Belmont, Mass.: Athena Scientific, 2005.

[22] Galen R Shorack and Jon A Wellner, *Empirical Process with Applications to Statistics*. Seattle: Society for Industrial and Applied Mathematics, 2009.

[23] NVIDIA. (2009) CUDA Zone. [Online]. http://www.nvidia.com/object/cuda_home.html

[24] P C Mahalanobis, "On the generalised distance in statistics," in *Proceedings of the National Institute of Sciences of India*, 1936, pp. 49-55.

[25] Arthur Gregory, Ming Lin, Stefan Gottschalk, and Russell Taylor, "A Framework for Fast and Accurate Collision Detection for Haptic Interaction," in *IEEE Proceedings of Virtual Reality*, Houston, 1999, pp. 38-45.

[26] M Teschner, B Heidelberger, M Mueller, D Pomeranets, and M Gross, "Optimized Spatial Hashing for Collision Detection of Deformable Objects," in *Proceedings of Vision, Modeling, Visualization*, 2003, pp. 47-54.

[27] Michael Stanley, "Implementation of Kalman Filter to Tracking Custom Four-Wheel Drive Four-Wheel-Steering Robotic Platform," University of Maryland, College Park, Masters Thesis 2010.

[28] B. Funk, Method and System for Locating and Monitorying First Responders, 2008.

[29] TRX Systems, Inc. (2009) Firefighter Sentinel System. [Online]. http://www.trxsystems.com

[30] A. Bandyopadhyay, System and Method for Determining Location of Personnel and/or Assets Both Indoors and outdoors View Map Generation and/or Map Matching Techniques, 2008.

[31] B. Funk, A. Bandyopadhyay, and E. Kohn, Method and System for First Resonders, 2007.

[32] Chris Harris and Mike Stephens, "A Combined Corner and Edge Detector," in *Proceedings of the 4th Alvey Vision Conference*, 1988, pp. 147-151.

[33] Jean-Yves Bouguet, "Pyramidal Implementation of the Lucas Kanade Feature Tracker: Description of the algorithm," OpenCV Document 2000.

[34] Point Grey Research, FlyCapture2, 2011.

[35] Microsoft. (2011, March) App Hub: Develop for Windows Phone & XBox. [Online]. http://create.msdn.com

[36] Jared Napora, "Implementation, Evaluation, and Applications of Mobile Mesh Networks for Platforms in Motion," University of Maryland, College Park, Masters Thesis 2009.

[37] Mathworks, Matlab 7.9, 2009.

[38] Wolfgang Kabsch, "A discussion of the solution for the best rotation to relate two sets of vectors," *Acta Crystallographica*, vol. 34, pp. 827-828, September 1978.

What is claimed:

1. A method for managing objects in a multi-dimensional space when the objects are no longer visible in a collection of images captured from the multi-dimensional space over time, the method comprising:
    identifying one or more objects visible in a first image among the collection of images;
    adding the identified objects to a first list of tracked identified objects, wherein the first list represents a state space of the multi-dimensional space, the state space comprising object identifiers, a state vector, and a covariance matrix;
    tracking the identified objects from the first list of objects in one or more subsequent images among the collection of images, the one or more subsequent images being captured after capturing the first image;
    determining whether the tracked identified objects are absent in the one or more subsequent images, wherein determining includes determining whether a tracked identified object from the first list is an unreliable object and includes mapping a high-dimensional feature into a one-dimensional space, wherein the high-dimensional feature is associated with one of the tracked identified objects captured from a high-dimensional observation; and
    removing, based on the determination, the tracked identified objects from the first list, wherein removing includes applying an outlier rejection rule in the one-dimensional space to remove the mapped high-dimensional feature.

2. The method of claim 1 further comprising:
    filtering outlier objects in the first image to create a second list comprising the outlier objects; and
    tracking the outlier objects in the second list independently of the identified objects in the first list.

3. The method of claim 1, further comprising:
    determining whether an object is visible in the one or more subsequent images;
    determining whether the object is absent in the first image; and
    adding the object to the first list.

4. The method of claim 1 further comprising correcting locations of tracked identified objects.

5. The method of claim 4, wherein correcting locations of tracked identified objects comprise processing the tracked identified objects through an extended Kalman filter for simultaneous localization and mapping.

6. The method of claim 1 further comprising saving the removed object in a second list.

7. The method of claim 1, wherein mapping the high-dimensional feature into a one-dimensional space comprises applying a weighting metric to the high-dimensional observation, the weighting metric being derived from an observation covariance and an expectation covariance.

8. The method of claim 7 further comprising:
    determining an observation covariance associated with the high-dimensional observation;
    predicting an observation and covariance, the predicted observation being related to the high-dimensional observation, the predicted covariance being associated with the predicted observation;
    extracting the high-dimensional feature from the high-dimensional observation;
    determining a first covariance for the high-dimensional feature, the determination being based on the observation covariance;
    determining a second covariance for the high-dimensional feature, the determination being based on the predicted covariance; and
    utilizing a weighting metric in the outlier rejection rule, the weighting metric being derived from the first covariance and the second covariance.

9. The method of claim 8 further comprising determining first and second state matrices, the first state matrix being associated with the high-dimensional observation and the second state matrix being associated with the predicted observation, and wherein the first and second matrices are Jacobian matrices.

10. The method of claim 1, wherein the outlier rule comprises using a median of a mapped feature and a median absolute deviation of the mapped feature to determine whether the mapped feature disagrees with a general affine transformation of the observation.

11. The method of claim 1, the method comprising:
determining an observation covariance associated with the high-dimensional observation;
predicting an observation and covariance, the predicted observation being related to the high-dimensional observation, the predicted covariance being associated with the predicted observation;
extracting the high-dimensional feature from the high-dimensional observation;
determining a first covariance for the high-dimensional feature, the first covariance determination being based on the observation covariance;
determining a second covariance for the high-dimensional feature, the second covariance determination being based on the predicted covariance; and
the outlier rejection rule utilizing a weighting metric derived from the first covariance and the second covariance.

12. A system managing objects in a multi-dimensional space when the objects are no longer visible in a collection of images captured from the multi-dimensional space over time, the system comprising:
a processor; and
a memory communicatively coupled to the processor when the system is operational, the memory bearing processor instructions that, when executed on the processor, cause the system to at least:
identify one or more objects visible in a first image among the collection of images;
add the identified objects to a first list of tracked identified objects, wherein the first list represents a state space of the multi-dimensional space, the state space comprising object identifiers, a state vector, and a covariance matrix;
track the identified objects from the first list of objects in one or more subsequent images among the collection of images, the one or more subsequent images being captured after capturing the first image;
determine whether the tracked identified objects are absent in the one or more subsequent images, wherein causing the system to determine includes causing the system to determine whether a tracked identified object from the first list is an unreliable object and includes causing the system to map a high-dimensional feature into a one-dimensional space, wherein the high-dimensional feature is associated with one of the tracked identified objects captured from a high-dimensional observation; and
remove, based on the determination, the tracked identified objects from the first list, wherein causing the system to remove includes causing the system to apply an outlier rejection rule in the one-dimensional space to remove the mapped high-dimensional feature.

13. The system of claim 12, wherein the memory bears processor instructions that, when executed on the processor, further cause the system to at least:
filter outlier objects in the first image to create a second list comprising the outlier objects; and
track the outlier objects in the second list independently of the identified objects in the first list.

14. The system of claim 12, wherein the memory bears processor instructions that, when executed on the processor, further cause the system to at least:
determine whether an object is visible in the one or more subsequent images;
determine whether the object is absent in the first image; and
add the object to the first list.

15. The system of claim 12, wherein the memory bears processor instructions that, when executed on the processor, further cause the system to at least:
correct locations of tracked identified objects; and
process the tracked identified objects through an extended Kalman filter for simultaneous localization and mapping.

16. The system of claim 12, wherein the memory bears processor instructions that, when executed on the processor, further cause the system to at least:
determine an observation covariance associated with the high-dimensional observation;
predict an observation and covariance, the predicted observation being related to the high-dimensional observation, the predicted covariance being associated with the predicted observation;
extract the high-dimensional feature from the high-dimensional observation;
determine a first covariance for the high-dimensional feature, the first covariance determination being based on the observation covariance;
determine a second covariance for the high-dimensional feature, the second covariance determination being based on the predicted covariance; and
the outlier rejection rule utilizing a weighting metric derived from the first covariance and the second covariance.

* * * * *